(12) United States Patent
Pierro et al.

(10) Patent No.: US 11,493,622 B1
(45) Date of Patent: Nov. 8, 2022

(54) COMPACT RADAR WITH X BAND LONG-DISTANCE WEATHER MONITORING AND W BAND HIGH-RESOLUTION OBSTACLE IMAGING FOR LANDING IN A DEGRADED VISUAL ENVIRONMENT

(71) Applicant: Telephonics Corporation, Farmingdale, NY (US)

(72) Inventors: John Pierro, East Meadow, NY (US); Seth Resnick, Long Beach, NY (US); Richard Krabak, Oakdale, NY (US)

(73) Assignee: Telephonics Corp., Farmingdale, NY (US)

( * ) Notice: Subject to any disclaimer, the term of this patent is extended or adjusted under 35 U.S.C. 154(b) by 935 days.

(21) Appl. No.: 16/270,046

(22) Filed: Feb. 7, 2019

Related U.S. Application Data

(60) Provisional application No. 62/627,843, filed on Feb. 8, 2018.

(51) Int. Cl.
*H01Q 1/28* (2006.01)
*G01S 13/87* (2006.01)
(Continued)

(52) U.S. Cl.
CPC ............ *G01S 13/87* (2013.01); *G01S 13/426* (2013.01); *G01S 13/89* (2013.01); *G01S 13/953* (2013.01); *H01Q 1/281* (2013.01)

(58) Field of Classification Search
CPC ........... H01Q 1/28; H01Q 1/281; H01Q 15/16
See application file for complete search history.

(56) References Cited

U.S. PATENT DOCUMENTS 2,891,191 A  6/1959  Heffner
3,216,018 A  11/1965  Kay
(Continued)

FOREIGN PATENT DOCUMENTS

CN  203218457 U  *  9/2013  ............. H01Q 19/19
CN  206878184 U  *  1/2018  ............... H01Q 5/47

OTHER PUBLICATIONS

Press Fit Engineering and Design Calculator, Dec. 7, 2018, available at: www.engineersedge.com/calculators/machine-design/press-fit/press-fit-calculator.htm.
(Continued)

*Primary Examiner* — Hoang V Nguyen
(74) *Attorney, Agent, or Firm* — Thomas A. O'Rourke; Bodner & O'Rourke, LLP

(57) ABSTRACT

The antenna uses X Band frequencies for long-distance weather monitoring and W Band frequencies for imaging of terrain and obstacles, for use in a radar system in aircraft nose radome to operate effectively in a degraded visual environment. The antenna's feed structure includes concentrically positioned first and second horns. First and second rectangular waveguides are positioned on a cylindrical portion of the first horn, and at a first and second radial positions spaced 90 degrees apart. First and second coaxial cables respectively couple the first and second rectangular waveguides to a polarization converter, which launches linearly polarized waves received from each of the first and second coaxial cables to form a W-band circularly polarized wave. The feed structure collects and disseminates W Band and X Band electromagnetic energy.

20 Claims, 53 Drawing Sheets

(51) Int. Cl.
    *G01S 13/95*     (2006.01)
    *G01S 13/42*     (2006.01)
    *G01S 13/89*     (2006.01)

(56) References Cited

U.S. PATENT DOCUMENTS

| | | | |
|---|---|---|---|
| 3,305,870 A | 2/1967 | Webb |
| 3,324,423 A | 6/1967 | Webb |
| 3,413,642 A | 11/1968 | Cook |
| 3,530,481 A | 9/1970 | Tanaka |
| 3,555,552 A | 1/1971 | Alford |
| 3,566,309 A | 2/1971 | Ajioka |
| 3,568,204 A | 3/1971 | Blaisdell |
| 3,573,838 A | 4/1971 | Ajioka |
| 3,605,101 A | 9/1971 | Kolettis |
| 3,633,208 A | 1/1972 | Ajioka |
| 3,815,132 A | 6/1974 | Case |
| 4,048,592 A | 9/1977 | Drabowitch |
| 5,184,136 A | 2/1993 | Cardiasmenos |
| 5,196,854 A | 3/1993 | Mathews |
| 5,379,215 A | 1/1995 | Kruhoeffer |
| 5,920,276 A | 7/1999 | Frederick |
| 5,945,926 A | 8/1999 | Ammar |
| 6,028,565 A | 2/2000 | Mackenzie |
| 6,201,494 B1 | 3/2001 | Kronfeld |
| 6,219,594 B1 | 4/2001 | Nicosia |
| 6,388,607 B1 | 5/2002 | Woodell |
| 6,441,773 B1 | 8/2002 | Kelly |
| 6,653,947 B2 | 11/2003 | Dwyer |
| 7,042,387 B2 | 5/2006 | Ridenhour |
| 7,242,343 B1 | 7/2007 | Woodell |
| 7,379,014 B1 | 5/2008 | Woodell |
| 7,576,680 B1 | 8/2009 | Weddell |
| 7,859,448 B1 | 12/2010 | Woddell |
| 8,354,970 B2 | 1/2013 | Armbrecht |
| 8,786,508 B1 * | 7/2014 | Edwards | H01Q 5/47 343/786 |
| 8,878,740 B2 | 11/2014 | Coupland |
| 9,019,145 B1 | 4/2015 | Sishtla |
| 9,535,158 B1 | 1/2017 | Breiholz |
| 9,733,349 B1 | 8/2017 | Wood |
| 10,122,066 B2 | 11/2018 | Ito |
| 2010/0033499 A1 | 2/2010 | Gannon |
| 2010/0117908 A2 | 5/2010 | Lee |

OTHER PUBLICATIONS

J. L. Olvera-Cervantes, A Wideband Quadrature Power Divider/Combiner and its Application to an Improved Balanced Amplifier, Progress in Electromagnetic Research C, vol. 34, 29-39, 2013.

\* cited by examiner

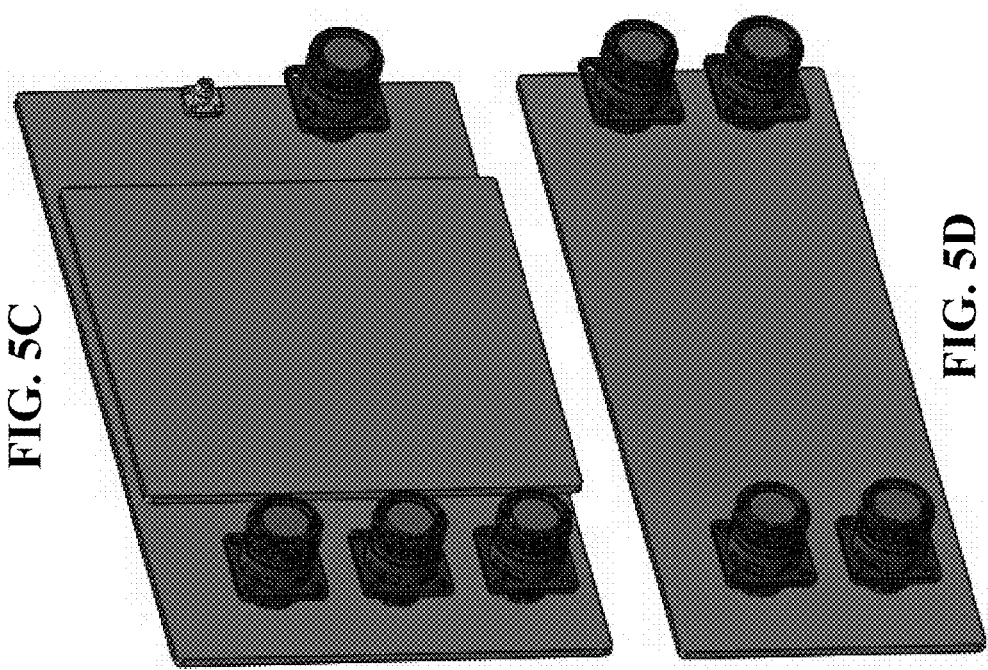
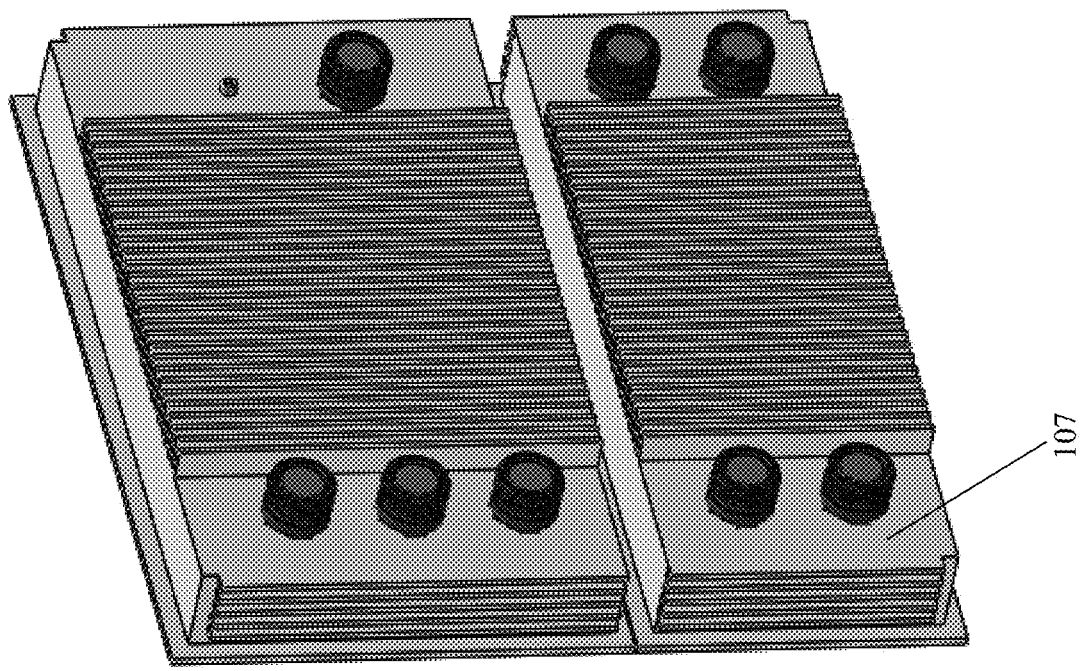

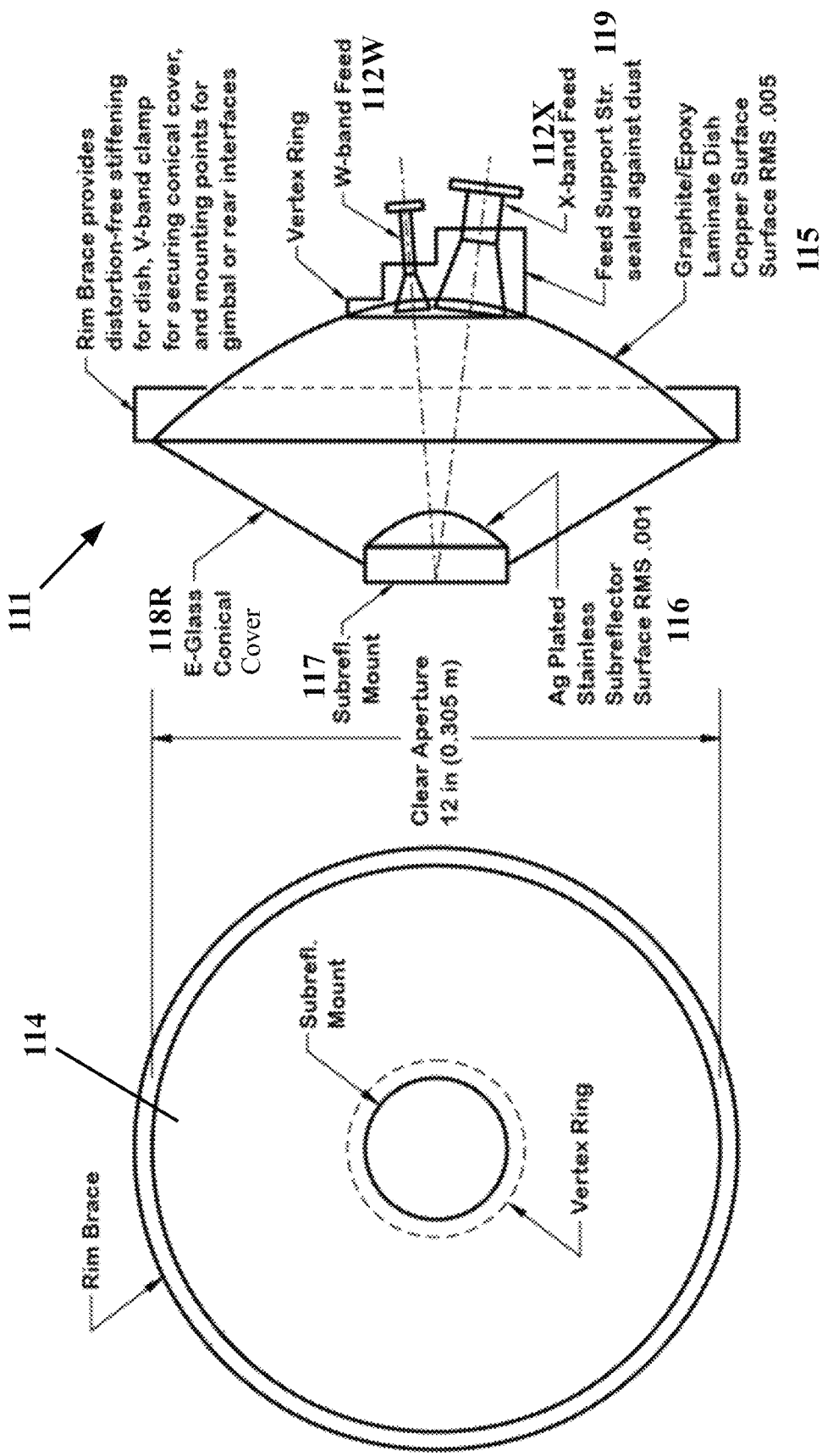

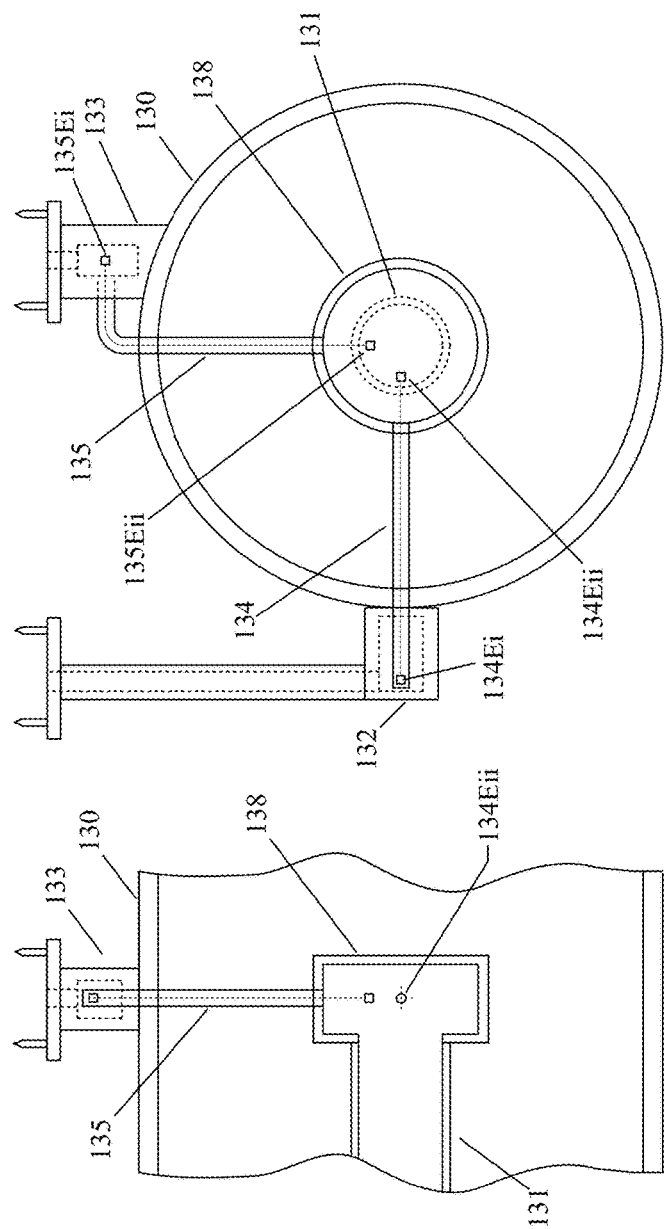
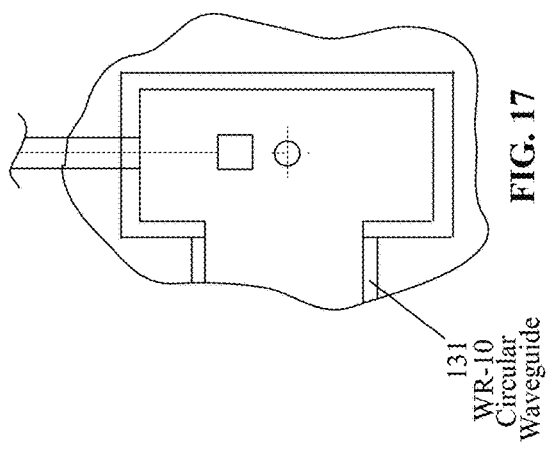
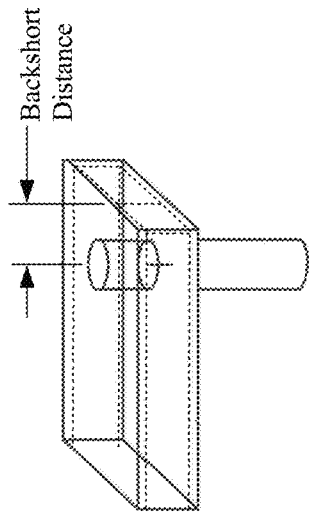
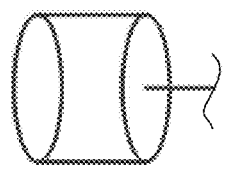

(indistinguishable heat image of ground obstacles)

(blurred/obscured visual approach)

Performance Matrix

| Parameter | Value |
|---|---|
| Operating frequency (GHz) | 94 +/- 0.9 94 |
| Tunable bandwidth (GHz) | 1.88 |
| Waveform bandwidth (MHz) | Selectable 40 and 160 |
| Radar operating modes | |
| Mode Name | Initial Mode |
| Mode Description | Pulse Modulated, 160 MHz BW, 50 KHz PRF |
| Minimum / maximum range (km) | 0.3 km/1.0 km |
| Range Swath (m) | 0.5 km |
| Azimuth angular coverage (degs) | FOR +/-20, FOV +/-0.7 |
| Elevation angular coverage (degs) | FOR +/-10, FOV +/-0.7 |
| Range resolution (m) / Range accuracy (m) | 1.25m/1.25 m |
| Cross-range resolution (deg) / Cross-range accuracy (deg) | 0.7 deg./0.1 deg |
| Vertical resolution (deg) / Vertical accuracy (deg) | 0.7deg./0.05 deg. (interferometry) |
| Mode name | Encode Mode |
| Mode description | Pulse Modulated, 160 MHz, 18W, 15 KHz PRF |
| Minimum / maximum range (km) | 1 km/5 km |
| Range swath (km) | 4 km max. |
| Azimuth angular coverage (degs) | FOR +/-20, FOV +/-0.7 |
| Elevation angular coverage (degs) | FOR +/-10, FOV +/-0.7 |
| Range resolution (m) / Range accuracy (m) | 1.25 m/1.25 m |
| Cross-range resolution (deg) / Cross-range accuracy (deg) (≥20 dB SNR) | 0.7 deg./0.1 deg |
| Vertical resolution (deg) / Vertical accuracy (deg.) (≥20 dB SNR) | 0.7deg./0.1 deg |
| Mode time requirements (sec.) | 1 sec. |
| Mode switching time | 1 sec |
| Radar antenna beam scan | M-Scan |
| Type of scanning (mechanical, electronic, etc.) | Raster Scan |
| Scan pattern description | |
| Field of regard (AZ x EL) (degs) | +/-20 degrees, az., +/-10 degrees el |
| Field of view (AZ x EL) (degs) | +/-0.7 degrees, az., +/-0.7 degrees elevation |
| Beam scan rate (degree/sec) | Antenna Assembly gimbaled w/positioners az, and el. to cover FOR |
| Frame Rate | >2Hz |
| dc Power | 53 Watts |
| Weight | 40 lbs |
| Detection Performance | See Tables |
| Transmitter | 9 Watts Peak, 10 % DF, Gan SSPA, 10% efficiency |
| Receiver | Noise Figure 10 dB, 1.68 GHz IBW, Linear Dynamic Range > 60 dB, Digital Downconversion |
| | 8000 hours |

FIG. 36

DVE Radar Detection Performance

FIG. 37

Predicted Detection Range

| Obstacle | RCS (dBm²) | RCS (m²) | Predicted Range (km) |
|---|---|---|---|
| Concrete Blocks | -22.5 | 0.006 | 1.9 |
| Posts | -22.5 | 0.006 | 1.9 |
| Corner Reflector | -18 | 0.016 | 2.4 |
| Boxes | -13 | 0.05 | 3.2 |
| Telephone Poles | -14 | 0.04 | 3.0 |
| Drums | -13 | 0.05 | 3.2 |
| Vehicles | -4 | 0.4 | 5.4 |
| Wires (1) | -25 | 0.003 | 1.6 |

FIG. 38

DVE SWaP Estimate (Adding DVE Capability)

| LRU | DVE SWaP | | | RDR-1600 | | | DVE Notes | RDR-1600 |
|---|---|---|---|---|---|---|---|---|
| | Weight (lb) | Size (in) | Power (W) | Weight (lb) | Size (in) | Power (W) | | |
| MADGIC | 8.82 | 12 x 7 x 1.75 | 45 | NA | NA | NA | 8.82 17.5 12 7 0.06 | |
| Power Supply | 6.3 | 12 x 5 x 1.75 | 34 | NA | NA | NA | 6.3 17.5 12 5 0.06 | |
| 94 GHz FFE | 14 | 12Dia x 7 | 53 | NA | NA | NA | | |
| AP | 18 | 10 x 10 x 8 | 39 | 7.6 | 7.62 Swing Radius x 7.68 | | 12 from Cobham, 5lb for plate, 1.5 from mrcy | Brochure |
| RT | 17.3 | 5 x 14.05 | 84 | 17.3 | 5 x 14.05 | 84 | Larger motors, 2 Ch ROJ, Encoders, Slip-rings, Controller CCAs | Brochure |
| RT Tray | 1.9 | | | 1.9 | | | | O/I |
| Control Panel | 1.7 | | | 1.7 | | | | Brochure |
| Total | 68.02 | NA | 255 | 28.5 | NA | 84 | | |
| Delta | 39.52 | | 171 | | | | | |

COMPACT RADAR WITH X BAND LONG-DISTANCE WEATHER MONITORING AND W BAND HIGH-RESOLUTION OBSTACLE IMAGING FOR LANDING IN A DEGRADED VISUAL ENVIRONMENT

CROSS REFERENCES RELATED APPLICATIONS

This application claims priority on U.S.. Provisional Application Ser. No. 62/627,843 filed on Feb. 8, 2018, the disclosures of which are incorporated herein by reference.

FIELD OF THE INVENTION

The present invention relates to improvements in radar systems, and more particularly to an improved radar system that can provide an aircraft with both long-distance, monitoring of the weather, and high-resolution obstacle imaging in a degraded visual environment (DVE), using a single antenna.

BACKGROUND OF THE INVENTION

A Radio Detection and Ranging (radar) system generally consists of a transmitter used to produce an electromagnetic signal, an antenna configured to radiate that signal in a particular direction or directions, and a receiver designed to receive and analyze the signal reflected back to the system. Numerous radar systems have been developed, and which have become highly differentiated, since inception of such apparatus in the $20^{th}$ century.

A radar may be classified as primary or secondary. A primary radar operates as just described using the transmitter, antenna, and receiver, with passive use of the emitted signal, whereas a secondary radar system also works in conjunction with an active "answer" signal. An example of a secondary radar system is that used by the Federal Aviation Administration (FAA) for Air Traffic Control (ATC), whereby a transponder installed in the airborne aircraft receives and decodes the electromagnetic signal from the ground radar, and automatically responds by transmitting an encoded signal that includes the aircraft's four digit identification ("squawk") code (e.g., "1200" for an IFR flight), and the aircraft's altitude.

Primary radar is farther classified as being a continuous wave radar, which may be further classified as modulated or unmodulated; and pulsed radar, which may be further classified as MTI (moving target indicator) radar or pulsed Doppler radar.

There are many varieties of configurations for radar, based on the construction of the emitter, the receiver, the antenna, and the wavelength(s) and scan strategies used. For example, detection and search radars usually scan a wide area two to four times a minute, with pulses of short radio waves that are usually less than a meter long. Targeting radar operates similarly, but tends to scan a more narrowly defined area at a fairly high frequency, whereas search radar generally scans more widely and less frequently.

Weather radar may be particularly configured to locate areas of precipitation/storm activity, and may make a determination as to its motion and type (e.g., rain, hail, snow, etc.). Certain types of weather-related radar is shown, for example, by the following U.S.. Pat. No.: 5,077,558 to Kuntman for "Airborne Wind Shear Detection Radar; U.S.. Pat. No. 5,196.854 to Mathews for "Inflight Weather and Ground Mapping Radar"; U.S.. Pat. No. 5,488,375 to Michie for "Airborne Weather Radar System with Icing Detection Capability; U.S. Pat. No. 6,201,494 to Kronfeld for "Automatic Storm Finding Weather Radar"; U.S. Pat. No. 6,441,773 to Kelly for "Weather Radar System Integrating Ground-Based Weather Radar with On-Board Aircraft Weather Radar"; U.S. Pat. No. 7,109,913 to Paramore for "Airborne Weather Radar System and Radar Display"; U.S. Pat. No. 7,205,928 to Sweet for "Automatic Weather Radar System and Method"; U.S. Pat. No. 7,242,343 to Woodell for "Direct Sequential Hazard Assessment Weather Radar"; U.S. Pat. No. 7,515,087 to Wooden for "Weather Radar System and Method Using Data from a Lightening Source"; U.S. Pat. No. 8,159,369 to Koenigs for "Weather Radar System and Method"; U.S. Pat. No. 9,019,145 to Sishtla for "Ground Clutter Rejection for Weather Radar"; and U.S. Pat. No. 9,535,158 to Breiholz for "Weather Radar System and Method with Fusion of Multiple Weather Information Sources."

Terrain avoidance, also referred to as "Controlled Flight into Terrain" (CFIT), has long been a concern for in-flight aircraft. Also, avoidance of man-made obstacles is paramount, whether on approach, or during pre-flight or post-flight taxiing of the aircraft. These obstacles may include, but are not limited to: buildings, bridges, cell towers, ground vehicles in the landing zone (LZ), aircraft in the LZ, rocks, berms around the landing surface, which may not be a paved runway, depressions in the landing surface, flora, fences/fence poles, shipping containers, and even rebar that may be protruding from the ground at an area that may be under construction. There have been many notable accidents in which aircraft were flown into terrain. In 1942, a Trans World Airlines flight using a Douglas DC-3 left Las Vegas and crashed into a sheer cliff on Potosi Mountain, only fifteen minutes after takeoff. In 2010 a Polish Air Force aircraft carrying the President of Poland and eighteen members of the Polish Parliament crashed into the trees of a wooded area near the approach for a runway at Smolensk, Russia.

Therefore, radar systems have also been particularly devised for terrain avoidance, as shown, for example, by the following U.S. Pat. No. 3,815,132 to Case for "Radar for Automatic Terrain Avoidance"; U.S. Pat. No. 5,920,276 to Frederick for "Automatic Horizontal and Vertical Scanning Radar with Terrain Display"; U.S. Pat. No. 5,945,926 to Ammar for "Radar Based Terrain and Obstacle Alerting Function"; U.S. Pat. No. 6,219,594 to Nicosia for "Landing Area Obstacle Detection Radar System"; U.S. Pat. No. 7,042,387 to Ridenour for "Systems and Methods for Displaying Hazards"; U.S. Pat. No. 7,379,014 to Woodell for "Taxi Obstacle Detecting Radar"; and U.S. Pat. No. 9,733,349 to Wood for "System for and Method of Data Processing for Low Visibility Landing Applications."

The pilot of an aircraft, particularly those aircraft flown by commercial airlines, must be cognizant of both in-flight weather patterns, and terrain to be avoided. Therefore, radar systems have been developed to simultaneously address both of those concerns—weather and terrain, as shown, for example, by the following U.S. Pat.No. and Patent Application Publications No.: 5,379,215 to Kruhoeffer for "Method for Creating a 3-D Image of Terrain and Associated Weather"; U.S. Pat. No. 6,388,607 to Woodell for "Multi-Sweep Method and System for Mapping Terrain with a Weather Radar System"; U.S. Pat. No. 6,653,947 to Dwyer for "Apparatus for the display of Weather and Terrain Information on a single Display"; U.S. Pat. No. 7,576,680 to Woodell for "Pulse Pattern for Weather Phenomenon and Incursion Detection System and Method"; 2010/0033499 by Cannon for "System & Method for Eliminating Confusion between Weather Data and Terrain Data in Aircraft Displays"; and U.S. Pat. No. 7,857,448 to Woodell for "Terrain Avoidance System and Method Using Weather Radar for Terrain Database Generation."

Antenna feed arrangements (e.g., a horn) for use with radar and other related systems have undergone similar developments, as shown for example, by U.S.. Pat. No.: 2,891,191 to Heffner; U.S. Pat. No. 3,216,018 to Kay; U.S. Pat. No. 3,324,423 to Webb; U.S. Pat. No. 3,305,870 to Webb; U.S. Pat. No. 3,413,642 to Cook; U.S. Pat. No. 3,566,309 to Ajioka; U.S. Pat. No. 3,568,204 to Blaisdell; U.S. Pat. No. 3,573,838 to Ajioka; U.S. Pat. No. 3,605,101 to Kolettis; and U.S. Pat. No. 4,048,592 to Drabowitch.

However, the need for a compact radar system that efficiently and effectively provides both long-distance weather monitoring, and obstacle detection with a very high level of resolution, has not yet been met. Such a system is particularly needed for military helicopters whose space constraints and weight limitations are far more restrictive and critical than for a large commercial jet like the Boeing 757, 767, and 777 series of aircraft; the nose of the typical military helicopter is crammed with electronics, much of which is typically occupied by a conventional X-band weather radar.

A military helicopter, such as the multirole Sikorsky Blackhawk helicopter, must fight its way into and out from unfamiliar and unmapped combat zones on a moment's notice-combat zones whose obstacles (e.g., military air craft/vehicles, cargo containers, etc.) may frequently change positions and may even be actively changing while the aircraft is en route or on approach to landing. The terrain-avoidance problem is greatly exacerbated for such military flights/missions into a "Degraded Visual Environment" (DVE), which includes one or more obscuration conditions (weather-related obscuration, such as ground fog; sand; dust; the dark of night; etc.). During such conditions, the pilot is prevented from using his/her unaided vision to safely navigate and land the aircraft.

The radar used for such helicopters must have sufficient Raleigh resolution to reliably detect and accurately locate all of the ground-based obstacles that may be present. The typical X Band weather radar cannot accomplish this because it cannot achieve the resolution that is needed to discern these obstacles in the presence of the large background clutter (land, buildings, etc.). The beam characteristics are much too broad, which is a direct consequence of having to keep the antenna size for a weather radar "small" (i.e., typically about 12 in.), to permit the radar to fit in the nose of the aircraft. To achieve the resolution that is needed in a DVE using the X Band Weather Radar frequency, the antenna size would have to be increased to greater than 96 inches (i.e., be over 8 ft. long).

The present invention overcomes these and other drawbacks of the prior art.

It is noted that citing herein of any patents, published patent applications, and non-patent literature is not an admission as to any of those references constituting prior art with respect to the disclosed apparatus. Also, the disclosures of all patents, published patent applications, and non-patent literature cited within this document are incorporated herein in their entirety by reference.

Objects of the Invention

It is an object of the invention to provide a radar system capable of providing the pilot of an aircraft with long-distance weather information.

It is another object of the invention to provide a radar system capable of providing the pilot of an aircraft with terrain avoidance data.

It is a further object of the invention to provide a radar system capable of identifying to the pilot of an aircraft the position and size of obstacles in a landing zone.

It is another object of the invention to provide a combined radar system that uses dual bands to accomplish both long-distance weather monitoring and the provision of high resolution terrain and obstacle clearance data to the pilot of an aircraft.

It is also an object of the invention to provide a combined weather monitoring and terrain/obstacle clearance radar that is sized to be within 20% of the size of the single function weather radar.

It is another object of the invention to provide a combined radar system that fits within the nose of an Air Force helicopter.

It is also an object of the invention to provide a combined radar system that fits within the volume allocated by the typical radome of the Sikorsky Blackhawk helicopter.

Further objects and advantages of the invention will become apparent from the following description and claims, and from the accompanying drawings.

BRIEF DESCRIPTION OF THE DRAWINGS

The description of the various example embodiments is explained in conjunction with appended drawings, in which:

FIG. 5B is the front perspective view of the signal-image processor and power supply of FIG. 5A, but is shown with a portion of the pedestal housing removed;

FIG. 5C is a front perspective view of a first one of the circuit card assemblies and connectors of the signal-image processor and power supply of FIG. 5B;

FIG. 5D is a front perspective view of a second one of the circuit card assemblies and connectors of the signal-image processor and power supply of FIG. 5B;

FIG. 7 is a side view of a first embodiment of an antenna and related structure that may be used with the X Band Weather and W Band Obstacle Imaging Radar of FIG. 2. having side-by-side waveguides referred to previously as an offset feed arrangement;

FIG. 8 a front view of the antenna and related structure shown in FIG. 7;

FIG. 15 is a detail side view of a portion of the concentric waveguide of FIG. 11A;

FIG. 16 is an end view of the portion of the concentric waveguide structure shown in FIG. 15;

FIG. 17 is an enlarged detail view of the WR-10 rectangular waveguide shown in FIG. 16;

FIG. 18 is a perspective view of the WR-10 rectangular waveguide;

FIG. 19 is a detail view of the E-plane probe shown within the WR-10 rectangular waveguide shown in FIG. 18 and FIG. 16;

FIG. 36 illustrates a performance matrix for the W-Band portion of the dual function X Band Weather and W Band Obstacle Imaging Radar of FIG. 2;

Figure 39:
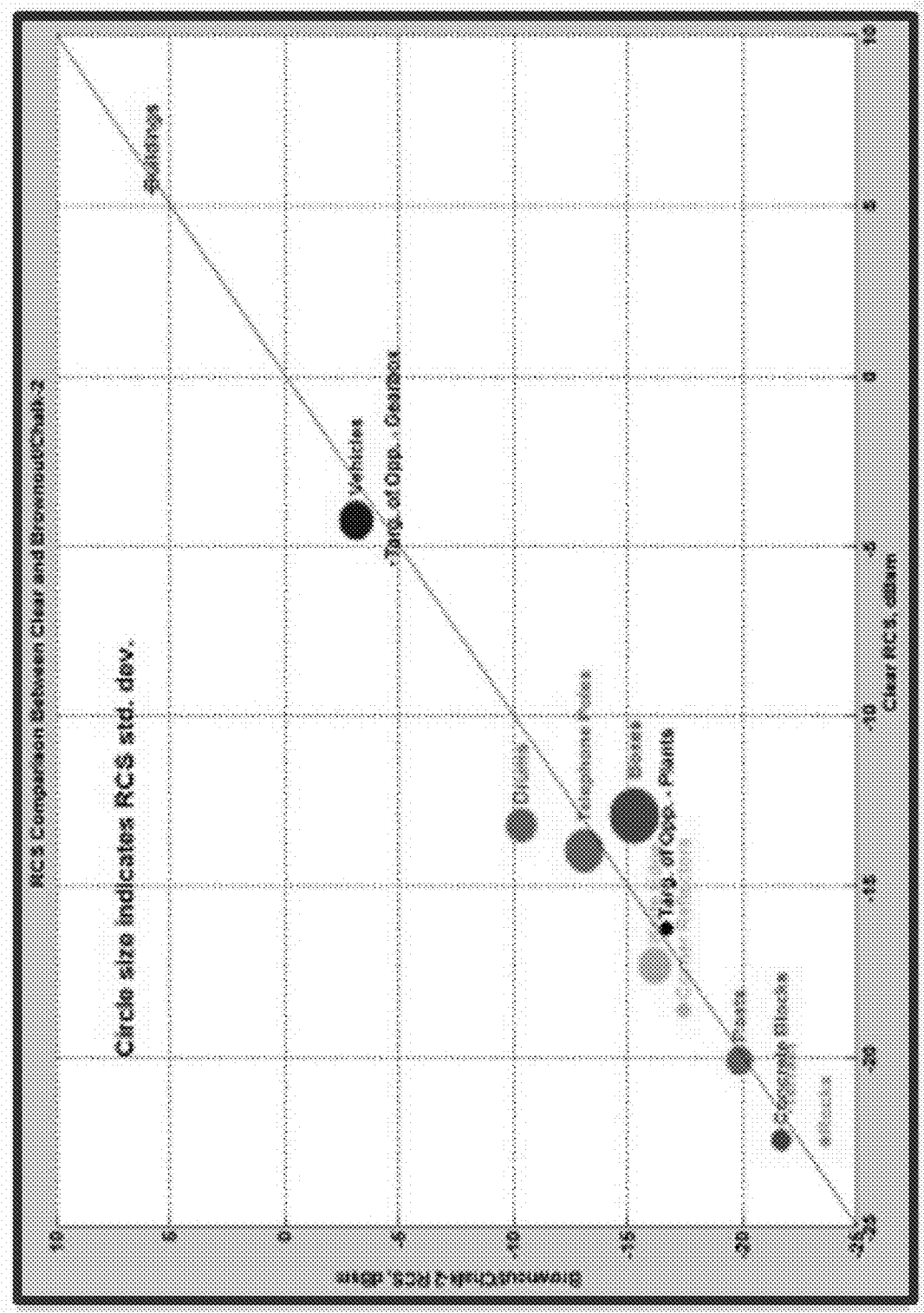
Figure 41:
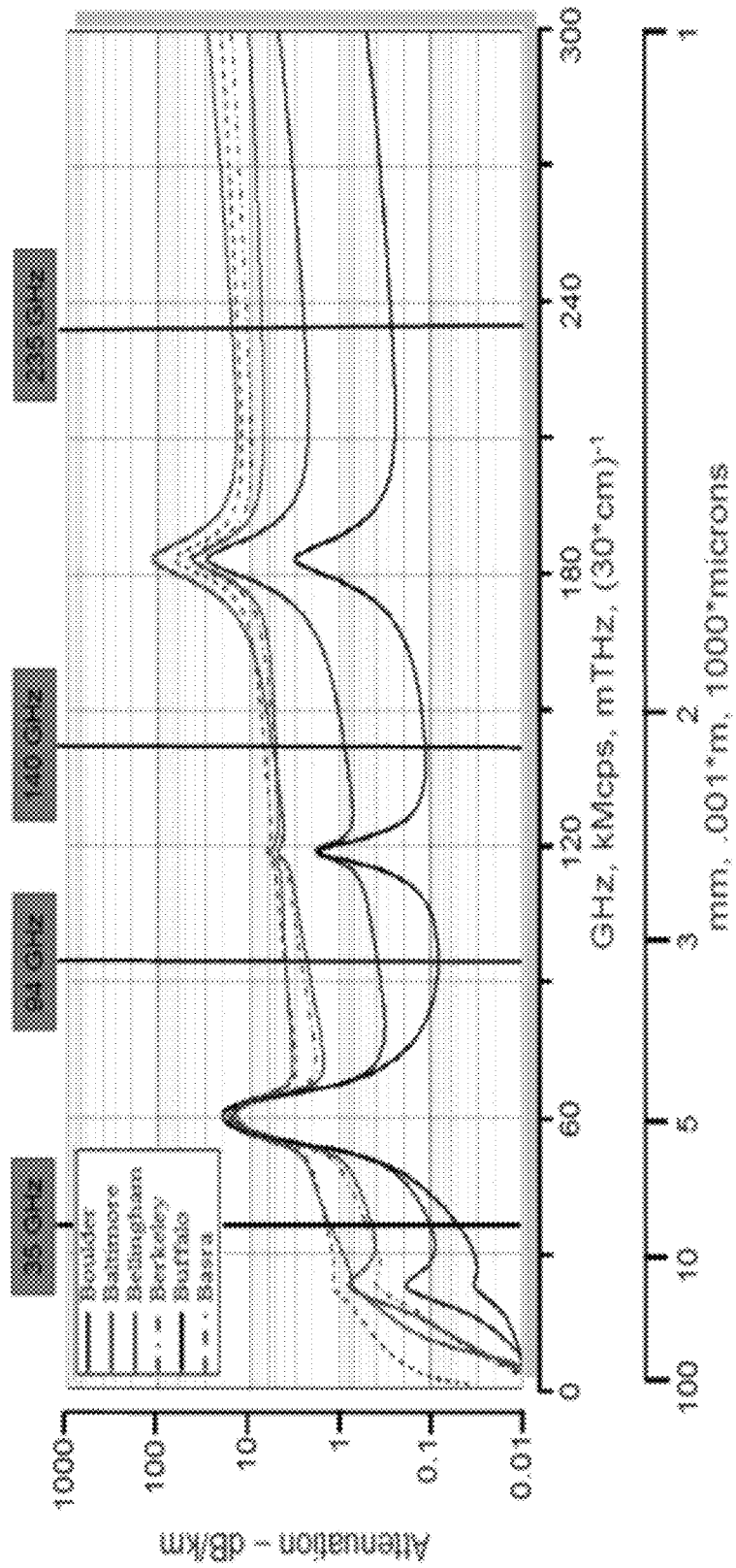

PIG. 37 illustrates a chart identifying the DVE Radar detection performance of the dual function X Band Weather and W Band Obstacle Imaging Radar of FIG. 2;

FIG. 38 illustrates a chart identifying predicted detection ranges of various obstacles using the dual function X Band Weather and W Band Obstacle Imaging Radar of FIG. 2;

FIG. 39 illustrates a chart identifying the radar cross-section of obstacles listed in the chart of FIG. 38;

FIG. 40 illustrates a chart identifying the Delta SWaP estimate for the dual function X Band Weather and W Band Obstacle Imaging Radar of FIG. 2; and FIG. 41 is a chart that illustrates average atmospheric absorption at different geographic locations, and shows that atmospheric absorption is strongly affected by moisture content in the air, that the 94 GHz band is situated at an atmospheric attenuation minimum, and that in very dry conditions the loss can be as low as 0.1 dB/km.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone: or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed apparatus.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of multiple individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit (e.g., for a 0.1250 inch shaft diameter the opening may be 0.1285 inches for a close fit and may be 0.1360 inches for a free (running) fit; and for a 0.5000 inch diameter shaft size the opening may be 0.5156 inches for a close clearance fit and may be 0.5312 inches for a free clearance fit). Other clearance amounts may also be used.

Furthermore, the described features, advantages, and characteristics of any particular embodiment disclosed herein, may be combined in any suitable manner with any of the other embodiments disclosed herein.

It is further noted that any use herein of relative terms such as "top," "bottom," "upper, " "lower," "vertical," and "horizontal" are merely intended to be descriptive for the reader, based on the depiction of particular features referred to within the figures for one particular position of the apparatus, and such terms are not intended to limit the orientation with which the device of the present invention may be utilized.

Figure 1:
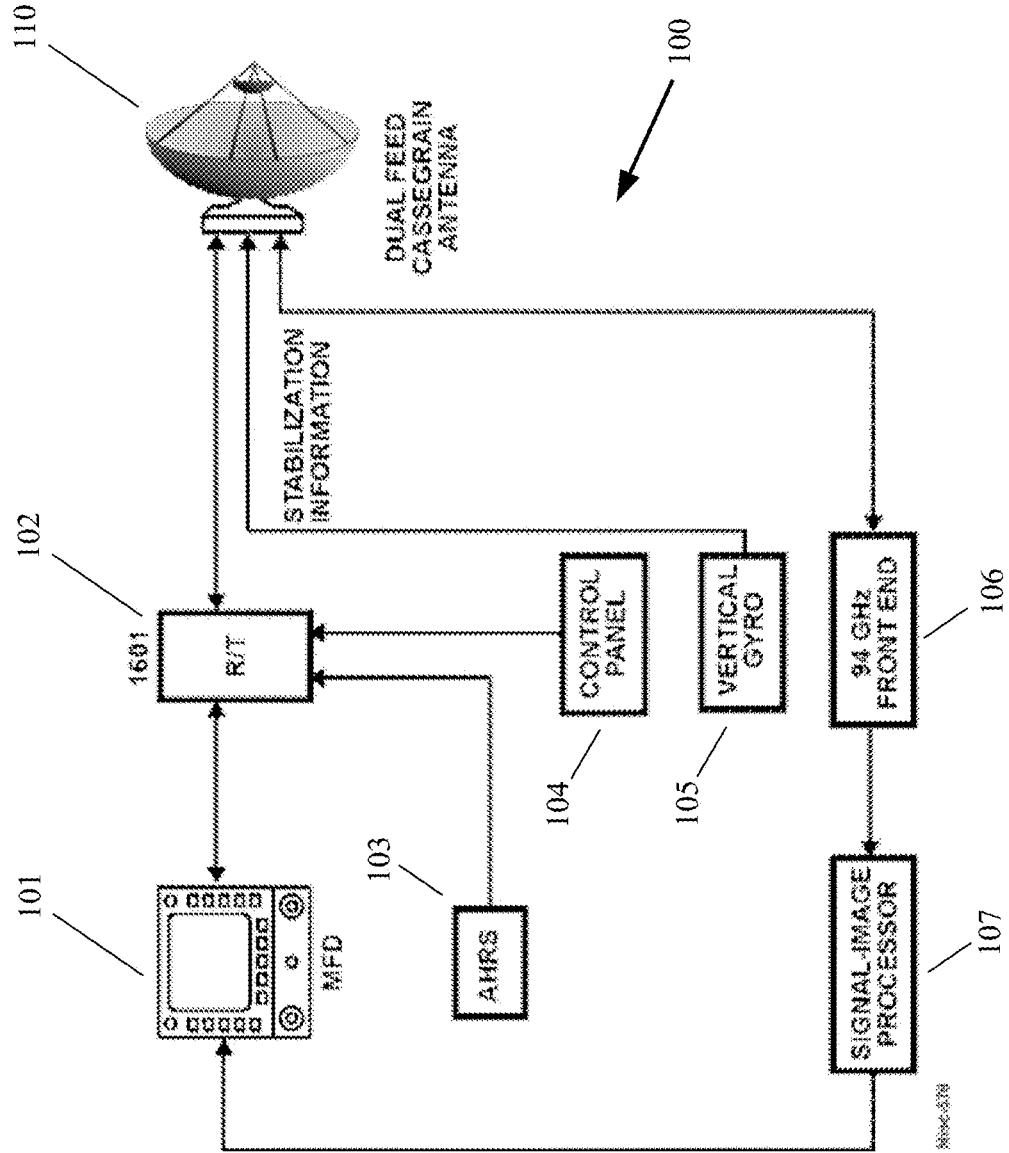
FIG. 1 illustrates an overall block diagram for the dual-function radar system disclosed herein.
Figure 2A:
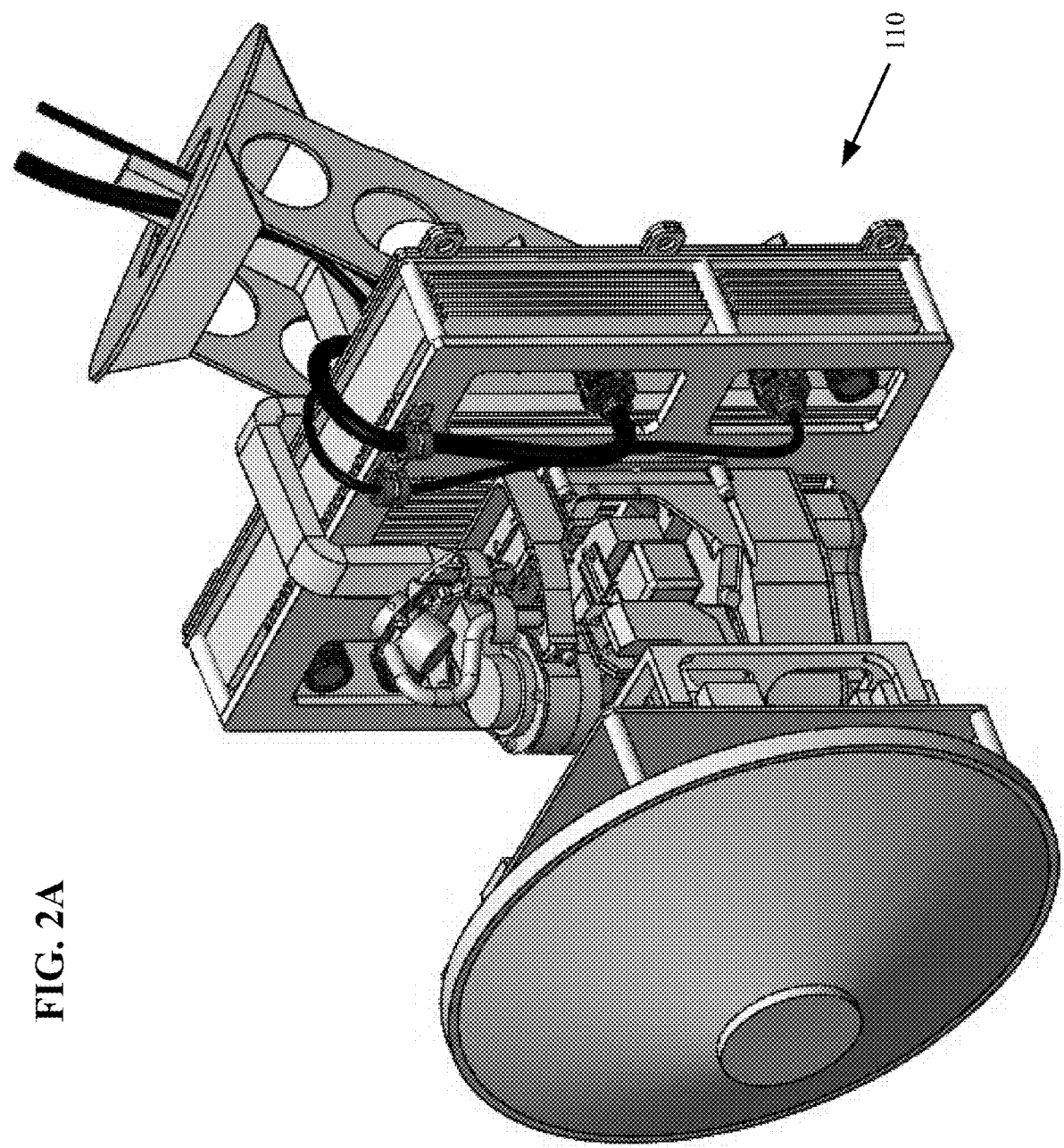
FIG. 2A is a first perspective view or the antenna assembly disclosed herein shown attached to a boom, for mounting to an aircraft.
Figure 2B:
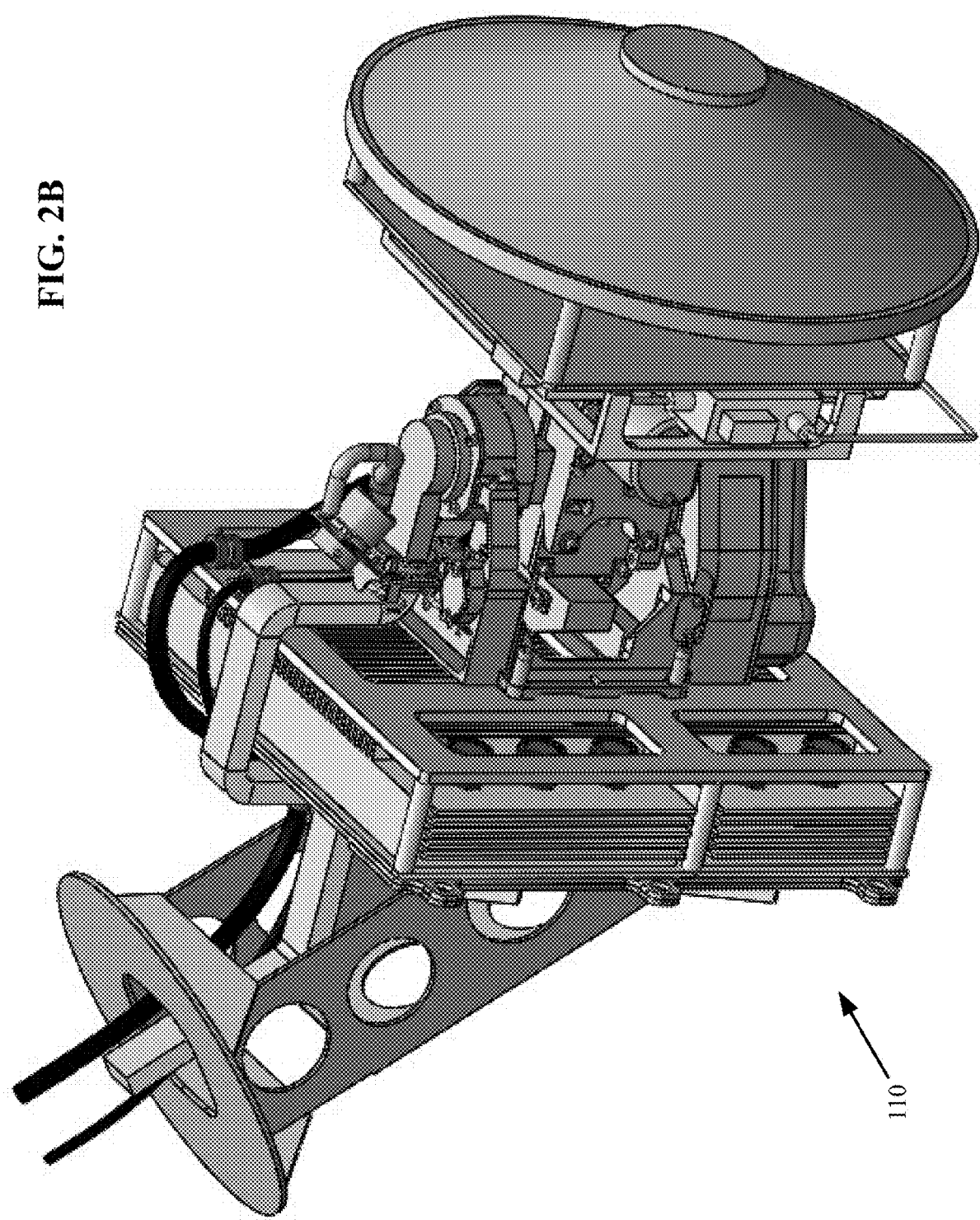
FIG. 2B is a second perspective view of the boom-mounted antenna assembly shown in FIG. 2A.
Figure 2C:
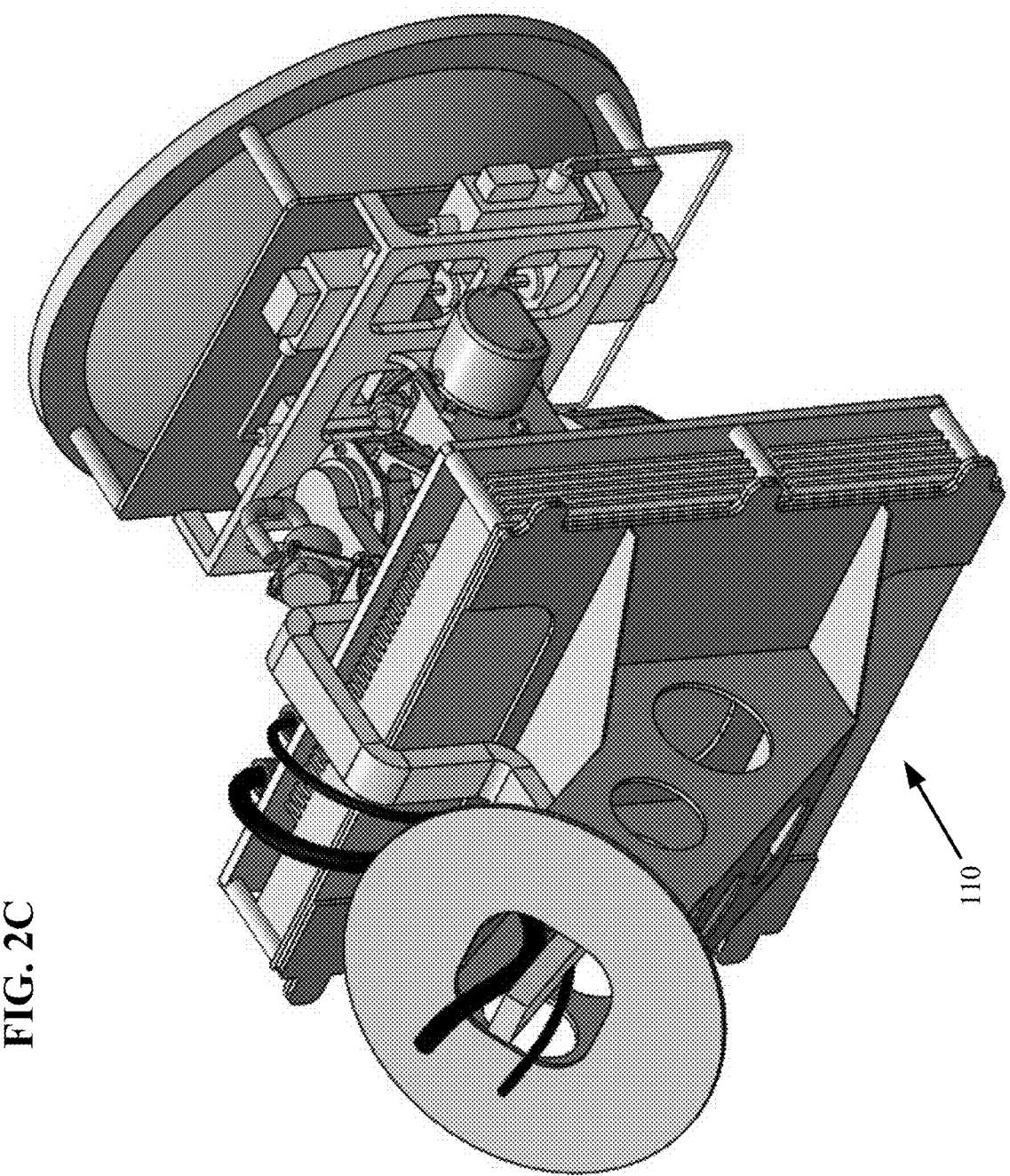
FIG. 2C is a third perspective view of the boom-mounted antenna assembly Shown in FIG. 2A.
Figure 2D:
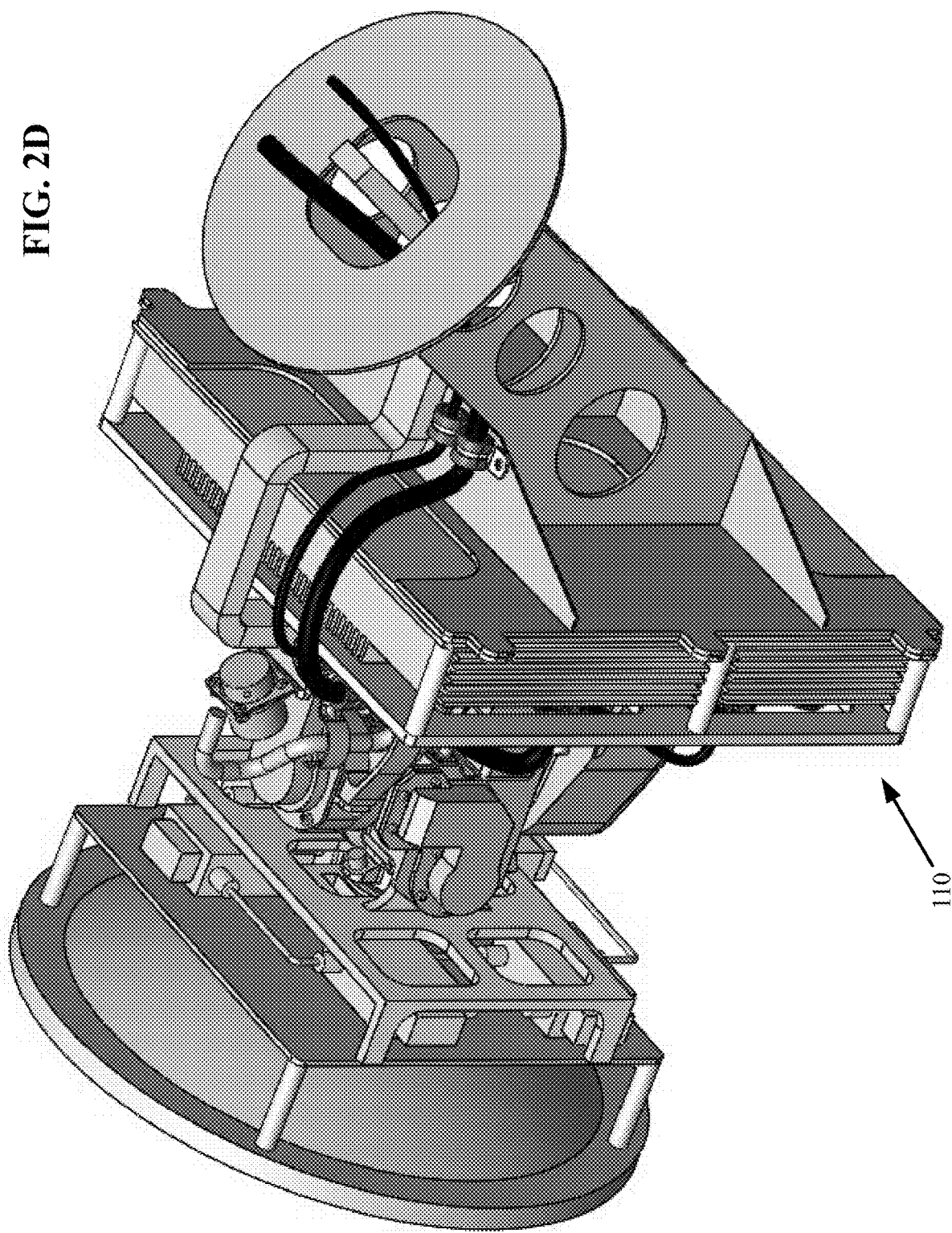
FIG. 2D is a fourth perspective view of the boom-mounted antenna assembly shown in FIG. 2A.
Figure 2E:
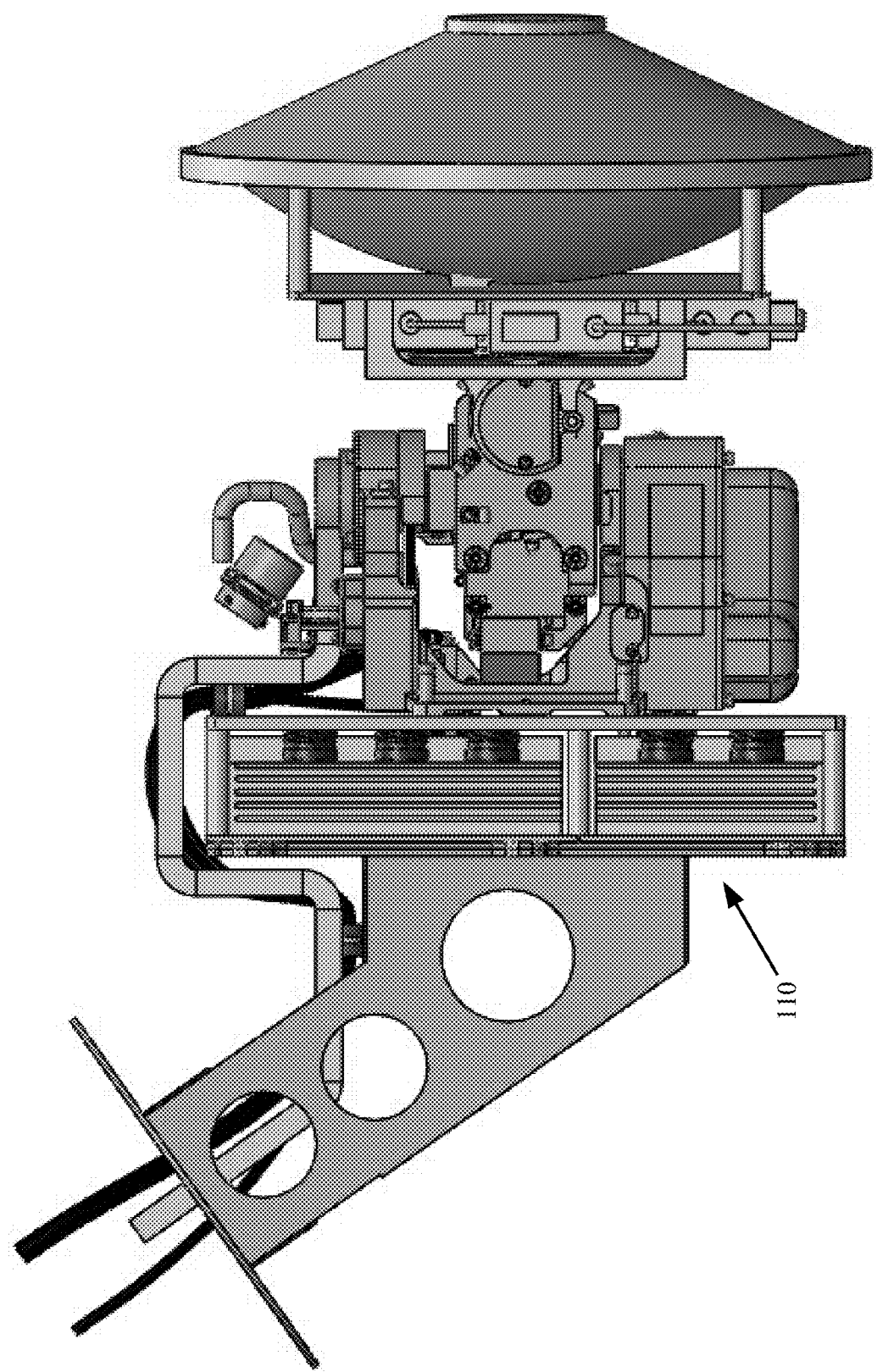
FIG. 2E is a first side view of the boom-mounted antenna assembly shown in FIG. 2A.
Figure 2F:
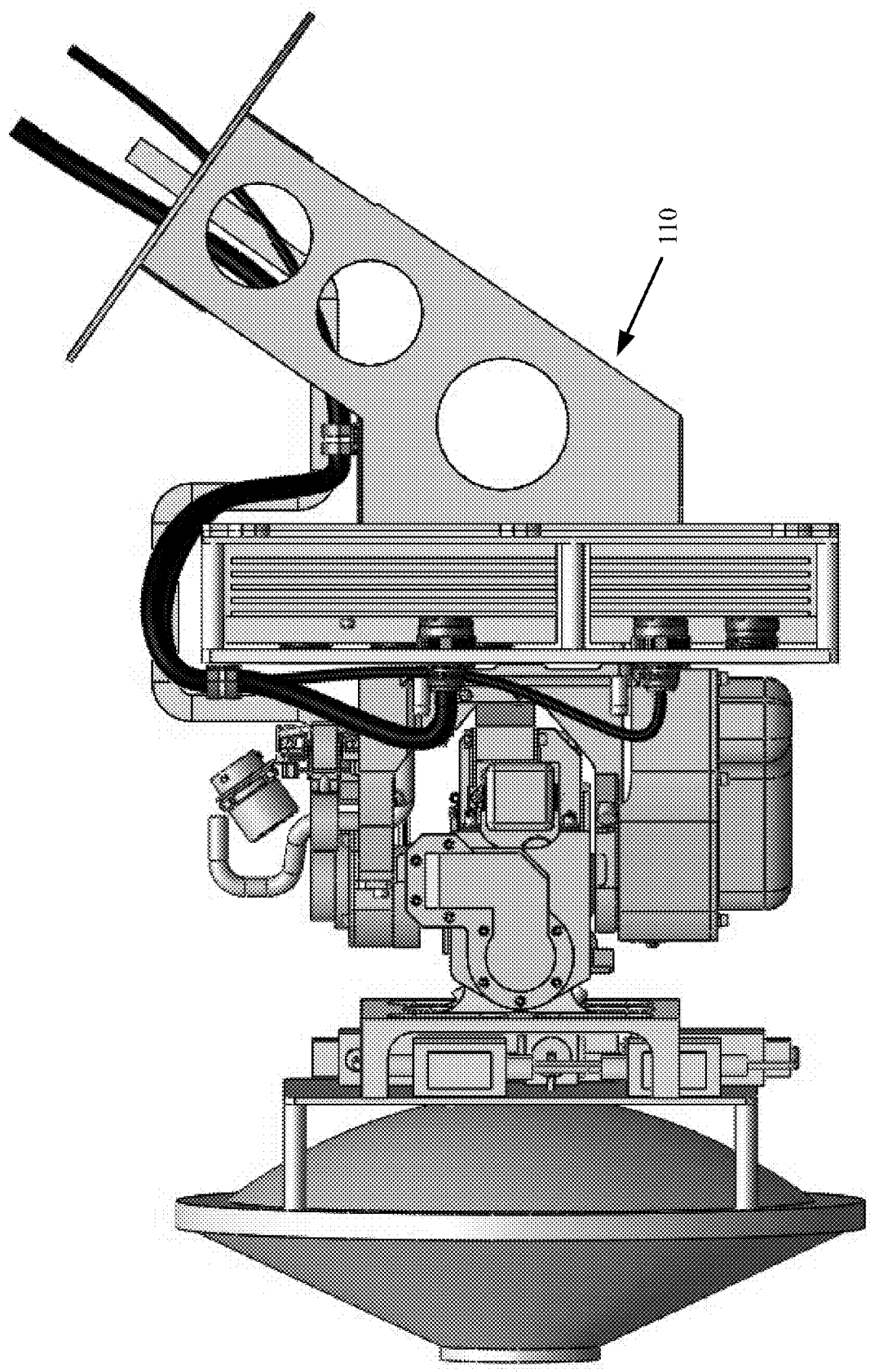
FIG. 2F is a second side view of the boom-mounted antenna assembly shown in FIG. 2A.
Figure 3:
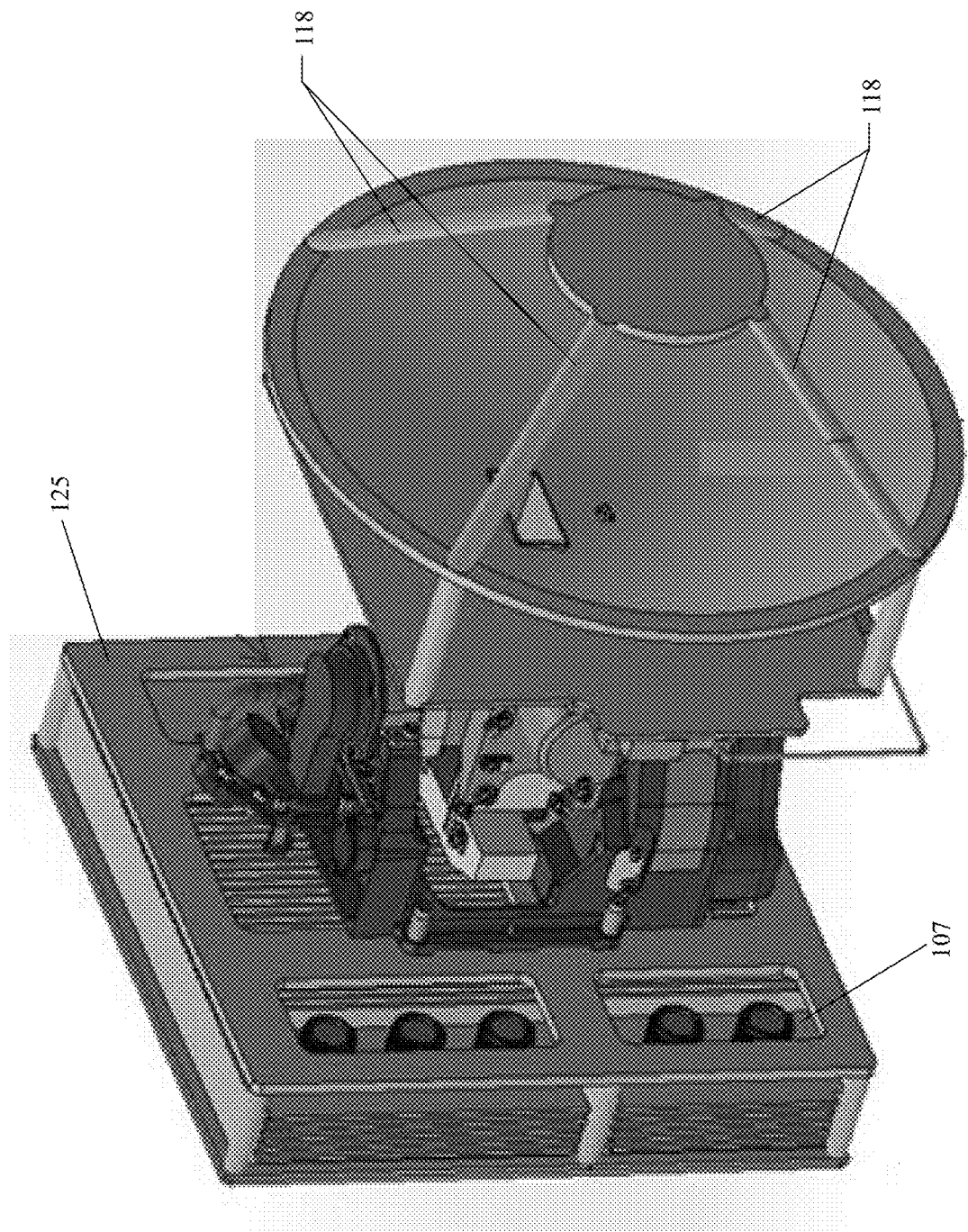
FIG. 3 is a front perspective view of the dual-function antenna assembly utilizing an offset feed arrangement with a pedestal, which may house a signal-image processor.

FIG. 1 illustrates an overall block diagram for a dual-band radar system 100 in accordance with a first embodiment of the present invention. The radar system 100 is configured to accomplish both long-distance weather monitoring using the X Band microwave frequency portion of the electromagnetic (EM) spectrum (e.g., 8.0 to 12.0 GHz), and imaging of terrain/obstacles even in brown-out or white-out conditions, or fog, using the W Band microwave frequency portion of the EM spectrum t e.g., 90 to 98 GHz). Note that the X band frequency range of 9.0 GHz to 9.8 GHz is reserved for radio location, and that weather radar often uses one of the waves in a portion of that frequency range, typically being a wave between 9.305 to 9.380 GHz.

The radar system 100 may include a multi-function display (MFD) 101, a receiver/transmitter (R/T) 102, an attitude heading reference system (AHRS) 103, a control panel 104, a vertical gyro 105, a dual feed cassegrain antenna assembly and mount 110, front end electronics 106, and a signal-image processor 107. At least the dual band (X-Band/W-Band) cassegrain antenna and the dual band radar architecture are novel, as discussed further hereinafter, and which radar system is referred to as a "monostatic" radar in that it receives and transmits using a common antenna.

Figure 4B:
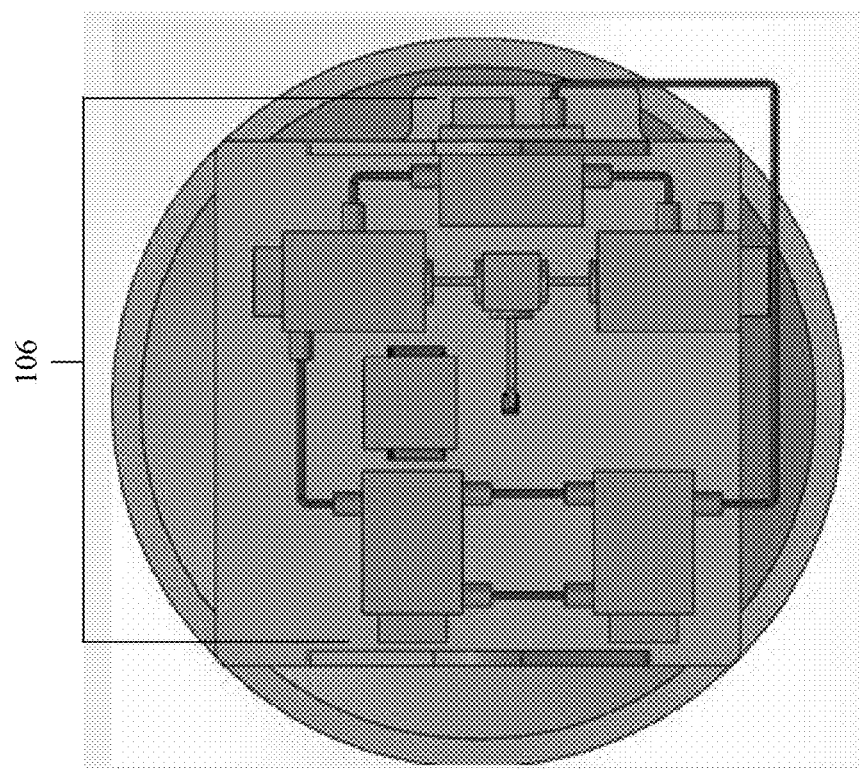
FIG. 4B is a rear view of the pedestal-mounted X Band Weather and W Band Obstacle Imaging Radar of FIG. 2.
Figure 4A:
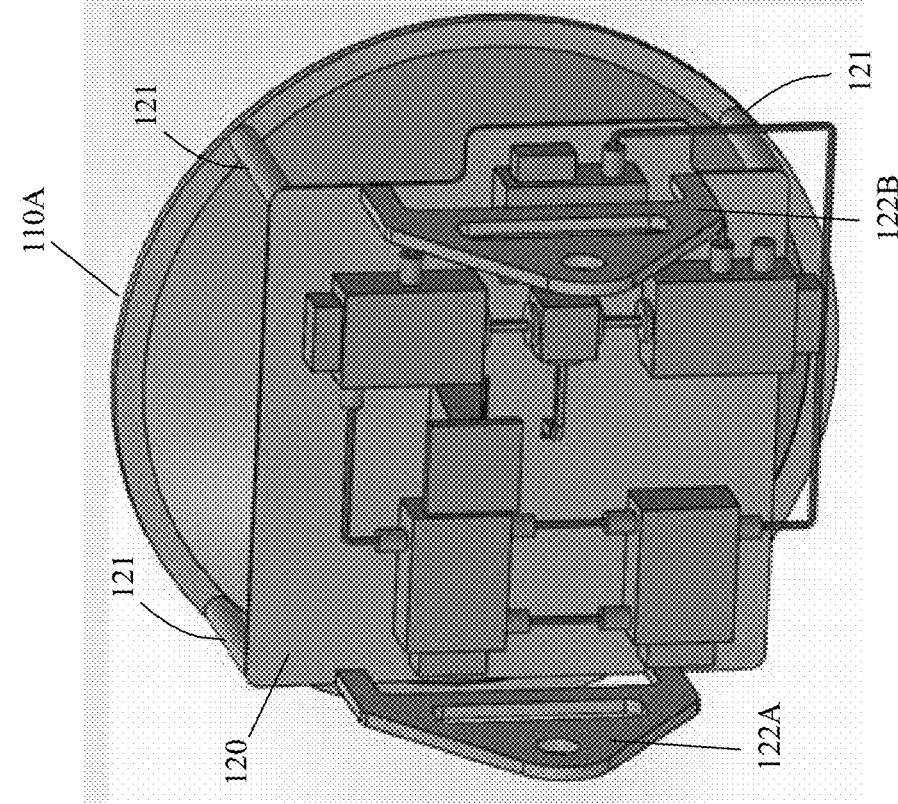
FIG. 4A is a rear perspective view of the pedestal-mounted X Band Weather and W Band Obstacle Imaging Radar of FIG. 2, showing the front-end electronics.
Figure 4C:
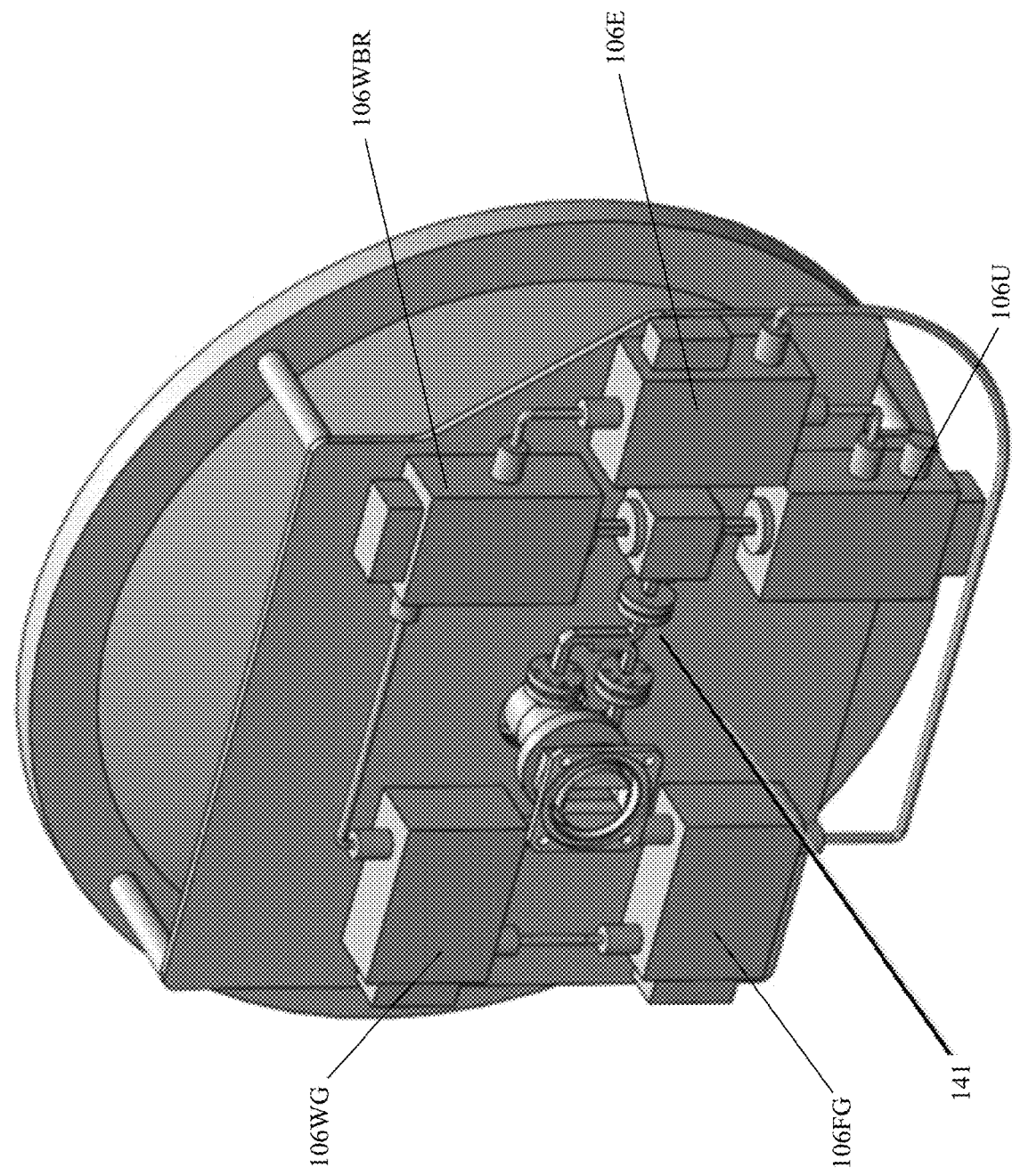
FIG. 4C is the rear perspective view to the view of FIG. 4A, but is enlarged, and shown with the mounting arms removed, and utilizing a concentric feed arrangement.
Figure 4D:
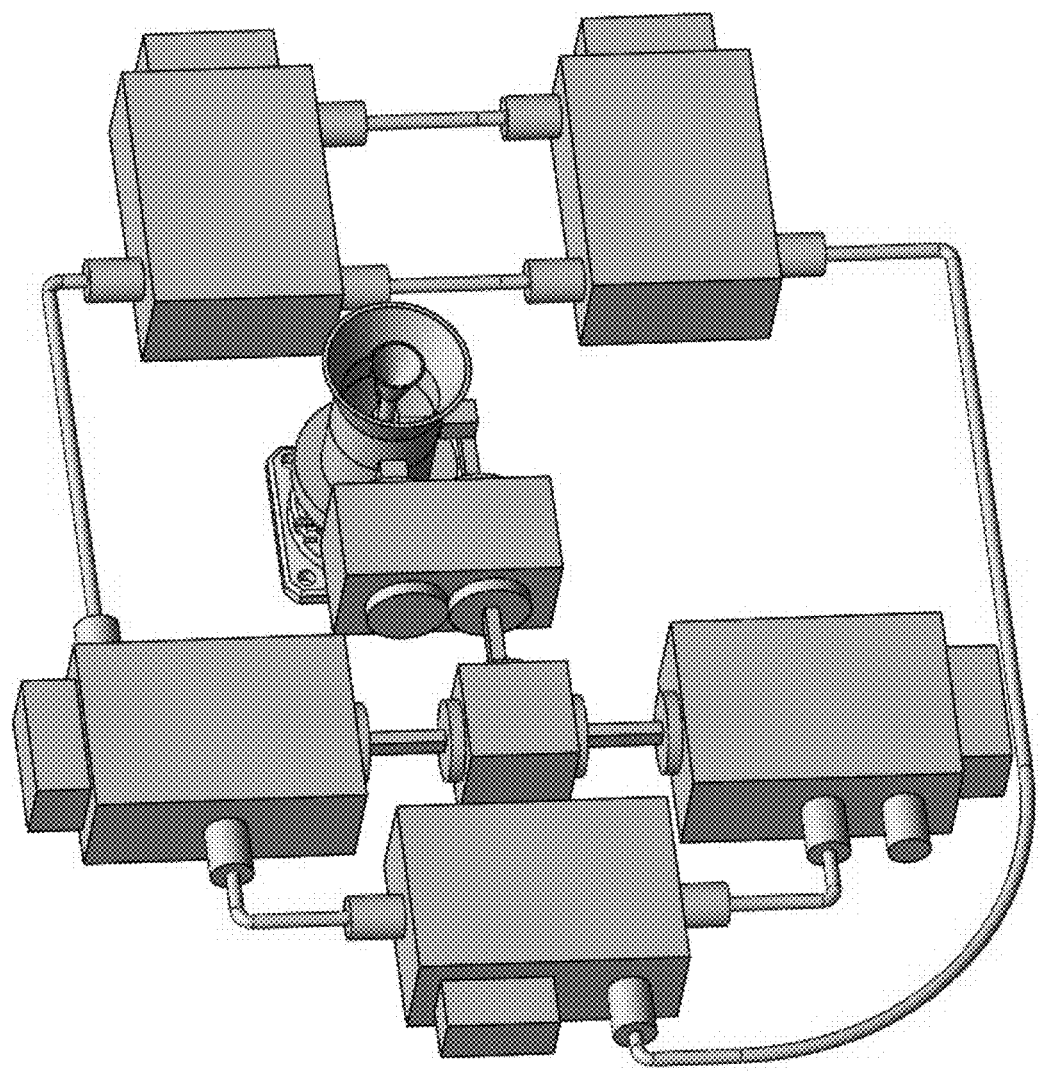
FIG. 4D is another perspective view of the front end electronics shown in FIGS. 4C, but is shown with the concentric feed arrangement of FIG. 9 positioned with respect to the other components, but not mounted to the pedestal and the antenna dish.
Figure 4E:
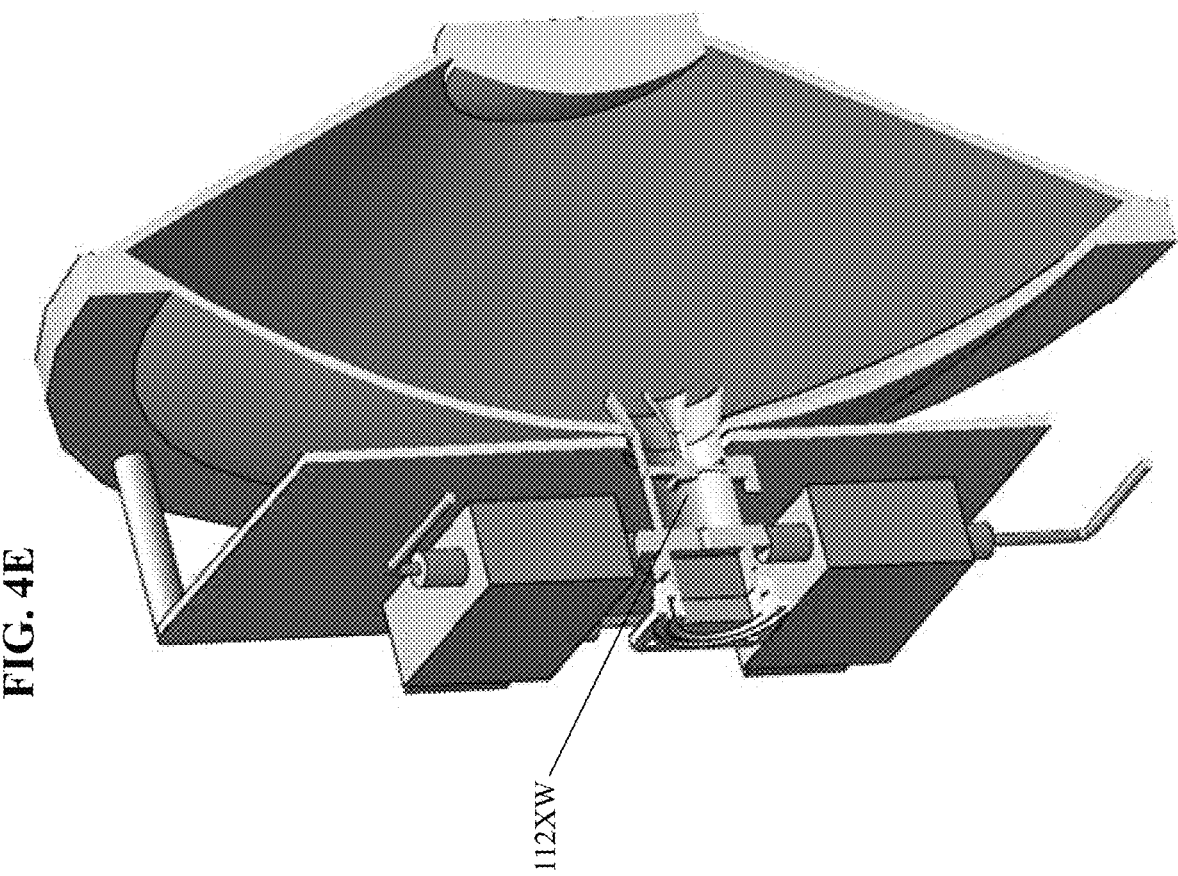
FIG. 4E is a cut-away perspective view of the pedestal-mounted X Band Weather and W Band Obstacle Imaging Radar of FIG. 2 utilizing a concentric feed arrangement.
Figure 4F:
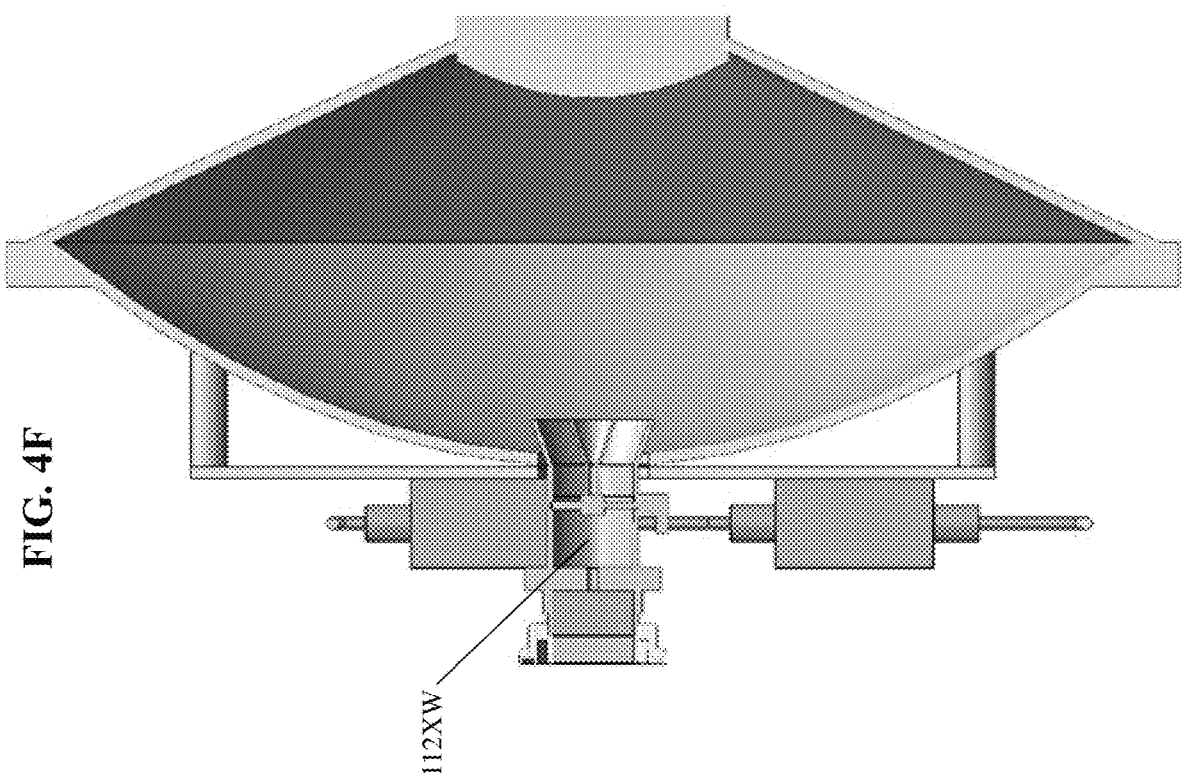
FIG. 4F is a cross-sectional view of the pedestal-mounted X Band Weather and W Band Obstacle Imaging Radar of FIG. 2.
Figure 5A:
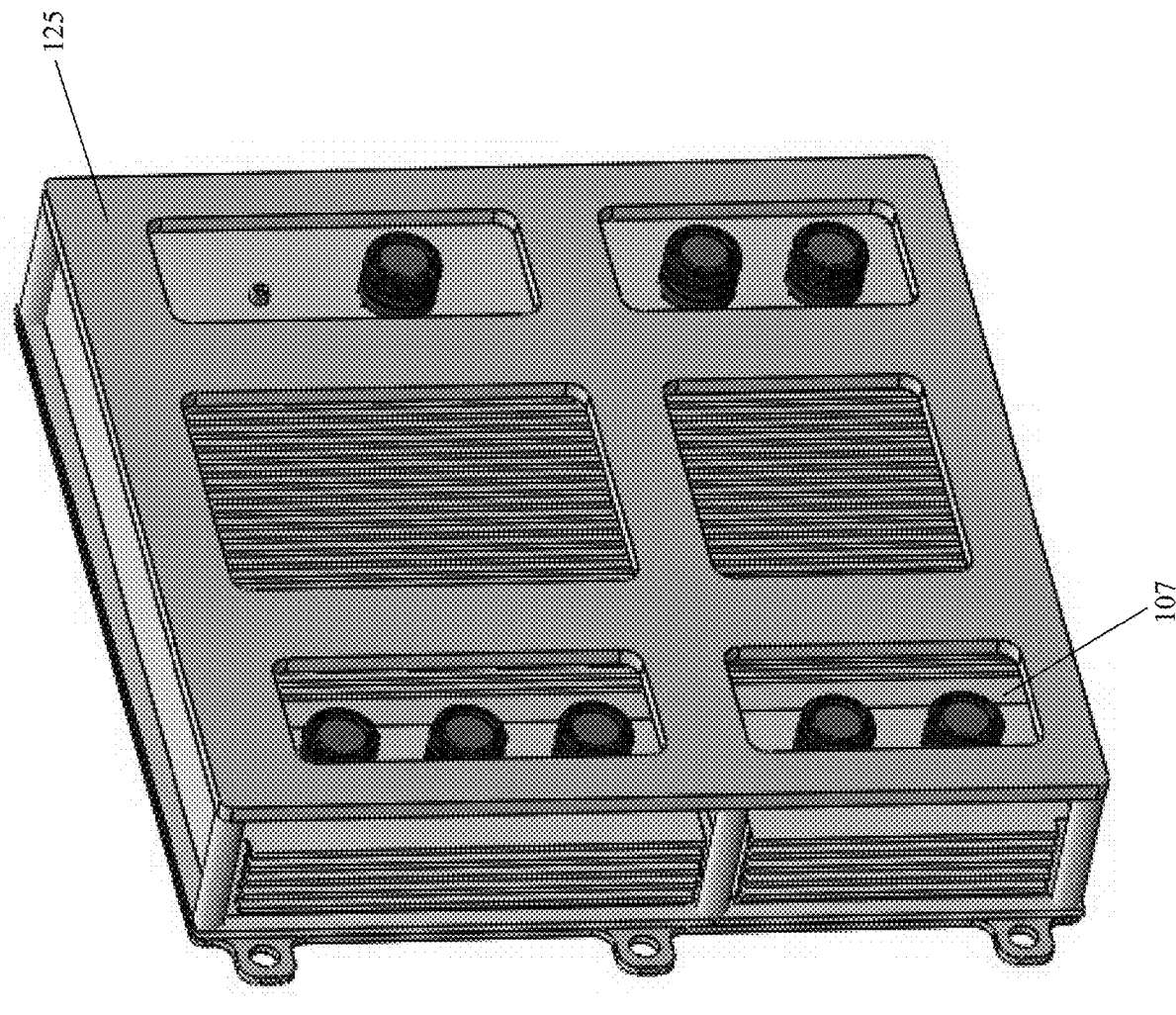
FIG. 5A is a front perspective view of the pedestal that houses the signal-image processor and power supply shown in FIGS. 2A-2F.
Figure 6:
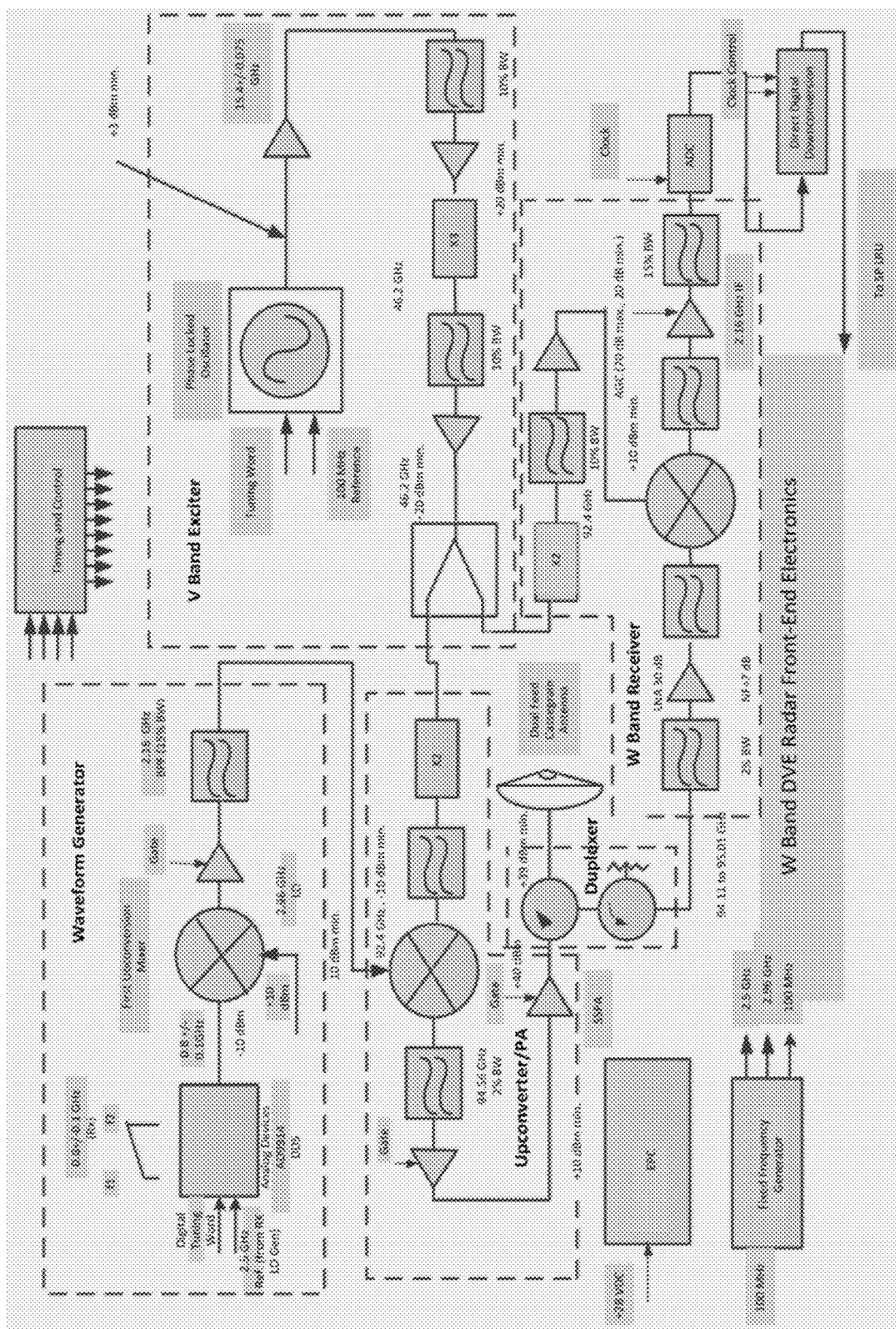
FIG. 6 is a block diagram for the front end electronics shown in FIG. 3A.

Portions of the physical implementation of the antenna and mount 110, and the associated 94 GHz front end electronics 106 may be seen in FIG. 3 and FIGS. 4A-4C, and a functional block diagram is shown in FIG. 6. As seen in FIG. 4C, the front end electronics may include a waveform generator 106WG, a W band receiver 106WBR, an exciter 106E, an upconverter/PA 106U, a frequency generator 106FG, and a duplexer. The waveform generator 106WG generates the baseband linear FM waveform which spans the frequency range 700 to 900 MHz and upconverts it in frequency to a linear frequency modulated (LFM) waveform centered at 2.16 GHz. The exciter 106E is a phase locked dielectric resonator oscillator (PLDRO) synchronized to a 100 MHz reference derived from the frequency generator unit (FGU) and generates a 15.4 GHz tunable reference. The exciter chain employs an X3 multipler that raises the frequency to 46.2 GHz. The upconverter/PA 106U accepts the 46.2 GHz output from the exciter and with a frequency doubler increases the frequency to 92.4 GHz. This signal is then input to a second upconverter which accepts both 92.4 GHz and the output of the waveform generator (2.16 GHz) and produces a signal which is the sum of 92.4 and 2.16 GHz (i.e. 94.56 GHz). This sum frequency is then applied to a power amplifier (PA) chain to produce the radar's 5 Watt peak (TBR) power transmit signal. This signal is applied to the duplexer. The duplexer is a ferrite device that effects a connection between the transmitter output and the antenna during transmit, isolating the antenna from the receiver, and a connection between the antenna and the receiver during receive, isolating the antenna from the transmitter. The W Band Receiver 106WBR accepts the radar return signal and performs the functions of amplification and frequency translation. A single downconversion architecture is used to translate the received frequency from W-Band to 2.16 GHz and from this point the signal is input to a direct downconverter for digitization and signal processing.

The antenna and mount 110, as seen in FIGS. 4A-4C, may include an antenna assembly 110A mounted to a plate 120 using a series of posts 121. The plate may have a first lug 122A and a second lug 122B that may form a clevis arrangement, for movable mounting of the antenna assembly 110A, the plate 120, and the front end electronics 106 with respect to corresponding structure mounted to the pedestal 125.

As noted above, the radar used for military helicopters must have sufficient Raleigh resolution to reliably detect and accurately locate ground-based obstacles, but the typical X Band weather radar cannot accomplish this because it cannot achieve the resolution that is needed to discern these obstacles in the presence of the large background clutter (land, buildings, etc.). The beam characteristics are much too broad, which is a direct consequence of having to keep the antenna size for a weather radar "small" (i.e., typically about 12 in.), to permit the radar to fit in the nose of the aircraft. To achieve the resolution that is needed in a degraded visual environment (DVE), using the X Band Weather Radar frequency, the antenna size would have to be increased to greater than 96 inches (i.e., over 8 ft. long).

The antenna embodiments of the present invention take advantage of the much shorter wavelength at 94 GHz, where the antenna size is effectively reduced by the ratio of the frequencies (9.35/94), so that an antenna as small as 10 inches can provide the needed resolution. W-Band propagation through obscurants (particularly water vapor) is more strongly affected than X-Band propagation through obscurants, but W-Band may be preferable because it offers a good compromise between antenna size, propagation losses (hence detection range), and image interpretability.

Therefore, the antenna assembly for the dual bat d radar system of the present invention may be implemented in two different embodiments. In a first embodiment the feed structure uses two separate horns providing separate feeds near the main dish's vertex, as illustrated in FIG. 7, and in a second embodiment the feed structure uses a concentric dual feed horn arrangement shown in FIG. 9.

As seen in FIG. 7, the first embodiment in the form of antenna assembly 111 may include at least a concave main parabolic reflector dish 115, a sub-reflector 116, a sub-reflector mount 117 (which may be integrally formed with the sub-reflector itself), a plurality of (e.g., four) sub-reflector support members 118 (see FIG. 3), an e-glass conical cover (radome) 118R mounted to the sub-reflector support members and a rim brace, a feed support structure 119, and a feed structure. For the first embodiment, the small size of the parabolic reflector 115 (e.g., having a 12 inch aperture) may result from the dual feed arrangement for the X Band and the W Band signals. The parabolic reflector 115 that is common to both the X Band weather radar signal transmission and the W Band obstacle imaging radar signal requires no appreciable increase in physical volume, which is critical to the air-framer and the radar integrator. In this embodiment an X-Band waveguide horn 112X and W-Band waveguide horn 112W are placed side-by-side, proximate to, but not right at, the vertex of the parabolic reflector 115. The energy from each band is directed at the subreflector of the cassegrain antenna, and the reflections are then directed to the parabolic dish which focuses the energy, and may Form a spherically shaped beam.

Figure 9:
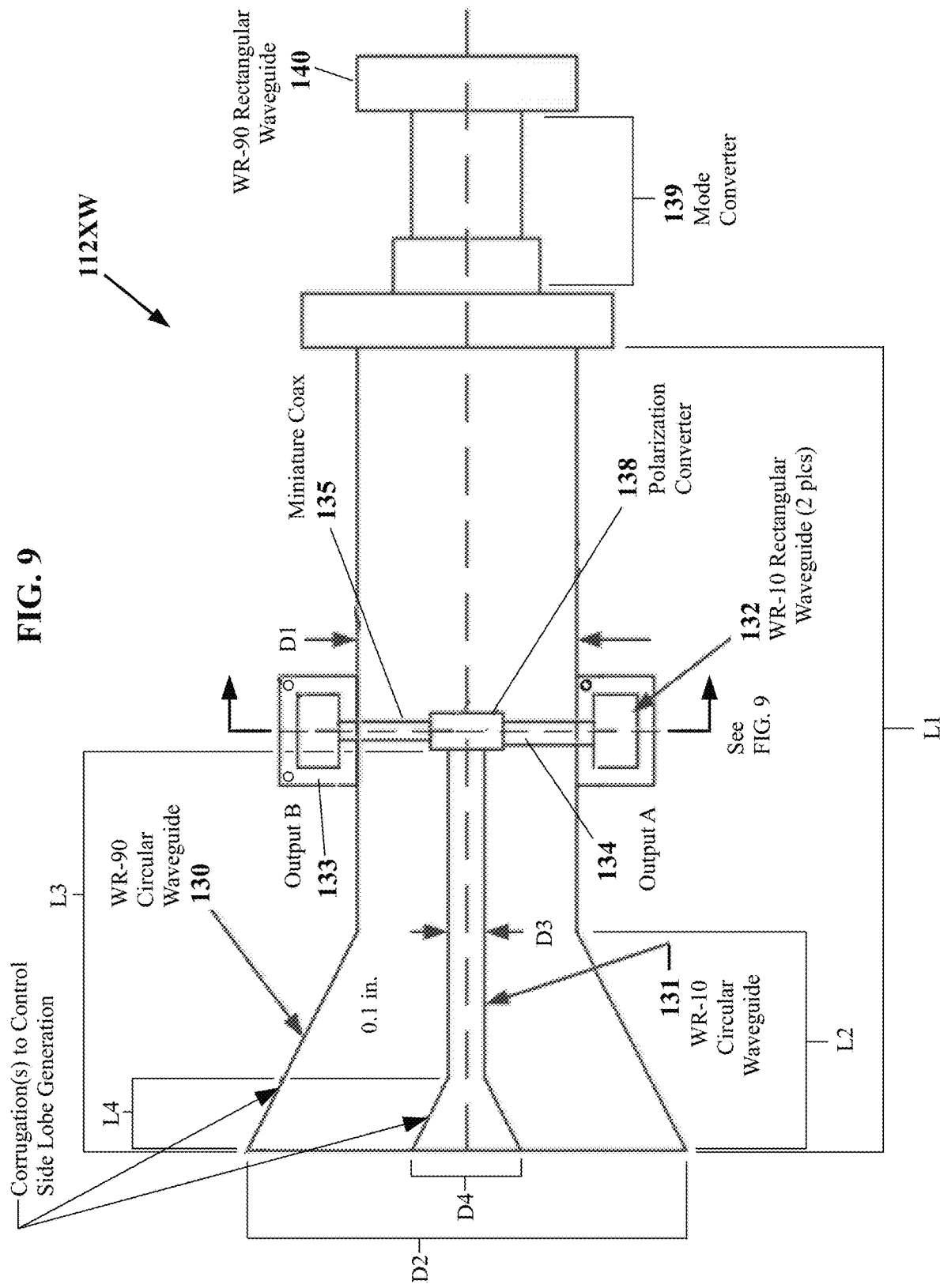
FIG. 9 is a concentric waveguide arrangement that may be used with the antenna shown in FIG. 7, instead of the side-by-side waveguides.
Figure 10:
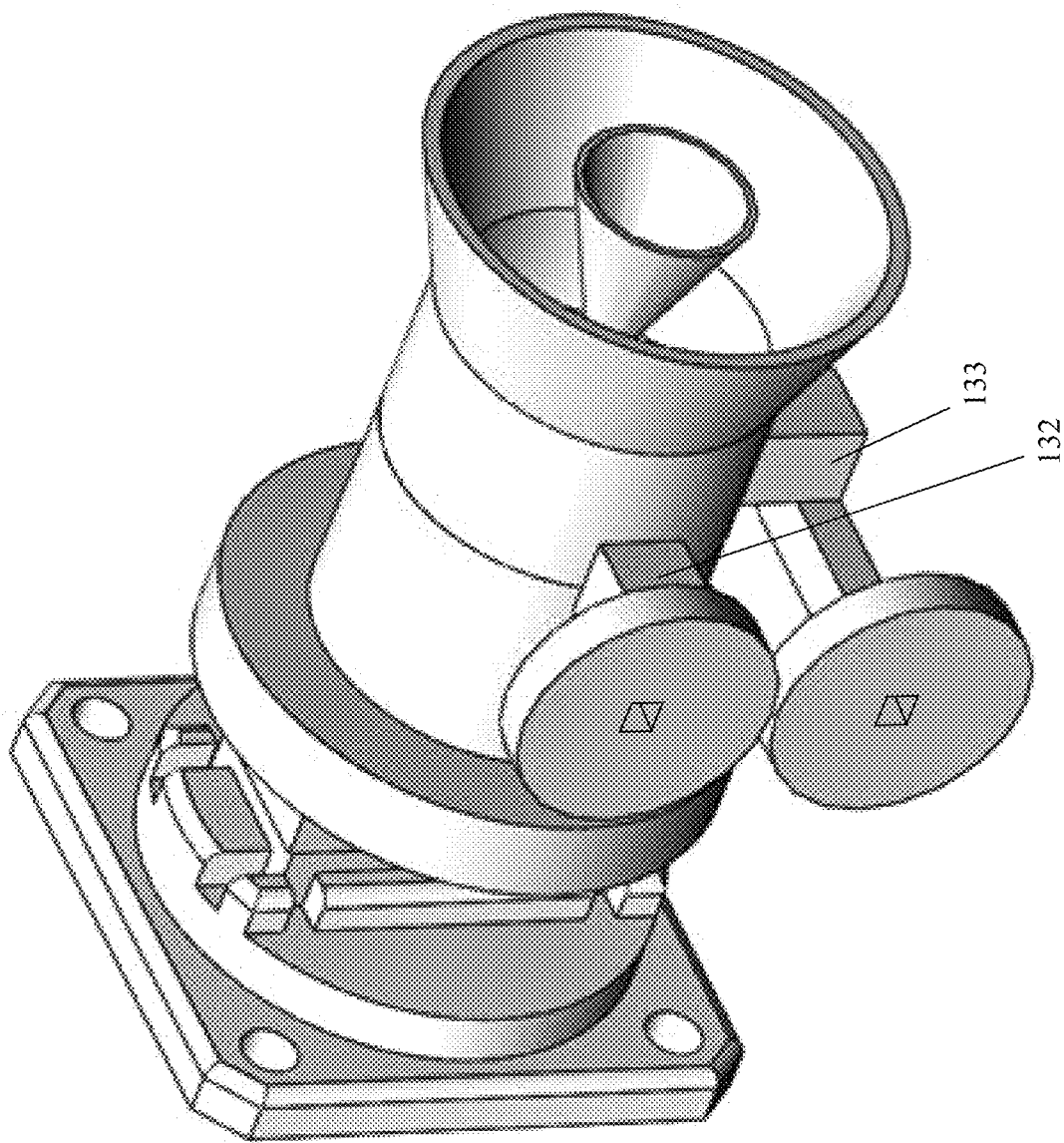
FIG. 10 is a perspective view of the concentric waveguide arrangement of FIG. 9.
Figure 11B:
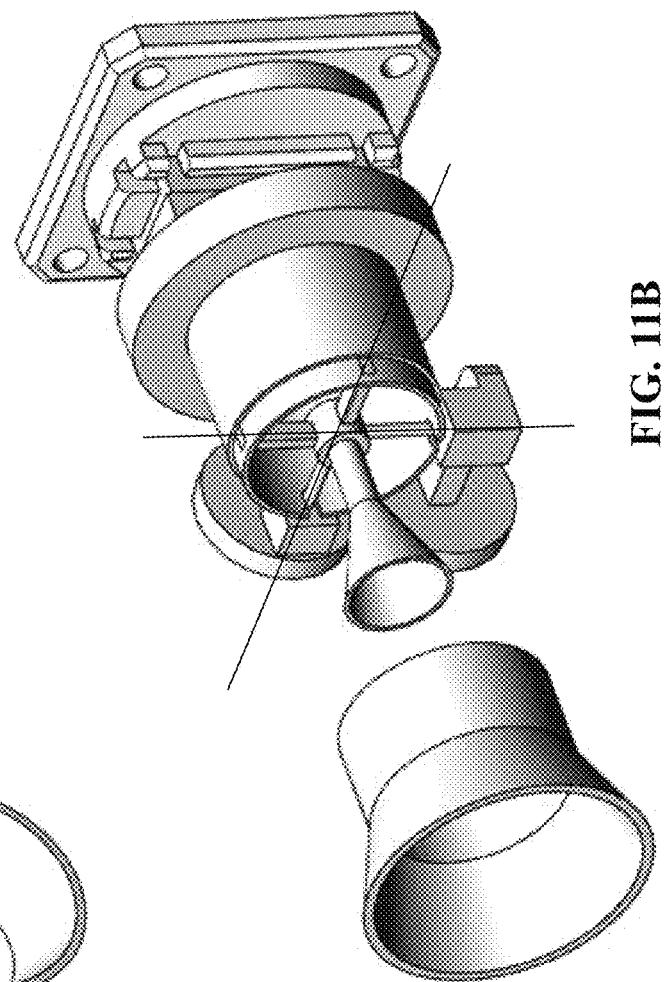
FIG. 11B is a reverse perspective view of the waveguide arrangement with the WR-90 waveguide partially removed, as seen in FIG. 11A.

The second antenna assembly may be formed the same as antenna assembly 111, except that a key element of the second embodiment is that the separate X-Band waveguide horn 112X and W-Band waveguide horn 112W are replaced by a dual band concentric feed structure assembly 112XW, as seen in detail within FIG. 9, which may be positioned at the vertex of a parabolic reflector formed to receive it (see e.g., FIG. 11B). The dual band concentric feed structure assembly 112XW serves both as the collection point and the dissemination point for W Band and X Band electromagnetic energy. The dual band concentric feed structure 112XW as illustrated in FIG. 10 generates W Band circularly polarized waves (optimum for penetration through rain and snow for imaging obstacles in the landing area), and also generates horizontally-polarized X Band waves for detection of weather events.

In certain respects, the first embodiment using the side-by-side X Band and W Band waveguide horns 100 and 110W may be a lesser performing approach, because the feed structure may include having the X-Band and W-Band waveguide horns placed side-by-side being proximate to, but not right at, the vertex of the concave main parabolic reflector dish. This may result in non-optimum antenna performance due to spill-over losses, because a significant percentage of the electromagnetic energy is not captured by the waveguide horn(s), because it falls outside of their respective capture areas.

The second waveguide embodiment—the dual band concentric feed structure assembly 112XW—may thus offer superior performance over the two separate feeds because its feed placements are optimally positioned at the dish's vertex, and may result in beam widths both in azimuth and elevation of 0.75 degrees (one way).

Figure 11A:
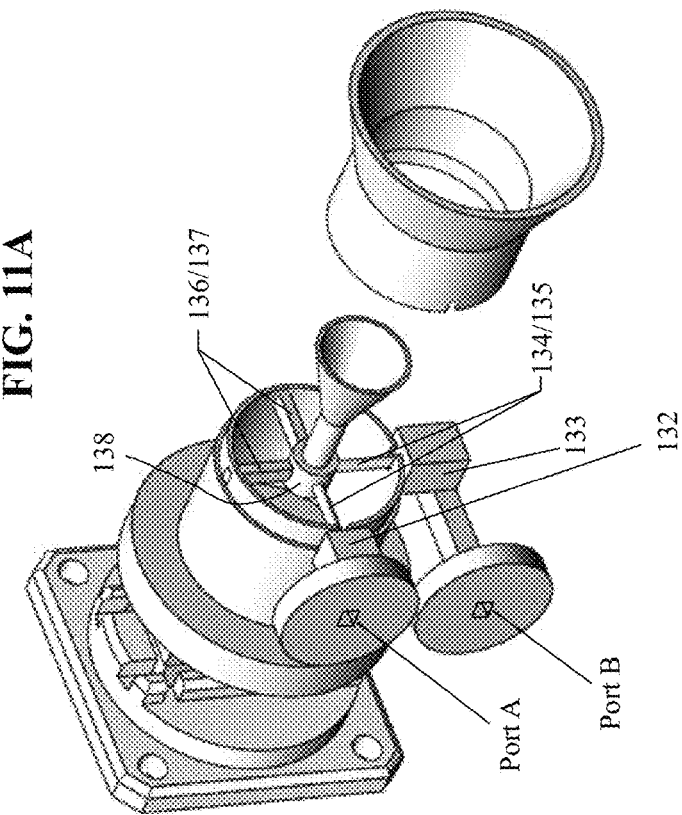
FIG. 11A is the perspective view of FIG. 10, showing the concentric waveguide arrangement, but with a portion of the WE-90 waveguide removed.

The dual band concentric feed structure 112XW includes a particularly arranged and formed waveguide within a waveguide. The dual band concentric feed structure 112XW may be formed to include an outer waveguide 130 (a WR-90 circular waveguide that delivers the X-band energy), v which mat support a first WR-10 rectangular waveguide 132 that provides Output A, and a second WR-10 rectangular waveguide 133 that provides Output B, which output to coaxial cables coupled to a polarization converter 138 positioned at the rear end of an inner waveguide 131—a WR-10 circular wave guide that delivers the W-band energy. The polarization converter 138 resolves the circularly polarized W-Band wave into two orthogonal linearly polarized waves during reception, and converts the two orthogonal linearly polarized waves into the circularly polarized W-Band waves during transmission of the radar signal. Note that the second WR-10 rectangular waveguide 133 is shown rotated into the plane of the page to be 180 degrees apart from the first rectangular waveguide 132 in FIG. 9 merely to better illustrate the connections to the polarization converter 138, but as discussed hereinafter they may instead be clocked 90 degrees apart with respect to the axial direction of the concentric wave guides—see FIG. 11A. Use of angles other than 90 degrees (e.g., 110 degrees) may be used (see FIG. 12), however the coxial cables coupled to those waveguides must still be oriented 90 degrees apart otherwise it will result in distortions to the transmitted polarization and attenuation of the signal.

The lengths/diameters of the cylindrical and flared portions of both the outer WR-90 circular waveguide 130 and the nested inner WR-10 circular waveguide 131, are significant in that these dimensions determine the illumination taper and spillover loss of the antenna feeds. The latter has a strong influence on antenna efficiency. Both factors have a large influence on the gain and sidelobe levels of the antenna which are critical system design parameters. The lengths/diameters also have an impact on the feed's impedance transformation function as well as the feed's directivity. Therefore, there is a complex set of tradeoffs based on the dimensions used. In one embodiment, the dimensions for the WR-90 circular waveguide 130 and the WR-10 circular waveguide 131 may fall within the following ranges. L1: 4.0 to 6.0 inches L2: 2.0 to 3.0 inches; L3: 2.5 to 3.5 inches; L4: 0.3 to 0.9; D1: 0.8 to 1.0 inches; D2: 2.0 to 2.6 inches; D3: 0.09 to 1.1 inches between XX and YY; and D4: 0.3 to 0.6 inches.

A mode converter 139 and a WR-90 rectangular waveguide 140 may be positioned at the rear of the waveguide 130. The mode converter 139 converts, via a waveguide taper, the WR-90 circular waveguide's TE11 (dominant) mode to the TE10 dominant mode required for propagation in the WR-90 rectangular waveguide section. The WR-90 rectangular waveguide section serves as the input/output to the X-Band weather radar. Each waveguide may be viewed as an aperture or collector of energy appearing in its specific band of operation. Energy outside its band of operation is reflected back into space. The particular configuration of the dual band concentric feed structure 110B takes advantage of the very large (nearly 10:1) frequency separation (94 GHz vs. 9.35 GHz) to minimize blockage of energy at 9.35 GHz from entering the WR-90 waveguide. The inner diameter D1 of the waveguide 139 shown in FIG. 9 may be 0.9 inches. The outer diameter D3 of the waveguide 131 may be about a tenth of an inch (e.g., 0.104 inches in FIG. 9). Although there is a small blockage introduced by the waveguide 131; it is minimal. A quantitative appreciation of the impact may be arrived by looking at the ratio of the particular aperture areas, neglecting for the moment the flared portions of the waveguides that are introduced to match the waveguide impedance to the free space impedance of 377 Ohms. The ratio of the two (circular) aperture areas (e.g., $\pi(0.9)^2/4=0.64$ sq. in; and $\pi(0.1)^2/4=0.008$) exceeds 80. Therefore, the blockage introduced by the waveguide 131 reduces the aperture area of the waveguide 139 only by approximately 1%. The aperture efficiency of the waveguide 130 is therefore virtually unaffected by the presence of the waveguide 131; although the aperture area is but one of several considerations.

Figure 12:
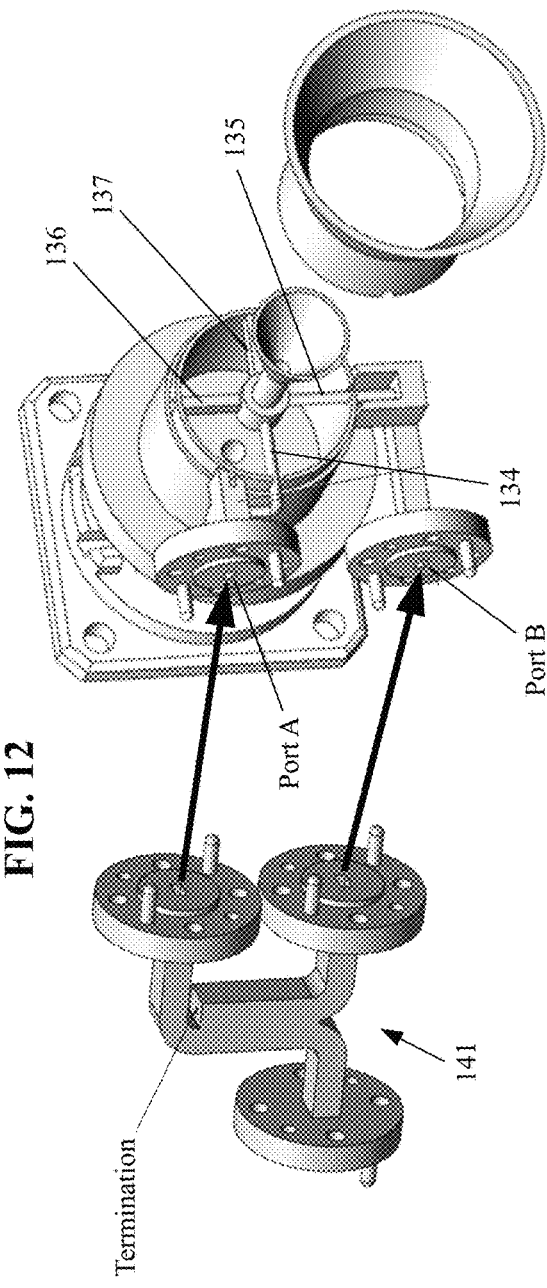
FIG. 12 is an exploded view showing the waveguide arrangement of FIG. 11A prior to coupling thereto of the quadrature combiner.
Figure 14:
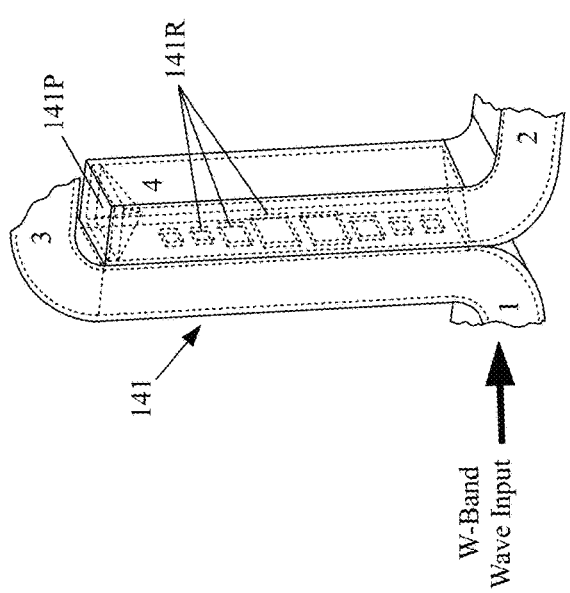
FIG. 14 is an enlarged detail view showing the interior of the quadrature combiner of FIG. 12.

Prior to the waves reaching the flaired portions of the waveguide openings (i.e., approximately midway along the structure's length L1 appear to be "spokes" emanating from the waveguide 130, which are actually miniature coaxial cables. One end of these coaxial cables 134/135 penetrate the walls of the WR-90 waveguide, and the other end enters the WR-10 rectangular waveguide. The coaxial cables may preferably be the commerically available UT-034-25, being chosen for its ultra-small diameter (typically 34 mils) to minimize blockage and field disturbances within the waveguide and to ensure single mode-TEM (Transverse Electromagnetic Mode) propagation within the coaxial cable at W-Band. There may preferably be two WR-10 rectangular waveguides 131 that may be tangentially affixed to the WR-90 waveguide's outer surface, and a minimum of two spokes, each of which may be 0.025 inches in diameter. The miniature coaxial cables transfer energy from the WR-10 circular waveguide 131 to the two exterior WR-10 rectangular waveguides 132/133. One, possibly two additional spokes 136/137 (see FIG. 12) may be needed for structural support of the WR-10 Waveguide. These supports may be fabricated from a dielectric material such as low loss rexolite. Each of the first, second, third, and fourth spokes (134/135/136/137) may be equally spaced, being clocked at an angle of 90 degrees to an adjacent spoke, and a central axis of each spoke may be positioned to be substantially coplanar (see FIG. 14). Note that as seen in FIG. 12, the coaxial cables 134/135 of the first and second spokes may be cylindrical, while the third and fourth spokes 136/137 may have a rectangular cross-sectional shape, or the third and fourth spokes may instead be cylindrical having a circular cross-sectional shape.

The coaxial cables 134/135 of these spokes form electrical discontinuities in the path of the energy propagating within the WR-90 waveguide 130. Therefore, their presence will necessarily result in a small percentage of the energy being reflected back and/or being dissipated. A provision for suppressing the effects of these discontinuities may be accomplished by introducing a compensating discontinuity placed approximately one quarter of a wavelength distant. A compensating discontinuity can take the form of a post emanating from the WR-90 waveguide 130 all having a controlled length and diameter. The post's length and diameter are selected to introduce a susceptance that is equal in magnitude to the magnitude of the discontinuity (the four posts including the two coaxial cables) and with the same sign (e.g., positive if the discontinuity is capacitive, negative if the discontinuity is inductive). By displacing the tuning post a distance $\lambda/4$ away from the discontinuity (that is, to the left and to the right of the discontinuity and where $\lambda$ is the guide wavelength), the susceptances which are equal in magnitude and opposite in sign cancel each other, maximizing energy flow. The tuning post may be a cylinder that can take the form of a small diameter screw. The screw penetrates the wall of the waveguide through a threaded hole in the waveguide wall. Controlling the degree of penetration and screw diameter allows control of both the magnitude and the sign of the compensating susceptance. In general, the diameter of the screw uesed for the tuning post may be roughly the same diamater as the coaxial cables, and may, prior to being adjusted inwardly or outwardly, penetrate the wall roughly to the same depth as the coaxial cable (see FIG. 20).

Figure 13:
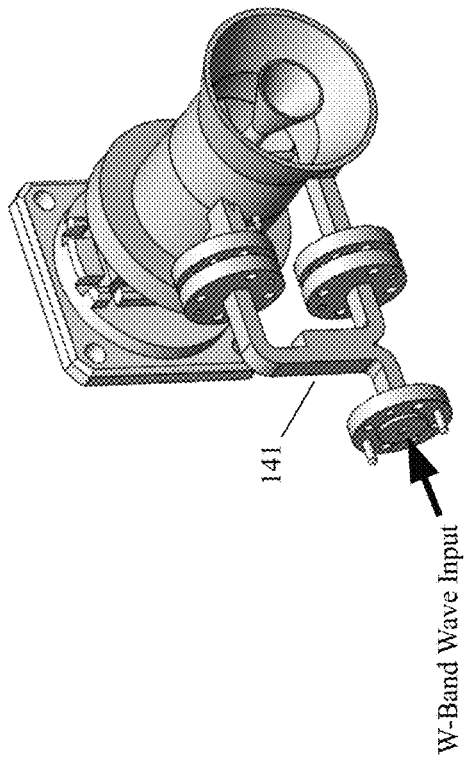
FIG. 13 is the view of FIG. 12 shown after coupling of the quadrature combiner to the waveguide arrangement.

A novel aspect of this design is the method employed to transfer further processing of the energy collected by the WR-10 circular waveguide 131 to the tangentially-mounted WR-10 rectangular waveguides 132/133. The WR-90 circular waveguide 130 (see e.g., FIGS. 12-14) is split into two concentric pieces at the center of the spoke. Hemispherical slots are machined into both pieces of the WR-90 waveguide. The openings are sized precisely to accept and capture the spokes and immobilize them. The two WR-90 waveguide pieces have mating steps machined into their circumferences (one with an inner step and the other with an outer step) to allow one WR-90 waveguide piece to be inserted into the second WR-90 waveguide piece. The steps are toleranced to achieve an interference fit.

Another novel aspect of the design is the use of E-plane probes (i.e., probes 134i 134ii, 135i, and 135Eii—see FIG. 16) that are attached to the center conductor of the miniature coaxial cables (134/135) at both the WR-10 circular waveguide-cable transition and at the WR-10 rectangular waveguide transition. The base material for each of the probes includes, but is not limited to, copper, which may be plated to passivate its surface to prevent corrosion. The copper alloy may be preferred for several reasons, among them being that when it is machined to its final shape, it is not "buttery", allowing achievement of the critical tolerances that are needed.

Figure 9A:
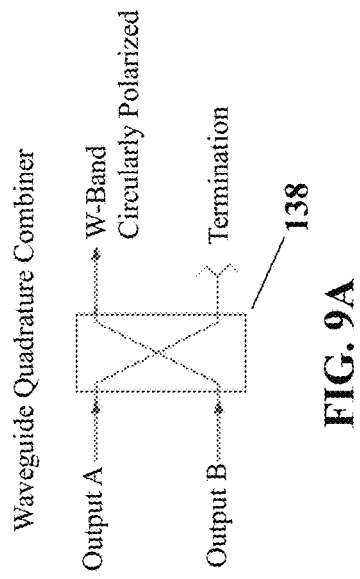
FIG. 9A is a schematic illustration showing the quadrature combiner which derives two W-Band signals of equal power but which differ in electrical phase by 90 degrees which are then input to the concentric feed arrangement illustrated in FIG. 9 to generate circularly polarized waves.
Figure 9B:
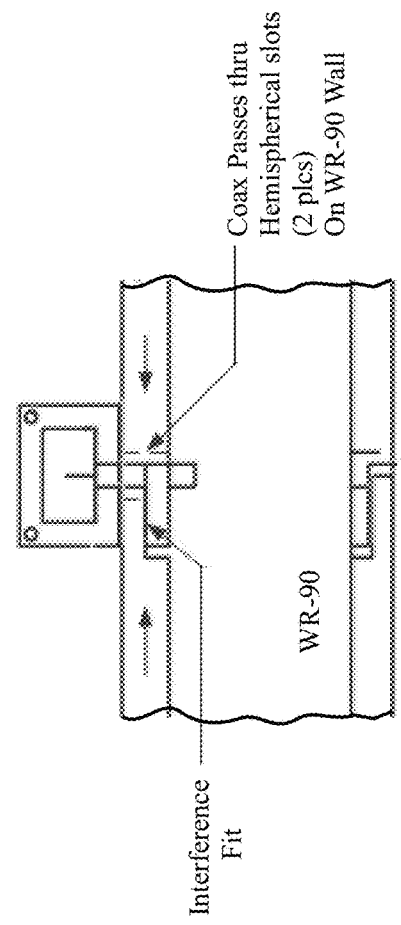
FIG. 9B is a cross-sectional view through the concentric waveguide arrangement of FIG. 9.

As seen in FIGS. 15 and 16, the coaxial cables enter the WR-10 rectangular waveguides and terminate in structures referred to as E-Plane monopoles (probes). The E-plane probes transform the coaxial cable's TEM mode to the WR-10 rectangular waveguide's dominant mode, the TE10 mode. As seen in FIG. 17, the side of the c-plane probes are located a distance (the backshort distance) away from the inner wall of the waveguide that is one-quarter of a wavelength, to ensure that the probe impedance is as designed. The dimension(s) (e.g., 0.05 inches) is/are chosen to ensure that an infinite impedance is transformed from the backshort to the probe's location. It should be mentioned that the WR-10 waveguide 131 of the concentric feed is designed to generate (and receive) circularly polarized waves. To achieve this the two active spokes are spatially placed 90 degrees apart cirumferentially as are the rectangular waveguides (see FIG. 12 and FIG. 1) and electrically driven by equal amplitude waves that differ in phase by 90 degrees relative to each other. Each spoke produces a linearly polarized wave: one spoke produces a horizontally polarized wave and the other produces a vertically polarized wave. The two orthogonal waves enter the polarization converter 138 to derive the circularly polarized wave, as illustrated in FIG. 9A.

The two E-Plane probes are physically displaced precisely 90 degrees apart. The probes (each referred to as an "E-Plane probe)" since they are at right angles to the circular waveguide axis of rotation) transform the coaxial cable's TEM mode to a TE11 mode, the circular waveguide's dominant mode.

The quadrature combiner 141 (FIG. 12) consists of two sections of WR-10 waveguide, each having length equal to λ4 where λ is the guide wavelength, in close proximity to one another. A series of particularly sized and shaped perforations (apertures) 141R (e.g., eight perforations) are introduced into the broadwall between each waveguide section (see FIG. 14) to allow energy to freely couple from one waveguide to the other. Aperture dimensions are chosen to allow 50%+/− of the energy to couple from one waveguide to the adjacent waveguide, to form a particular backward-wave 3 dB coupler. The structure has directional properties which direct the flow of energy from its input at port 1 (see FIG. 12) toward the coupler's output (ports 2 and 3), and away from the coupler's isolated port 4, which may have a pyramidal structure 141P formed therein and configured to reduce the reflection of electromagnetic energy and, instead, maximize the absorption of electromagnetic energy which is the purpose of the termination. The material used for the pyramidal structure 141P may be a microwave absorber stock sold under the trade name of Radite 75, which was trademarked by the Radar Design corporation of New York. For this reason it is also commonly referred to as a "directional" (3 dB) coupler.

A flange adjoined to each of the WR-10 Rectangular waveguides 132/133 (FIG. 12) may have a plurality of holes therein, to receive mounting fasteners for securing the quadrature combiner 141 thereto. The flanges may also have at least two alignment pins protruding outwardly, which may be received within corresponding openings in the flange of the quadrature combiner 141 (which may similarly have alignment pins protruding from its flange), to ensure that the openings in the small cross section of the waveguides are perfectly aligned with each other.

The waveguides may be made of standard materials including brass, copper and aluminum. Since these materials are very active galvanically, passivations such as plating or alodyne (Iridite) for aluminum waveguides may be used to prevent corrosion. The waveguide wall thickness is generally equal to or less than 0.1 inches.

Figure 31:
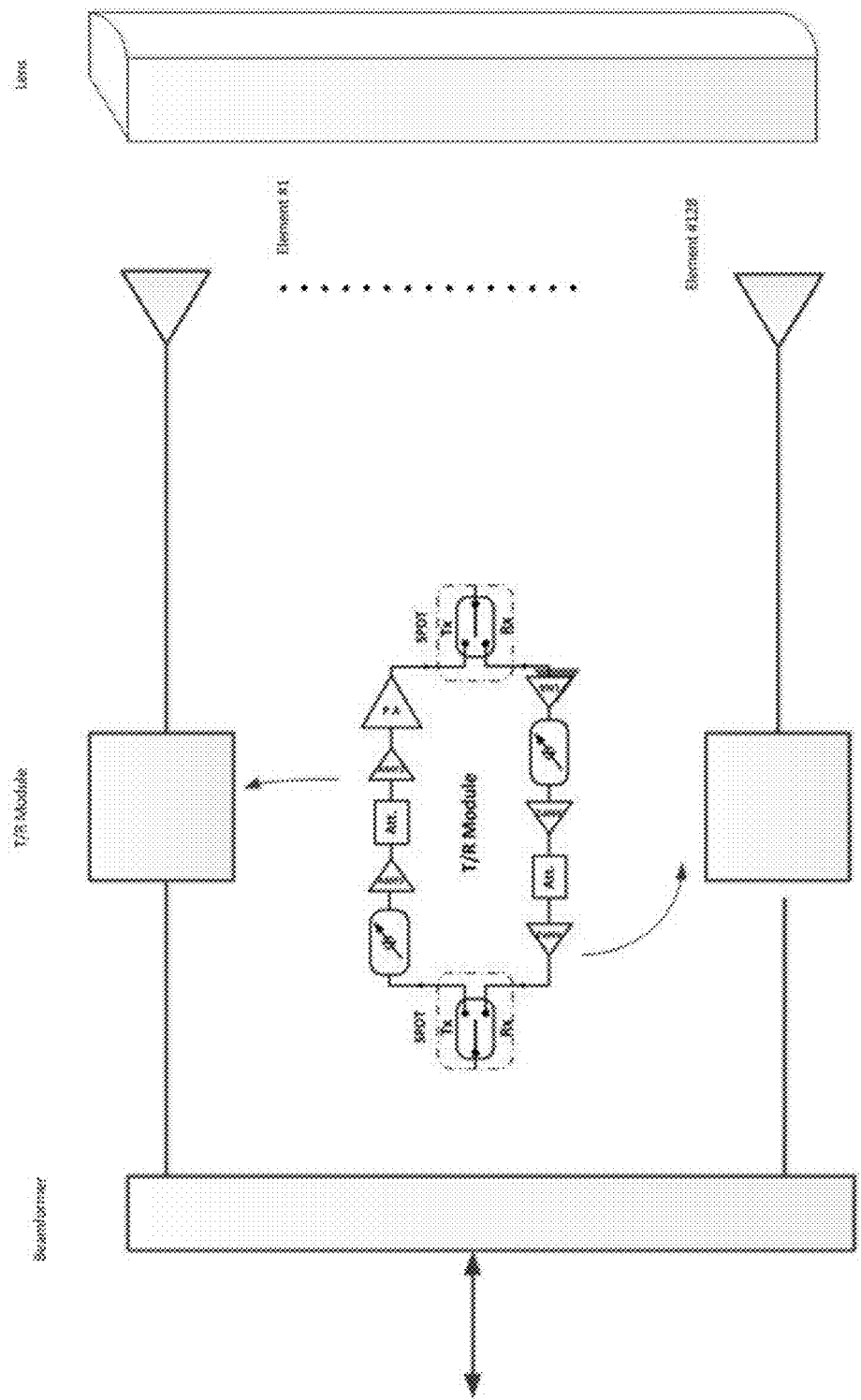
FIG. 31 illustrates a second electronic scanning architecture that may be used for the dual function X Band Weather and W Band Obstacle Imaging Radar of FIG. 2, to improve the refresh rate.
Figure 32:
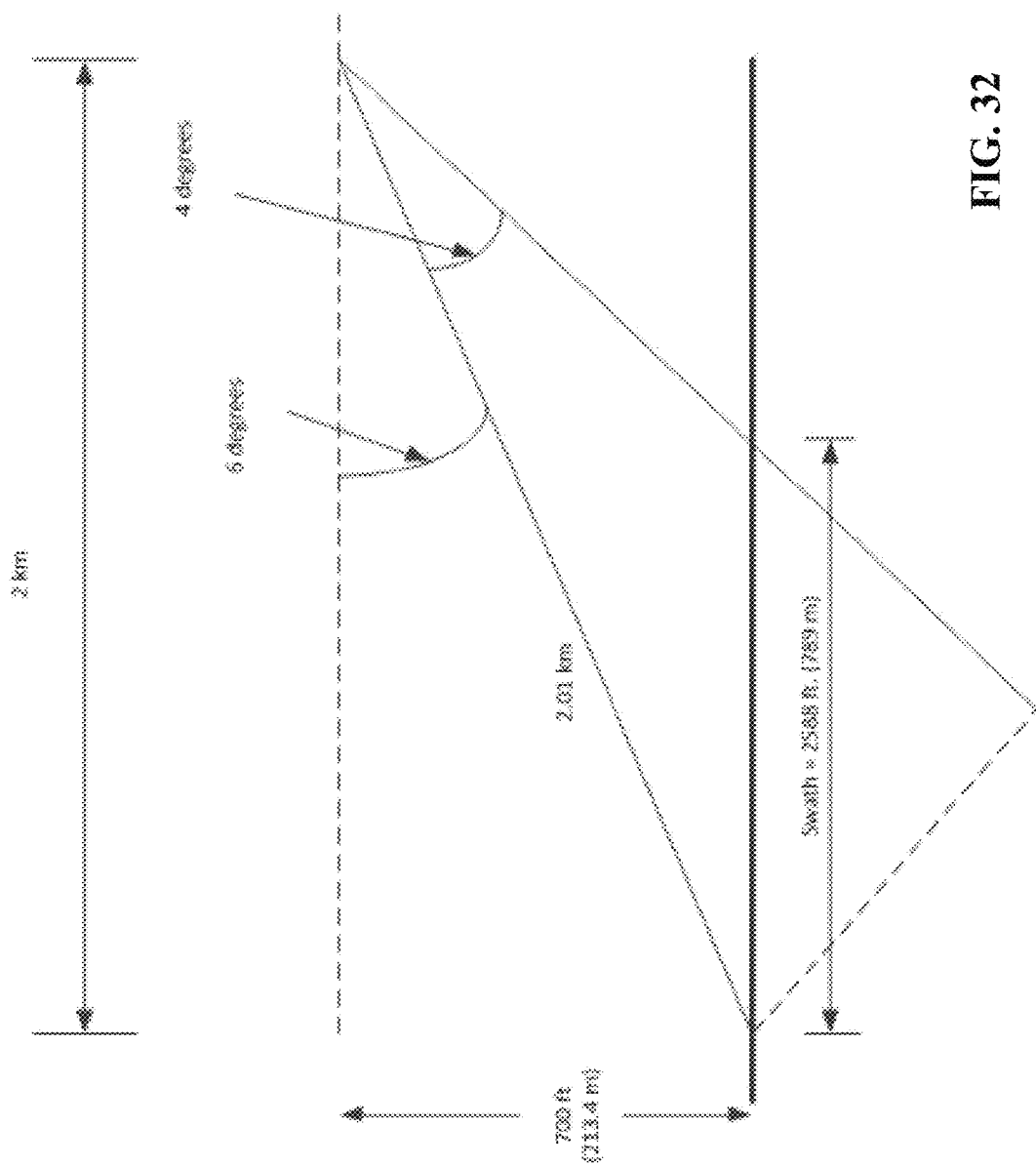
FIG. 32 illustrates sampling geometry for the dual function X Band Weather Radar and W Band Obstacle Imaging Radar of FIG. 2, from an altitude of 700 feet AGL.
Figure 33:
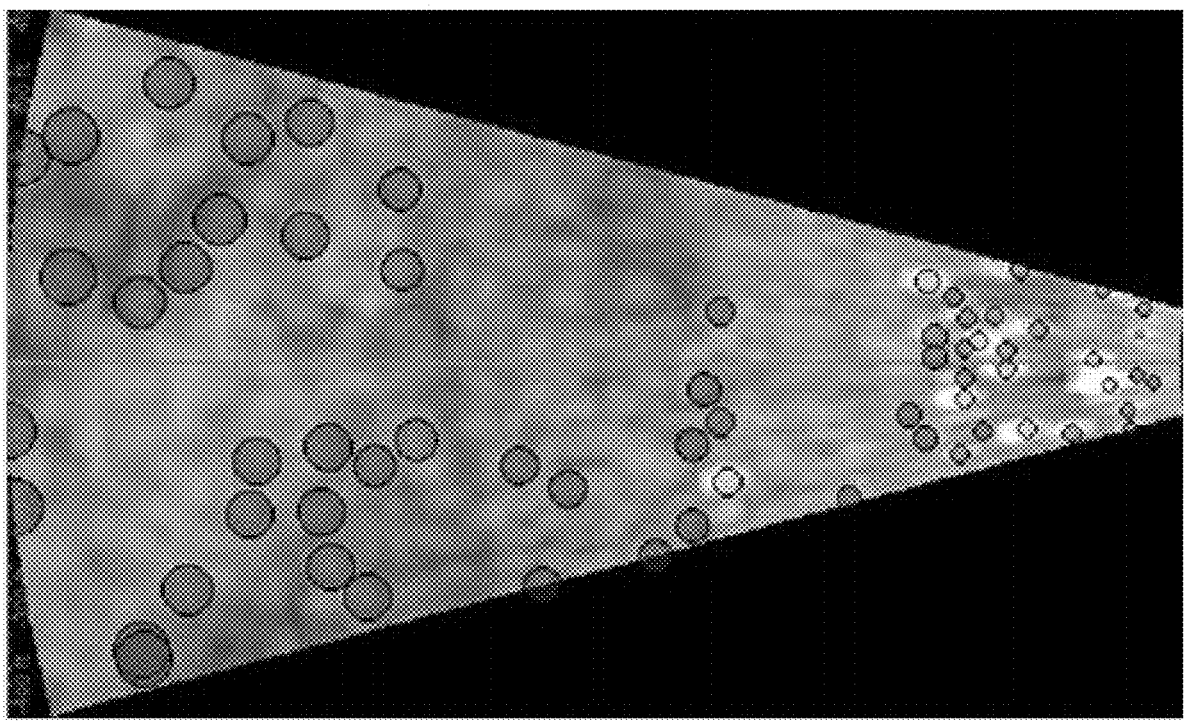
FIG. 33 is a view of a B-scope display illustrating various obstacles on the ground.
Figure 33B:
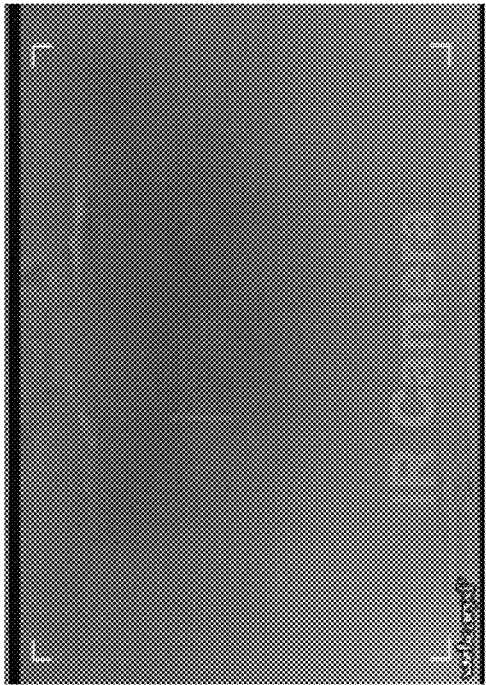
FIG. 33B is an infrared camera view of the obstacles shown in FIG. 33, in which the obstacles are indistinguishable.
Figure 33A:
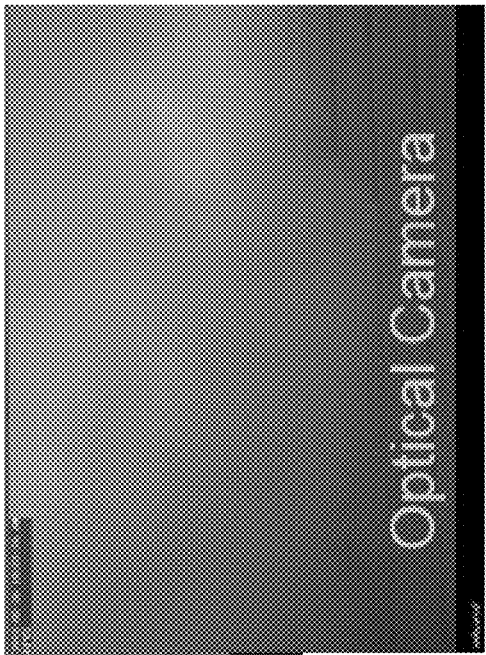
FIG. 33A is a blurry optical camera view of the obstacles shown in FIG. 33.
Figure 33C:
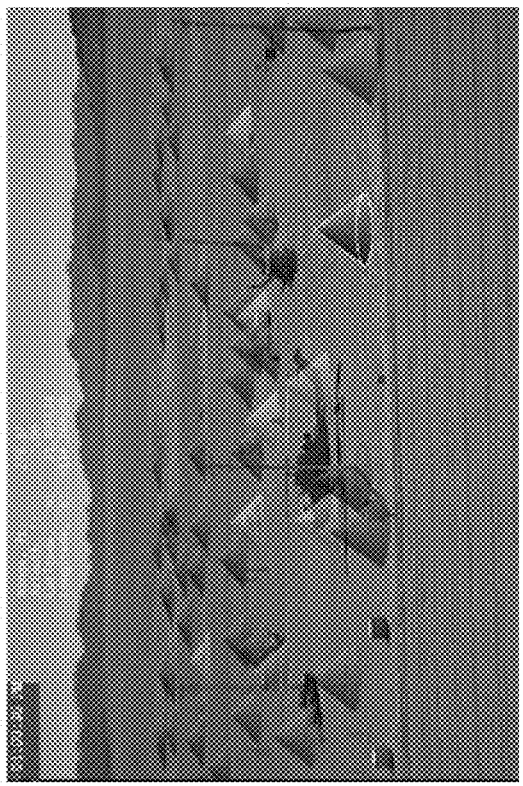
FIG. 33C is a C-Scope (perspective view compatible with the pilot's natural vision) radar image of the obstacles shown in FIG. 33.
Figure 34:
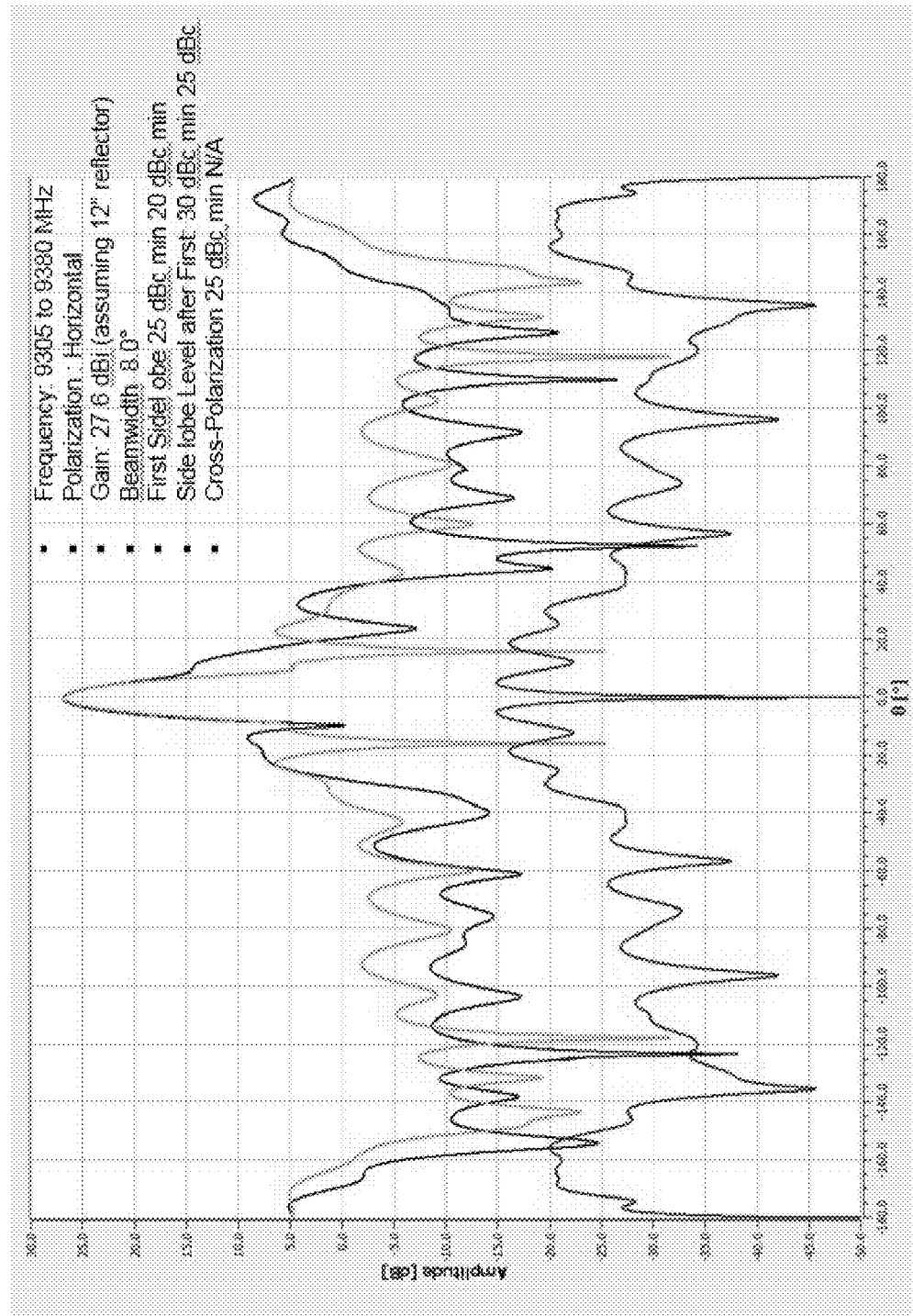
FIG. 34 illustrates a typical X Band antenna pattern.
Figure 35:
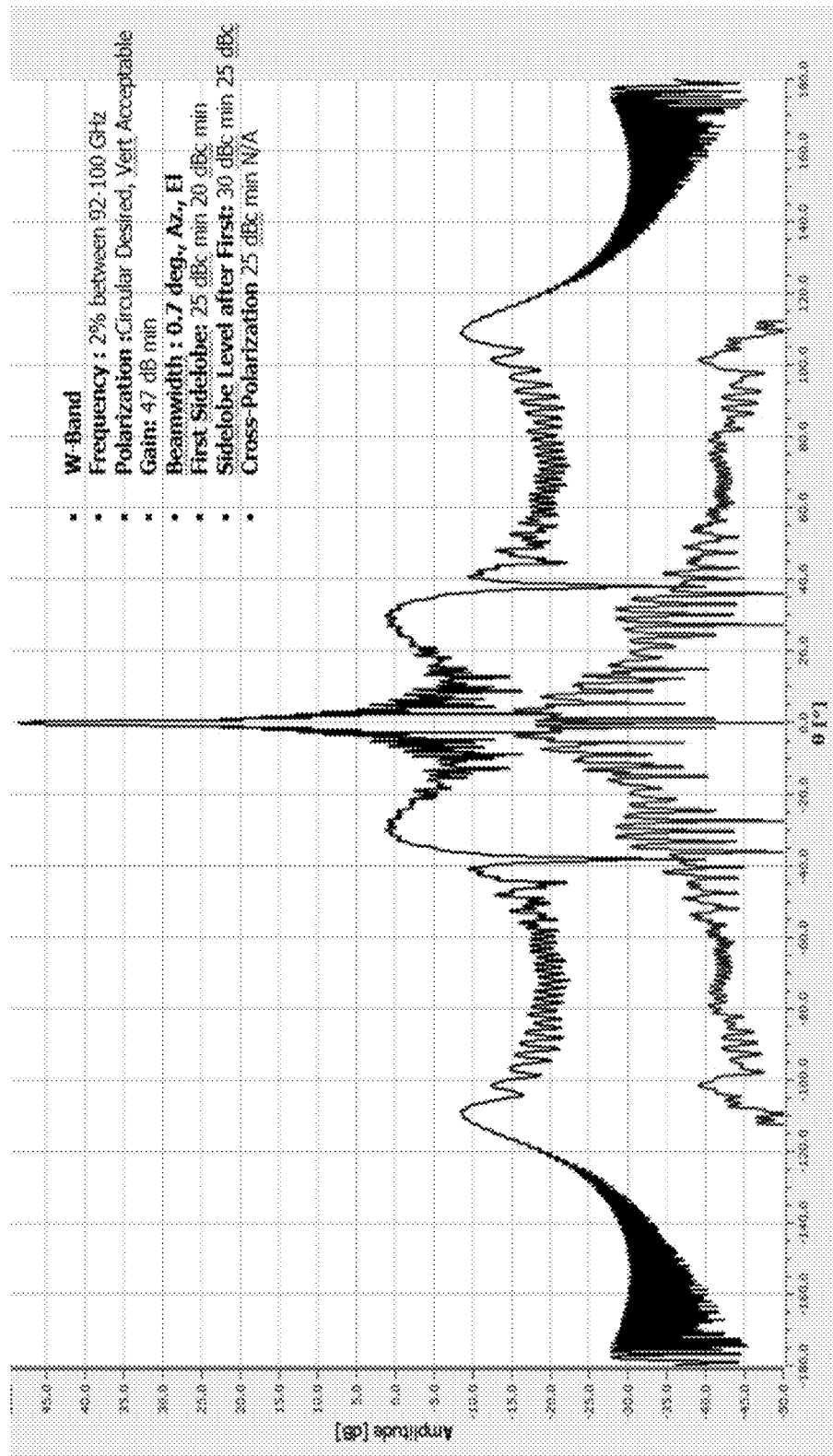
FIG. 35 illustrates a typical W Band Antenna Pattern.

One possible implementation of electronic scanning for the radar system disclosed herein is illustrated in FIG. 31. To dramatically improve the refresh rate under consideration, electronic steering (E-Scan) may be used to cover the Azimuth field of regard (+/−20 degrees), and mechanical steering may be used to cover the elevation field of regard (+/−10 degrees). The E-Sean architecture may consist of a 128 element line array, with each element driven by a dedicated T/R module capable of dynamically controlling both element excitation phase and amplitude to thereby electronically steer the beam in azimuth over the required field of regard (60 degrees). This may produce a beam with an elevation/horizontal plane beam width (HPBW) of less than 0.7 degrees (in accordance with requirements of the point design). This structure permits the azimuth beamwidth to be varied by varying the number of elements in the line array. The elevation beamwidth associated with this (single) line array may produce a very broad elevation beam and could easily exceed 50 degrees. To sharpen the beam a dielectric lens may be placed over the radiating elements of the line array to, in effect, focus the beam, resulting in an (HPBW) of less than 4 degrees maximum (with a goal of 0.7 degrees). HPBW may be traded for antenna efficiency to minimize lens blockage of the aperture. Driving HPBW down results in using a bigger lens which tends to severely impact antenna efficiency. This beamwidth is a compromise between array complexity and the ability of the radar to resolve objects in elevation. The mechanically steered approach achieves an elevation beamwidth of 0.7 degrees and is therefore capable of far superior elevation resolution.

Figure 24:
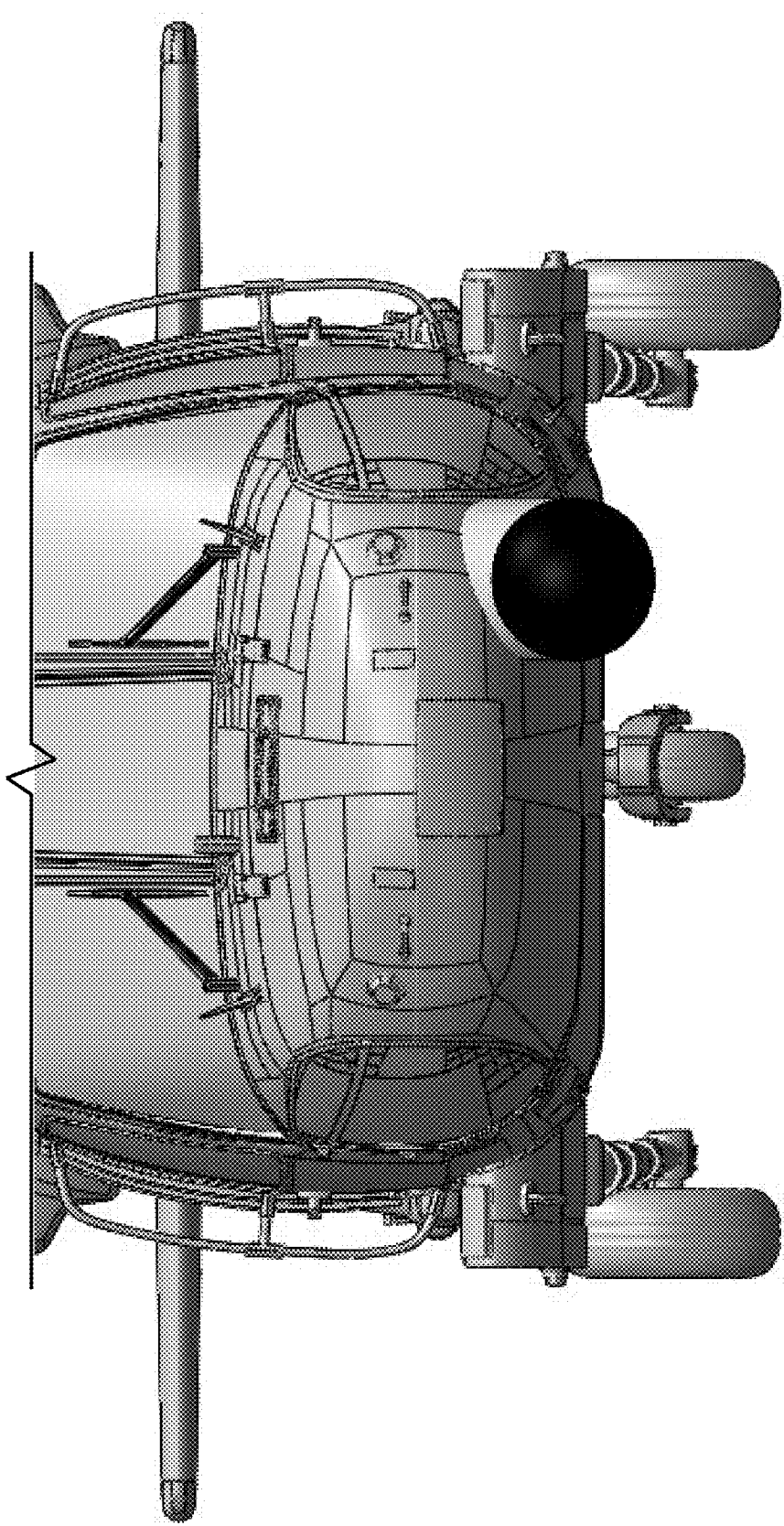
FIG. 24 is a front view of a front portion of a Blackhawk helicopter that has a forward looking radome.
Figure 26:
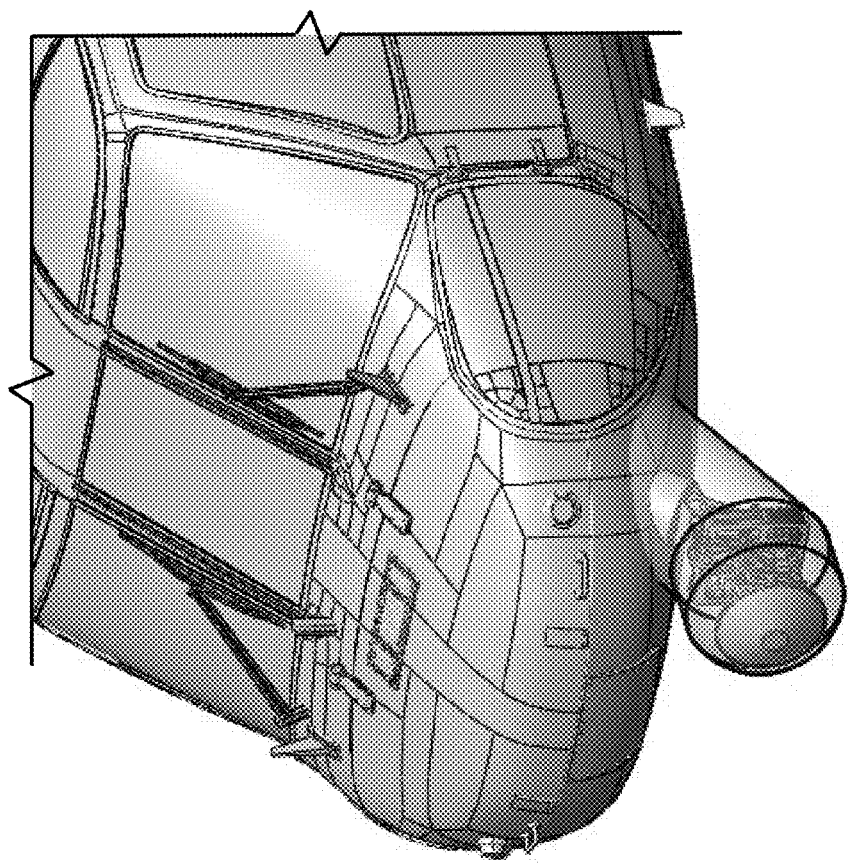
FIG. 26 is the perspective view of FIG. 25, but with the radome shown with a transparent outline to reveal the dual function X Band Weather and W Band Obstacle Imaging Radar of FIG. 2 installed therein upon a boom.
Figure 25:
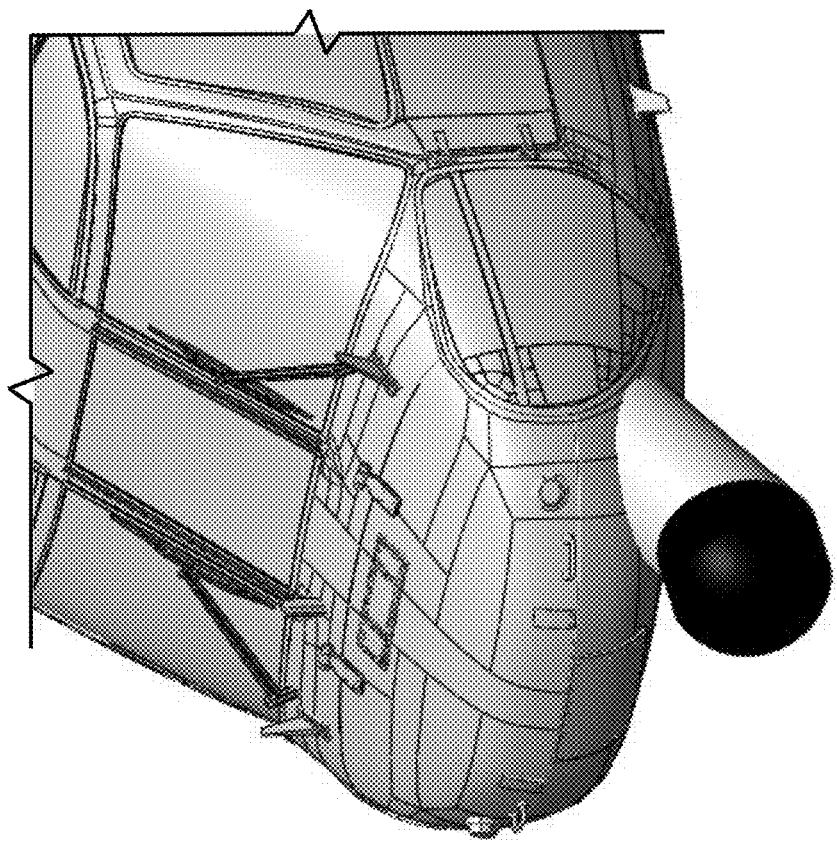
FIG. 25 is a perspective view of the portion of the Blackhawk helicopter and radome shown in FIGS. 24.
Figure 26A:
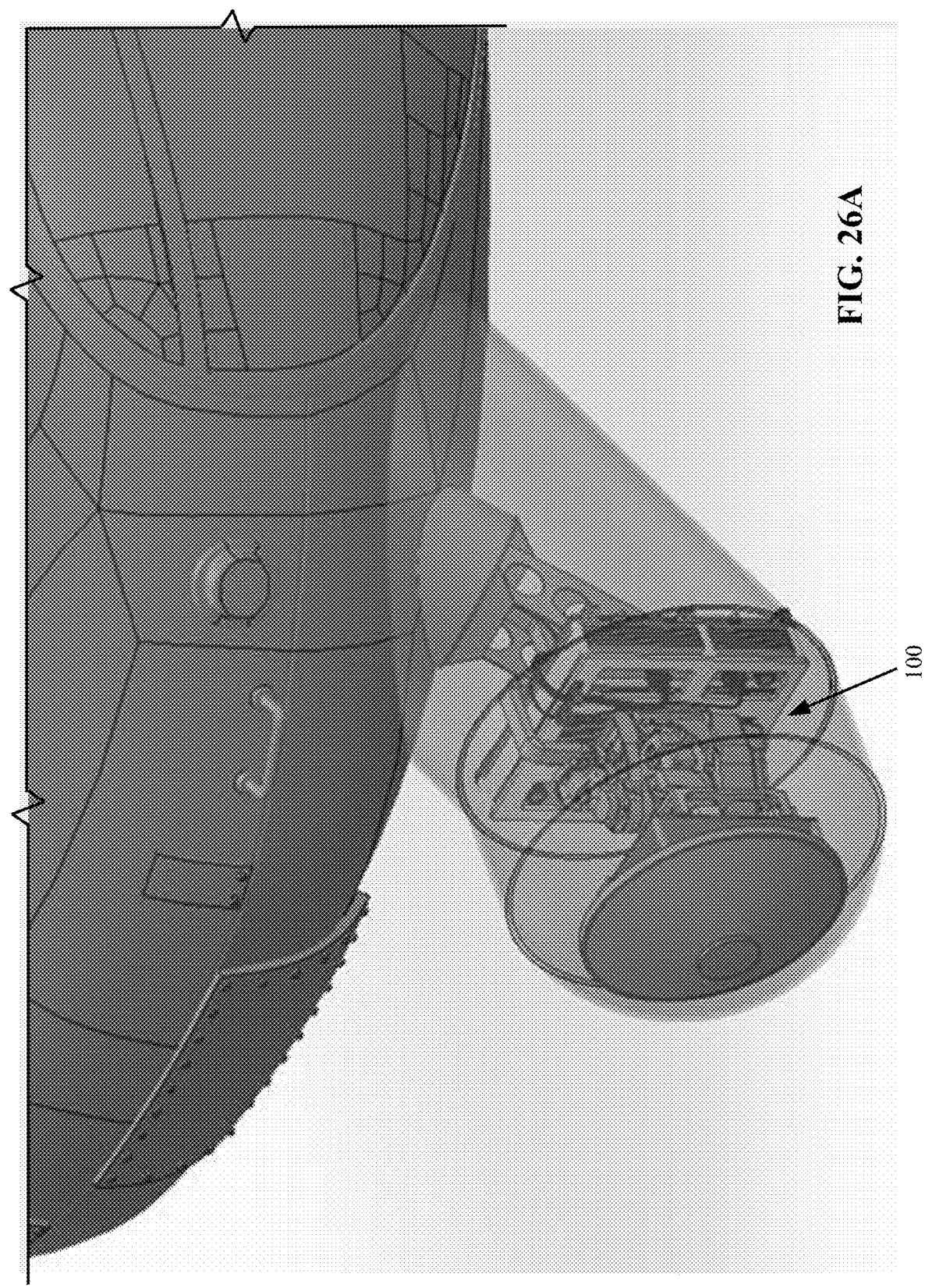
FIG. 26A is an enlarged detail view of the dual-band radome and dual function X Band Weather and W Band Obstacle Imaging Radar as seen in FIG. 26.
Figure 27:
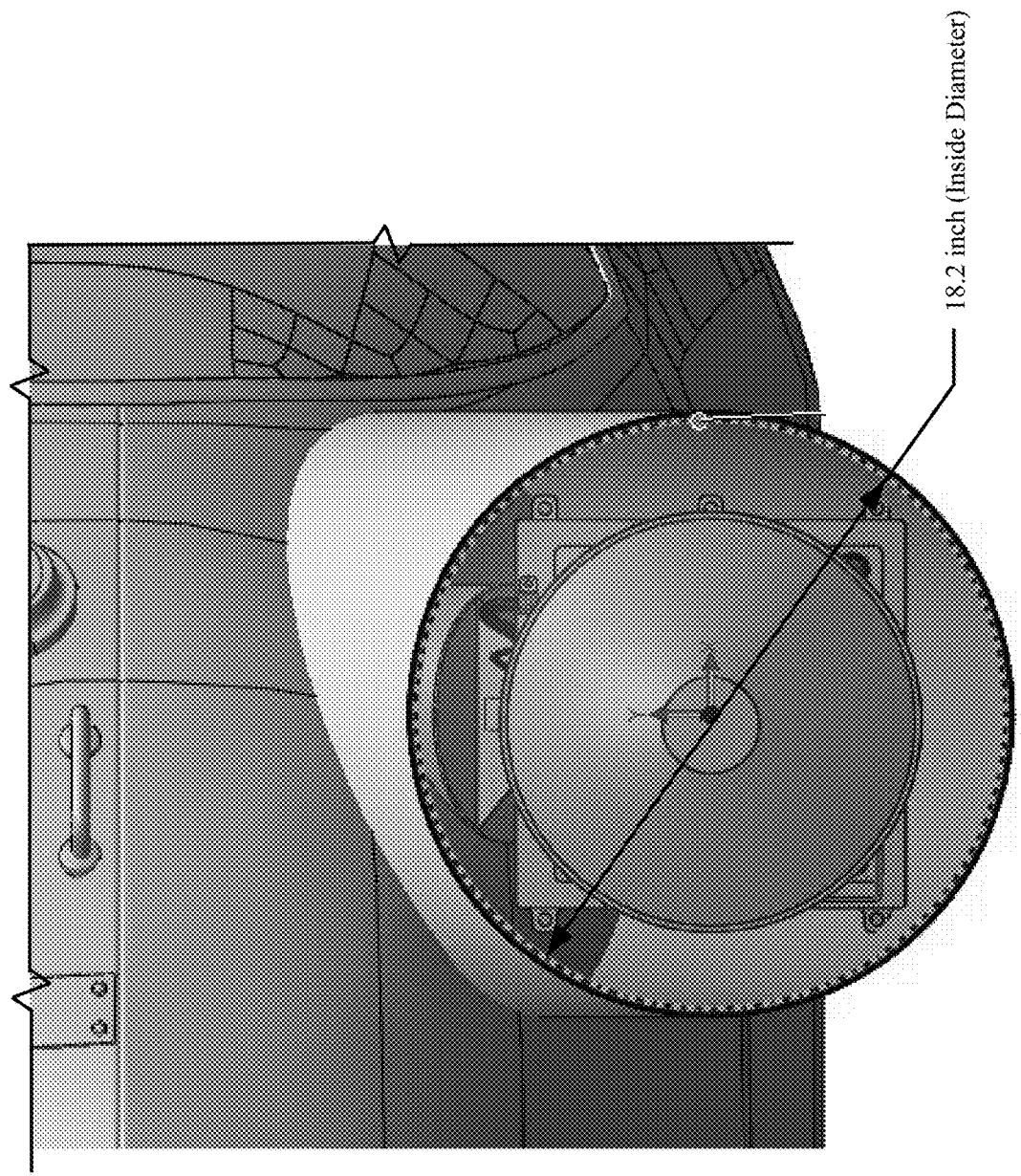
FIG. 27 is a front view of the dual-band radome and nose portion of the helicopter of FIG. 24, showing the dual function X Band Weather and W Band Obstacle Imaging Radar of FIG. 2 installed therein.
Figure 28:
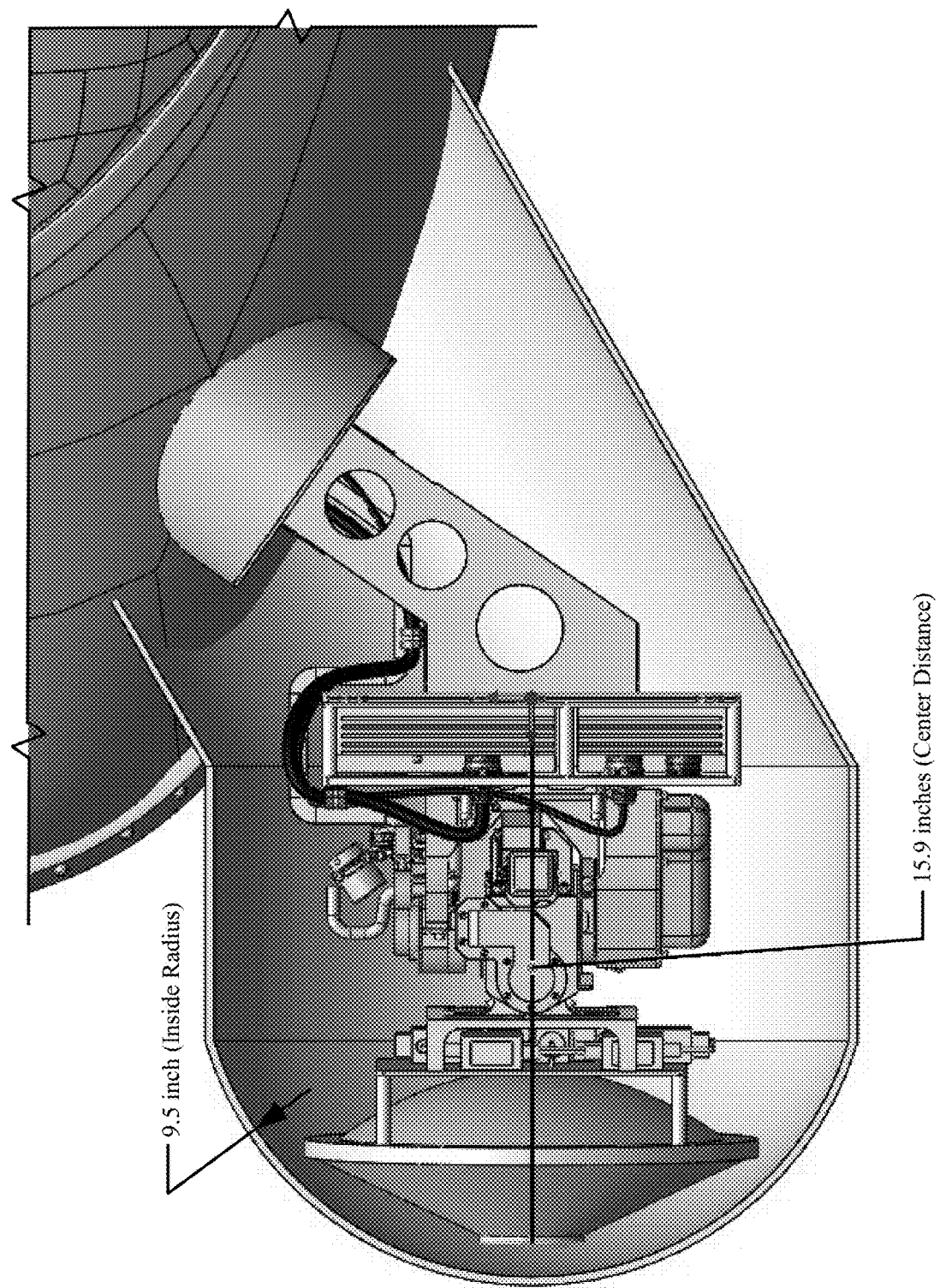
FIG. 28 is a side view of the transparent radome and helicopter nose portion shown in FIG. 16.
Figure 29:
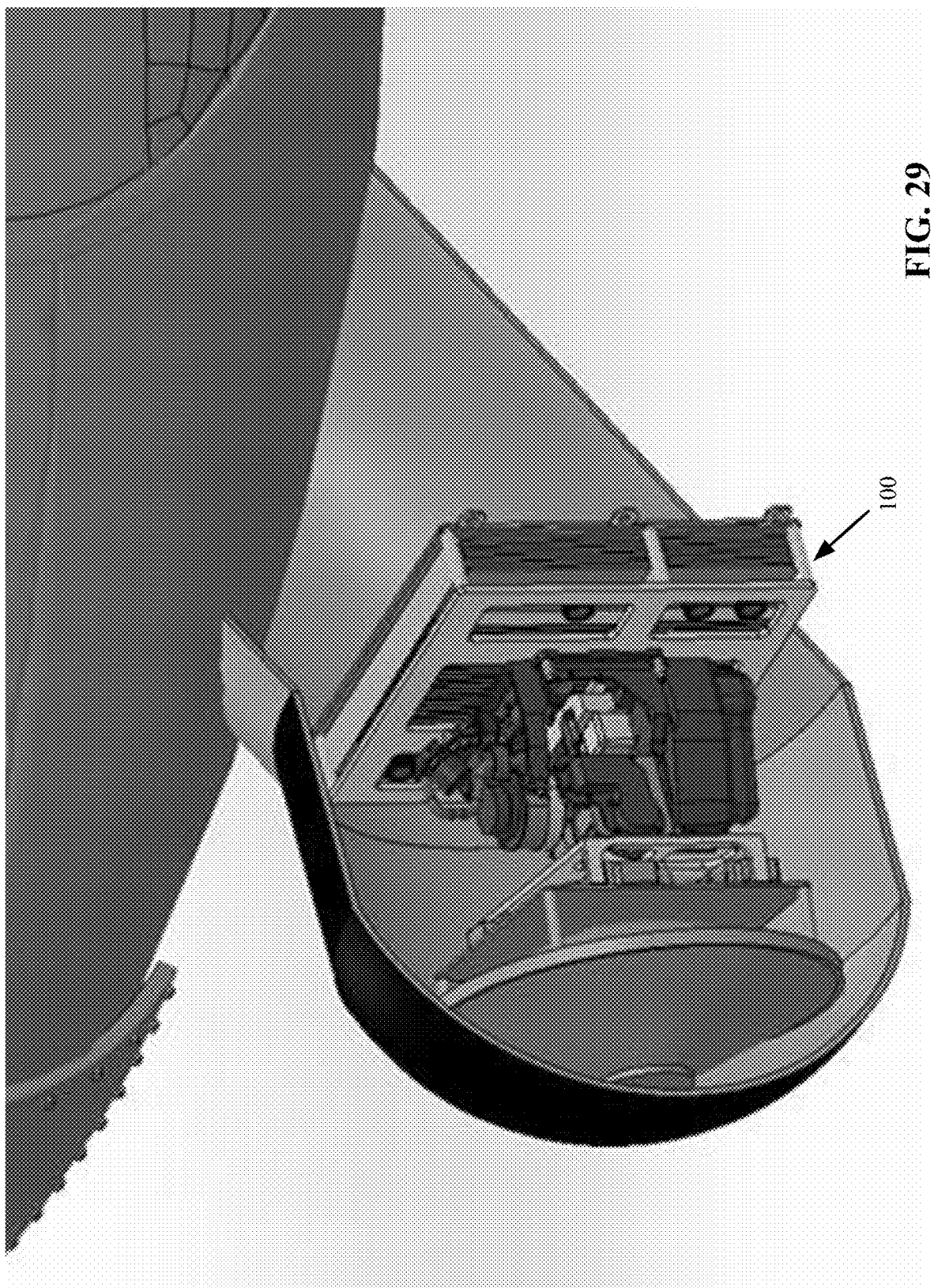
FIG. 29 is a perspective view of the nose portion of the helicopter of FIG. 24 with a portion of the radome cut away, and showing the dual function X Band Weather and W Band Obstacle Imaging Radar of FIG. 2 therein, but without the structural support boom, and with the antenna positioned on boresight.
Figure 30:
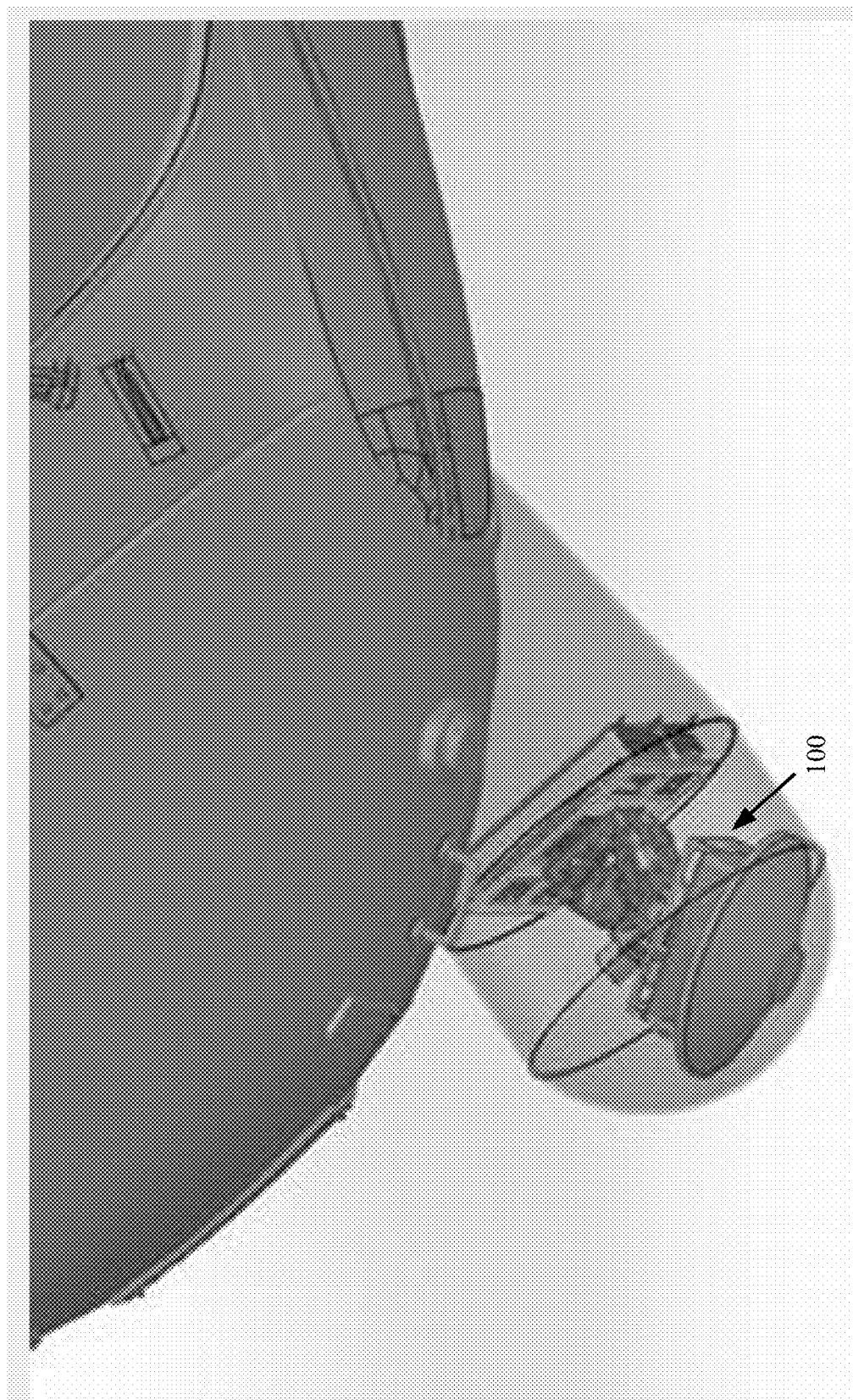
FIG. 30 is another perspective view of the nose portion of the helicopter of FIG. 24 with a portion of the radome cut away, and showing the dual function X Band Weather and W Band Obstacle Imaging Radar of FIG. 2 installed, but without the structural support boom, and further illustrating clearance of the radar with respect to the radome interior when the antenna is scanned away from the direction of the velocity vector of the aircraft.

FIGS. 24-25 show side and front views of a Blackhawk helicopter with a forward looking radome. FIGS. 26-30 show view of the Blackhawk helicopter radome and rinse portion of the helicopter with the dual function X Band Weather and W Band Obstacle Imaging Radar of FIG. 2 installed therein.

Figure 37:
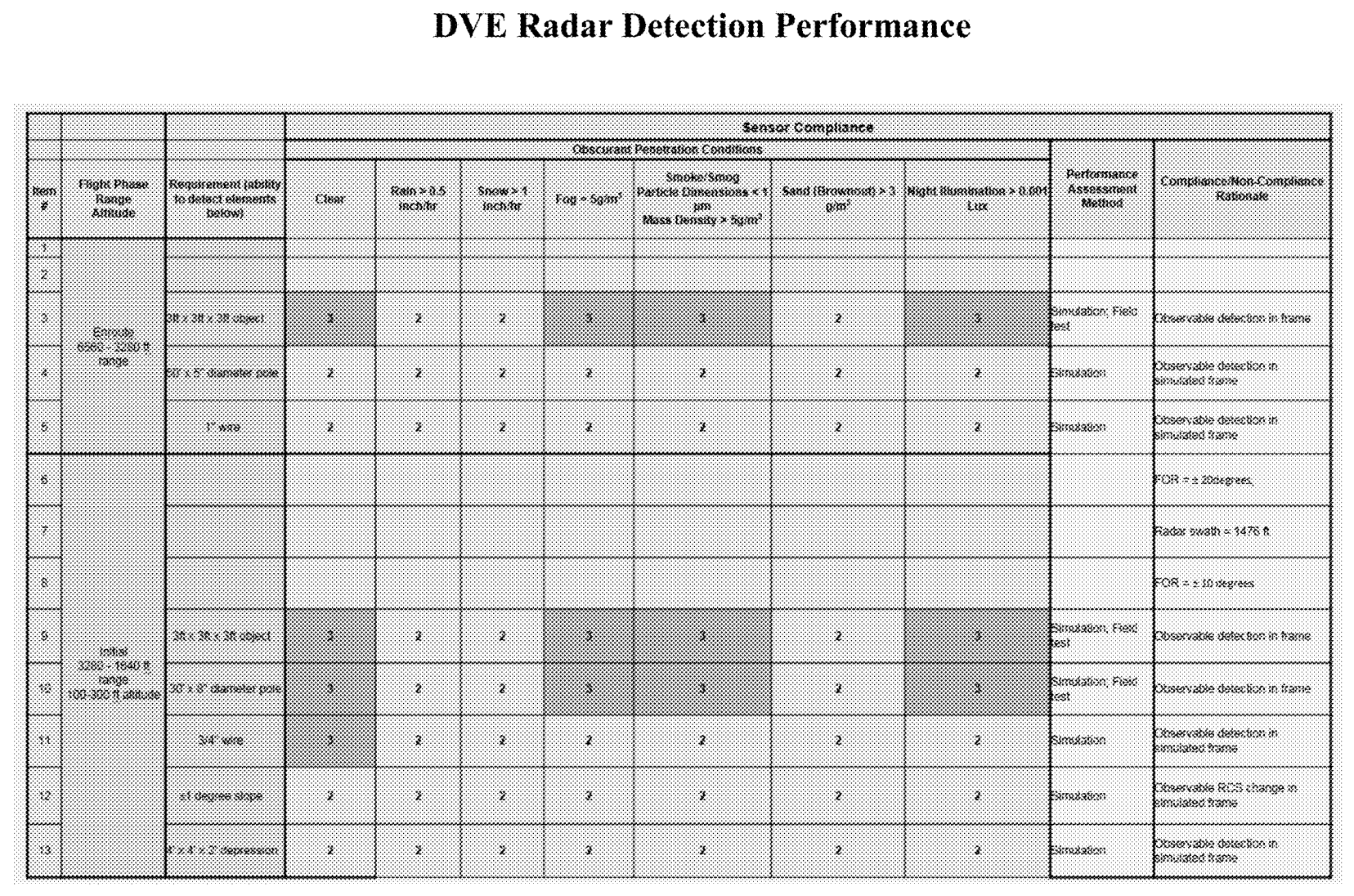

FIG. 37 illustrates a chart identifying the DVE Radar detection performance of the dual function X band weather and W band obstacle imaging radar of FIG. 2. The X Band Weather and W Band Obstacle Imaging radar system disclosed herein is capable of identifying the position (location in 2-D space) of the obstacles, and can also provide an indication of the obstacle's relative size by measuring and recording the intensity (brightness) of the radar return. The radar is also capable of measuring the obstacle height above ground. To measure obstacle height the antenna's elevation scanning pattern will be dithered up and down to cover one or more elevation "bars" (referred to as a "nodding" beam). A bar is equal to or greater than one elevation half power beamwidth of the antenna. For stationary obstacles the effects of platform motion must be accounted for. For moving obstacles (such as other aircraft, UAV's, etc.) the rate at which the beam is dithered up and down is critical. Fast-moving targets may move through multiple range resolution cells resulting in errors. Methods are employed to correct for errors introduced as a result of range migration. Another effect is target fluctuation which could introduce errors in the location of the "center of mass" of the obstacle. By using frequency agility, the accuracy of the centroiding process is improved and changes to the apparent center of mass are suppressed.

FIG. 40 shows a chart identifying the Delta SWaP estimate for the dual function X Band Weather and W Band Obstacle Imaging Radar of FIG. 2. Adding the DVE functional capability requires adding the following functions: 1) signal-image processor 2) a suitable power supply, and 3) the 94 GHz. FEE (front end electronics). The delta weight of 39.52 lbs. results from the redesigned pedestal which increased in weight from 7.6 lbs. to 18 lbs., adding an additional 10.4 lbs.

Figure 20:
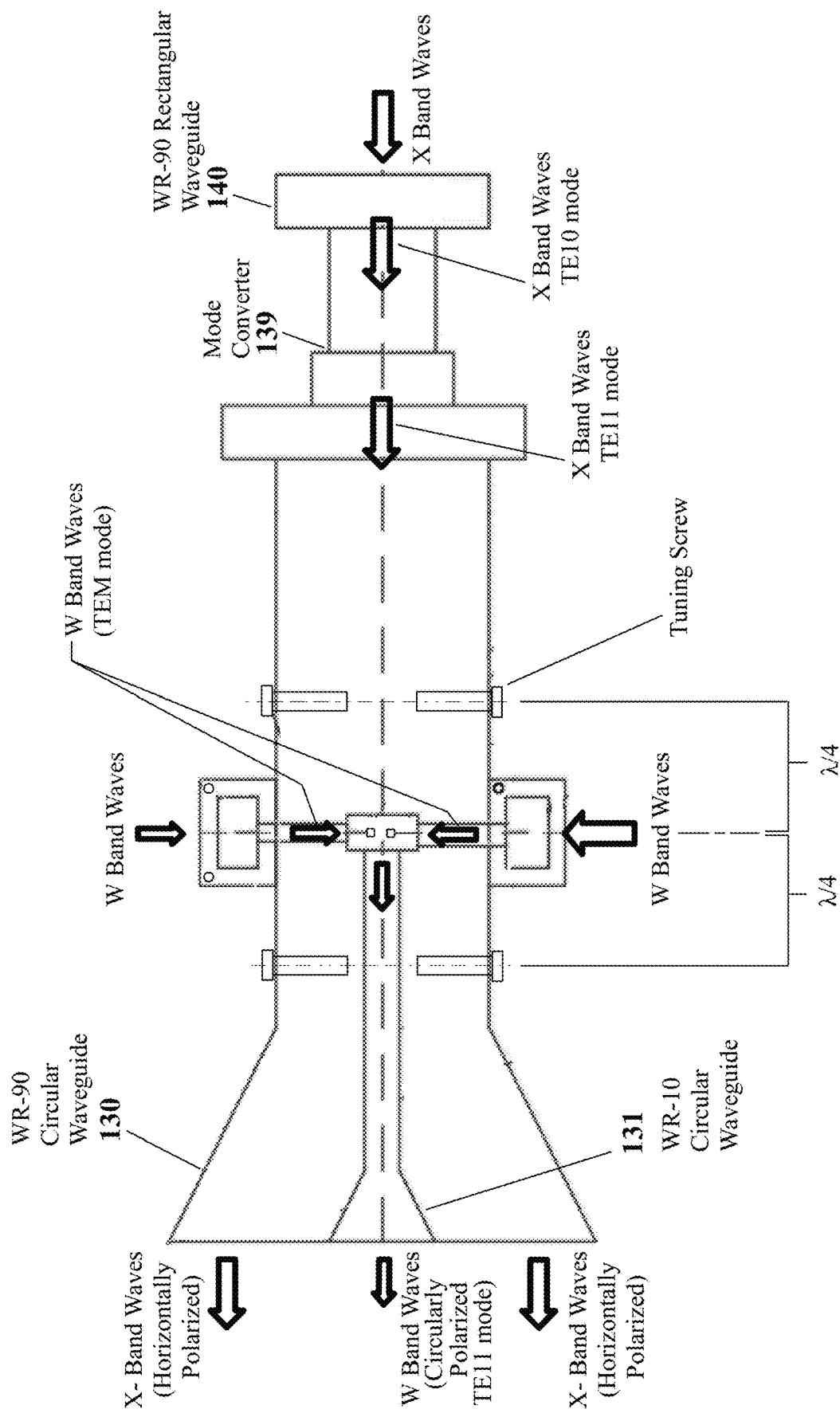
FIG. 20 illustrates use of a tuning post in the form of a screw to introduce a susceptance that is equal in magnitude and sign to the magnitude and sign of the discontinuity introduced by the coaxial cables and the other support posts.
Figure 21:
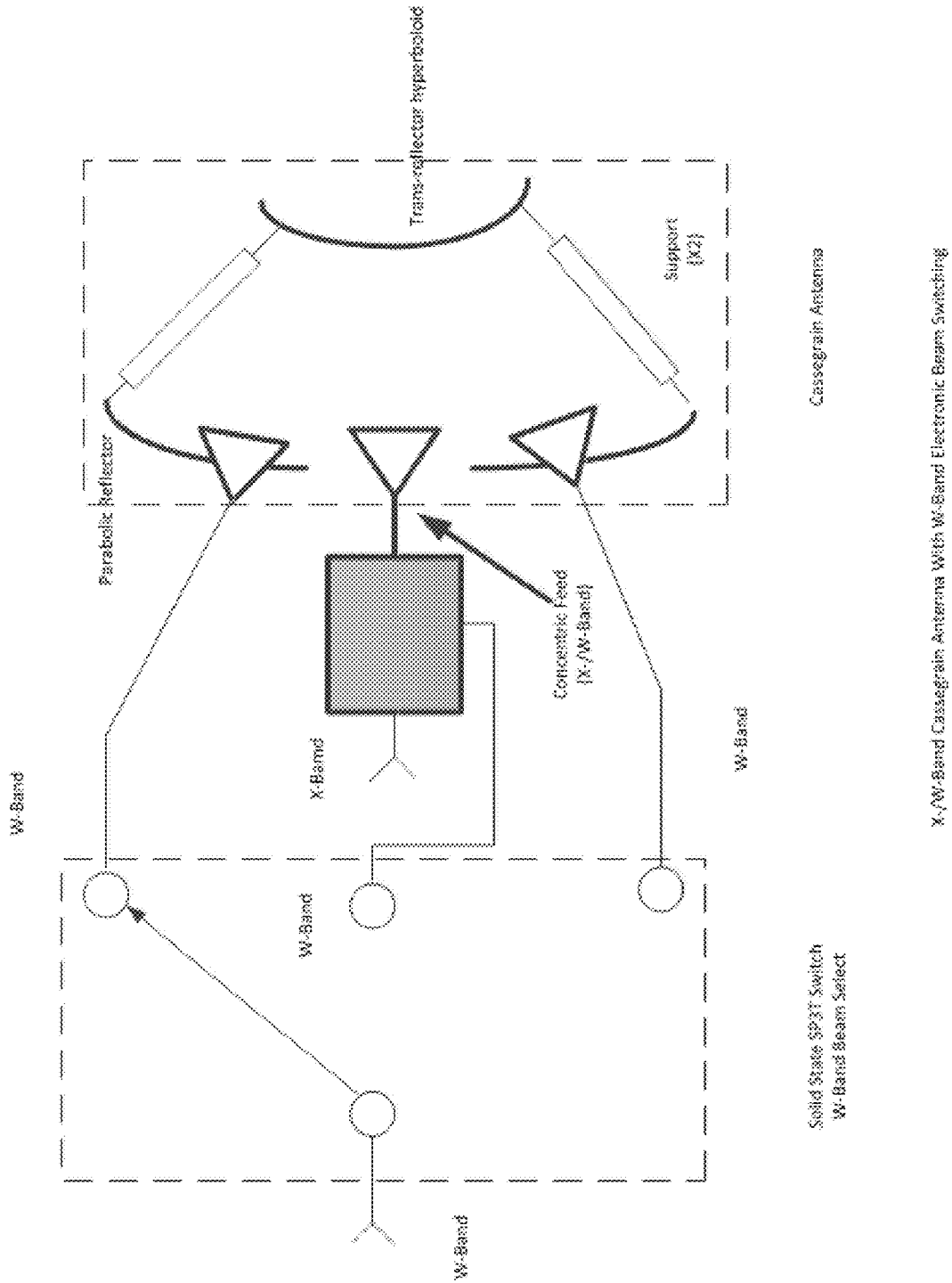
FIG. 21 is another embodiment of an X Band/W Band Cassegrain antenna, but with W Band electron beam switching.
Figure 22:
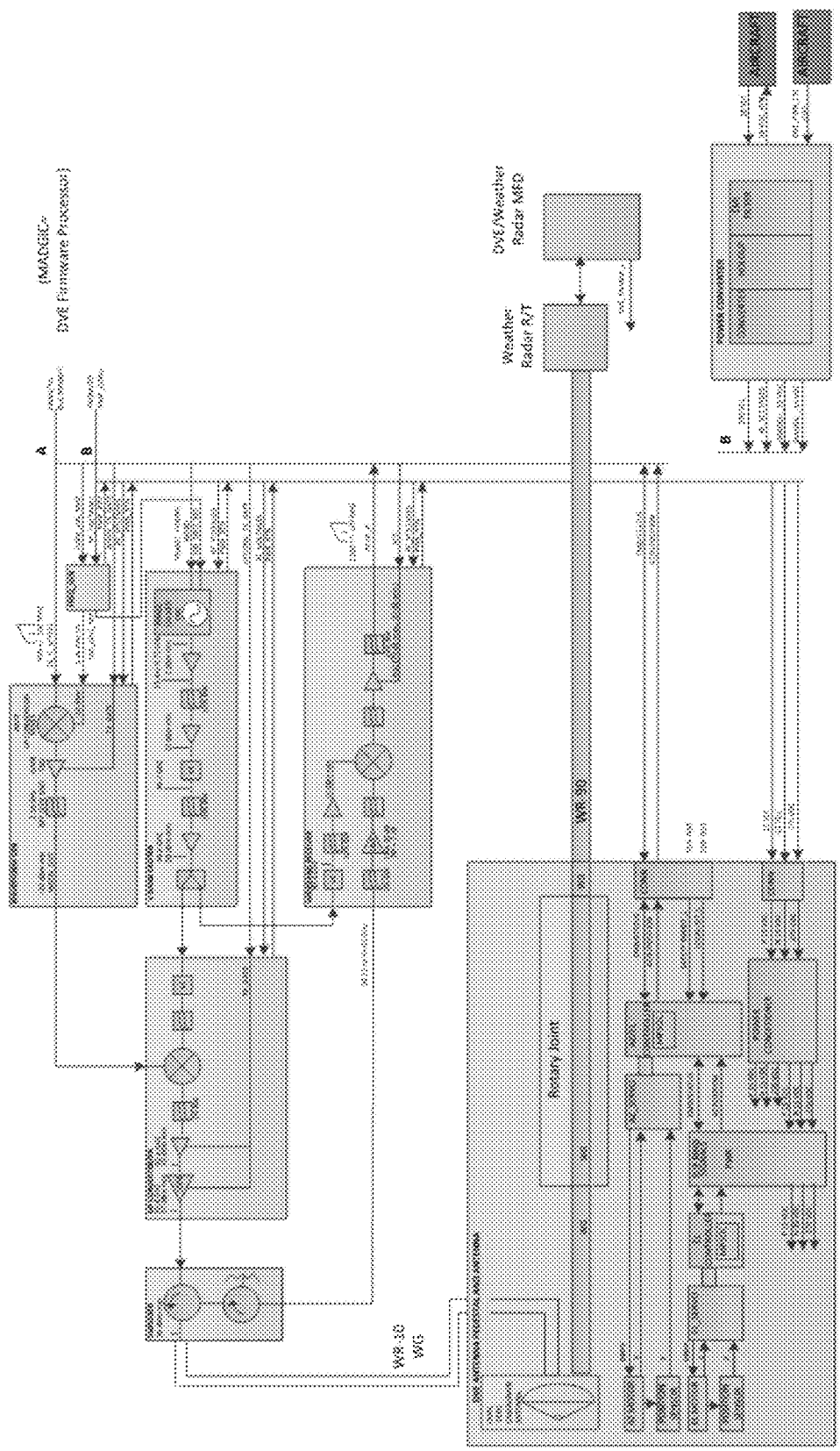
FIG. 22 is a first system block diagram for the dual function X Band Weather and W Band Obstacle imaging Radar of FIG. 2.
Figure 22A:
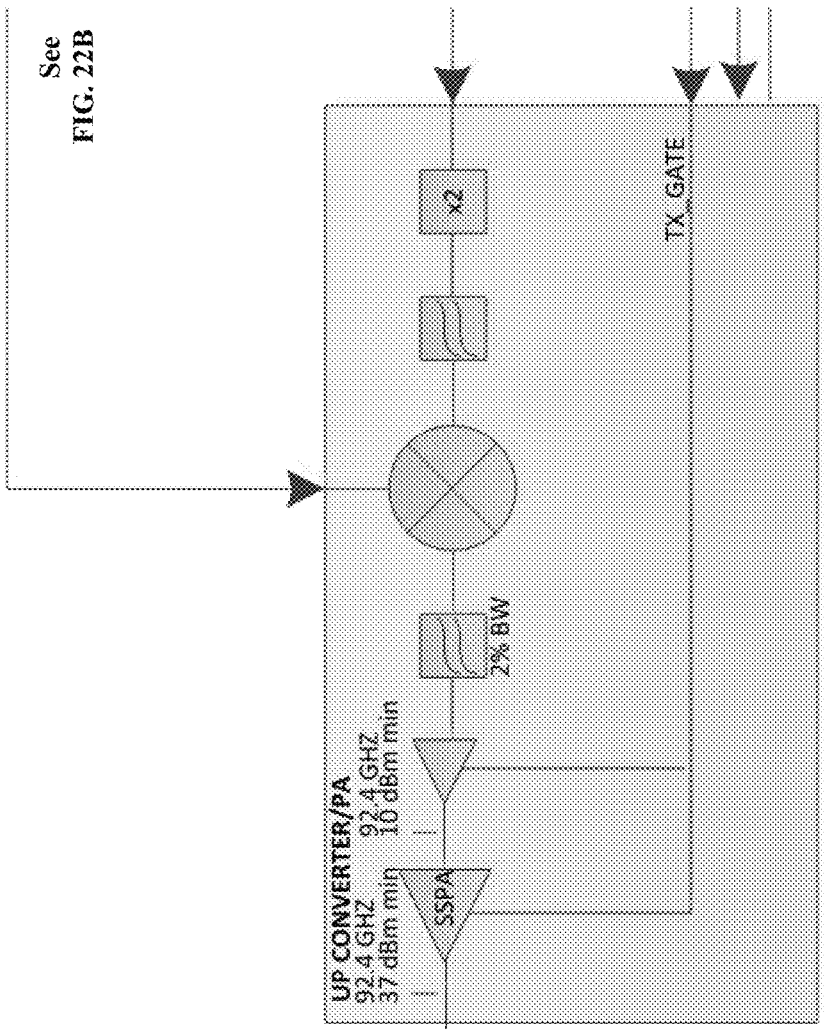
FIG. 22A is a first enlarged portion of the first system block diagram shown in FIG. 22.
Figure 22B:
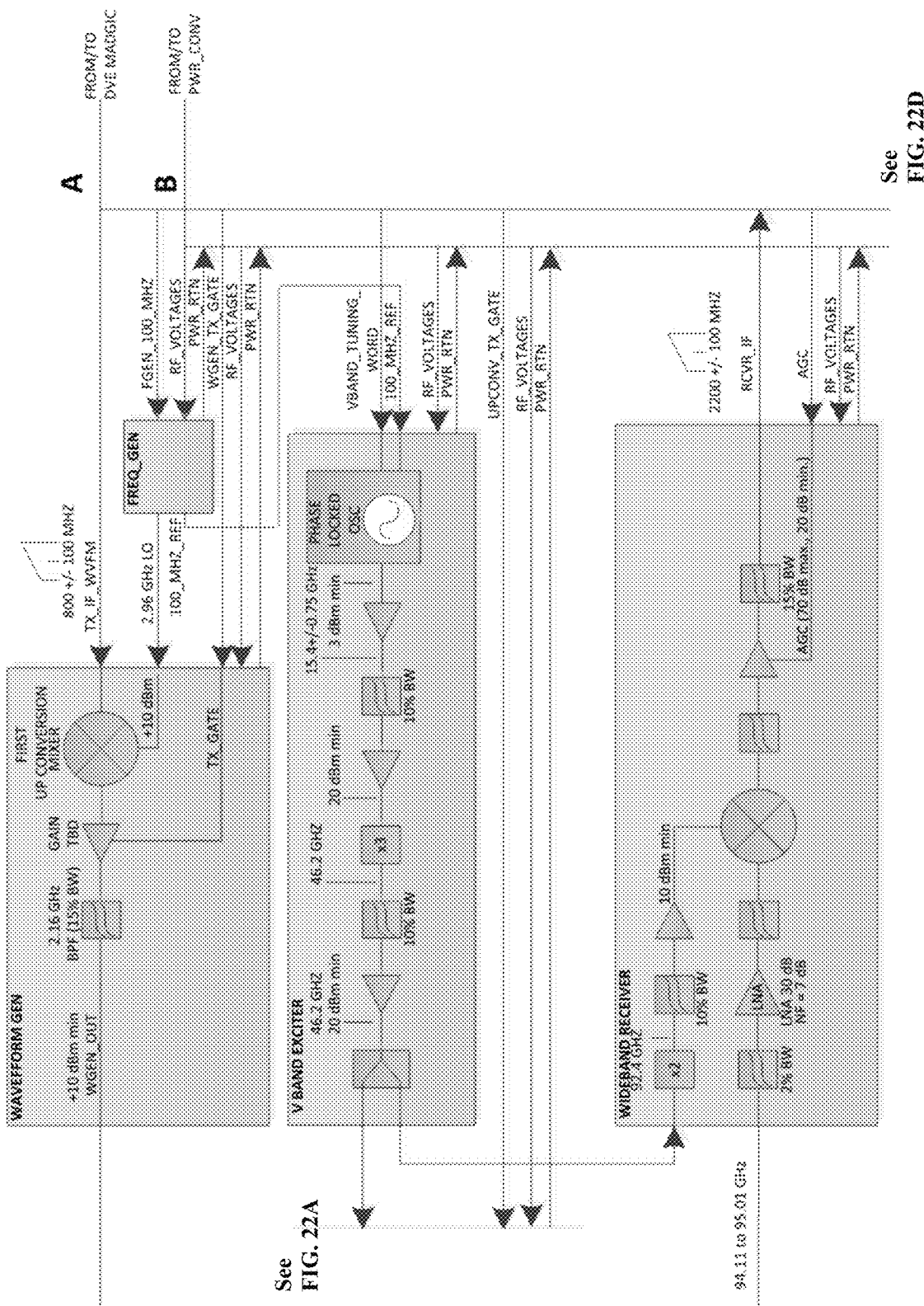
FIG. 22B is a second enlarged portion of the first system block diagram shown in FIG. 22.
Figure 22C:
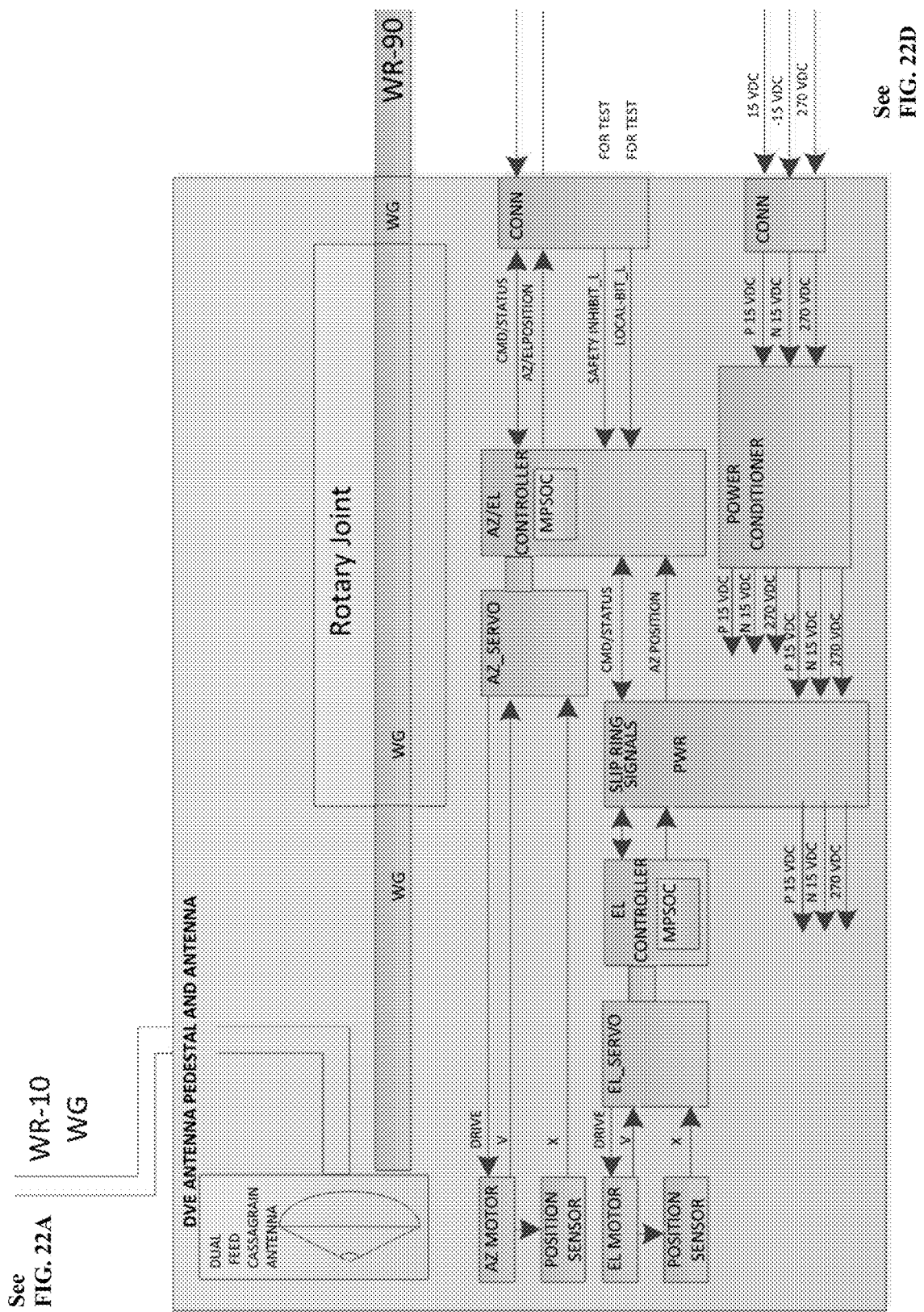
FIG. 22C is a third enlarged portion of the first system block diagram shown in FIG. 22.
Figure 22D:
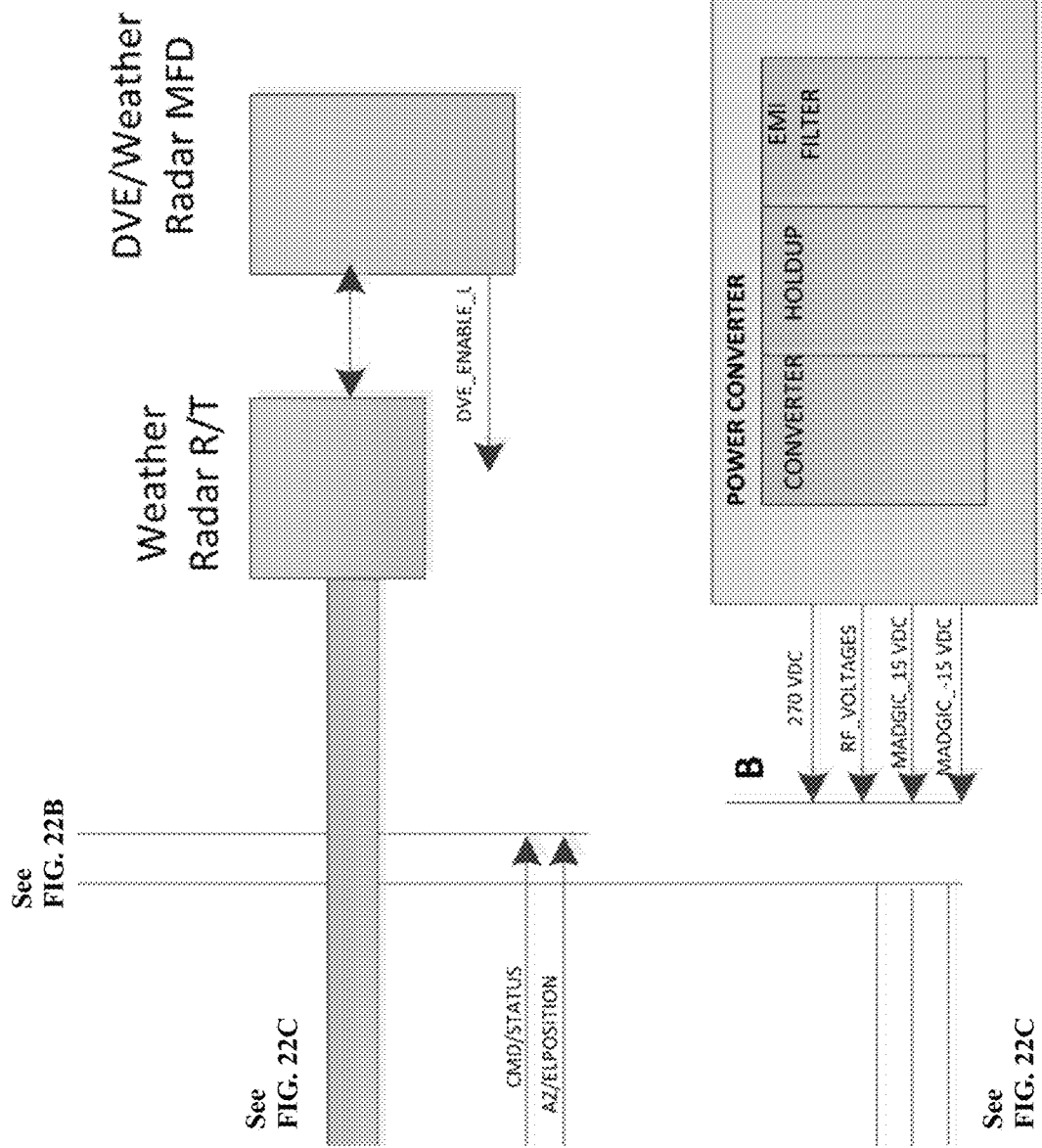
FIG. 22D is a fourth enlarged portion of the first system block diagram shown in FIG. 22.
Figure 23:
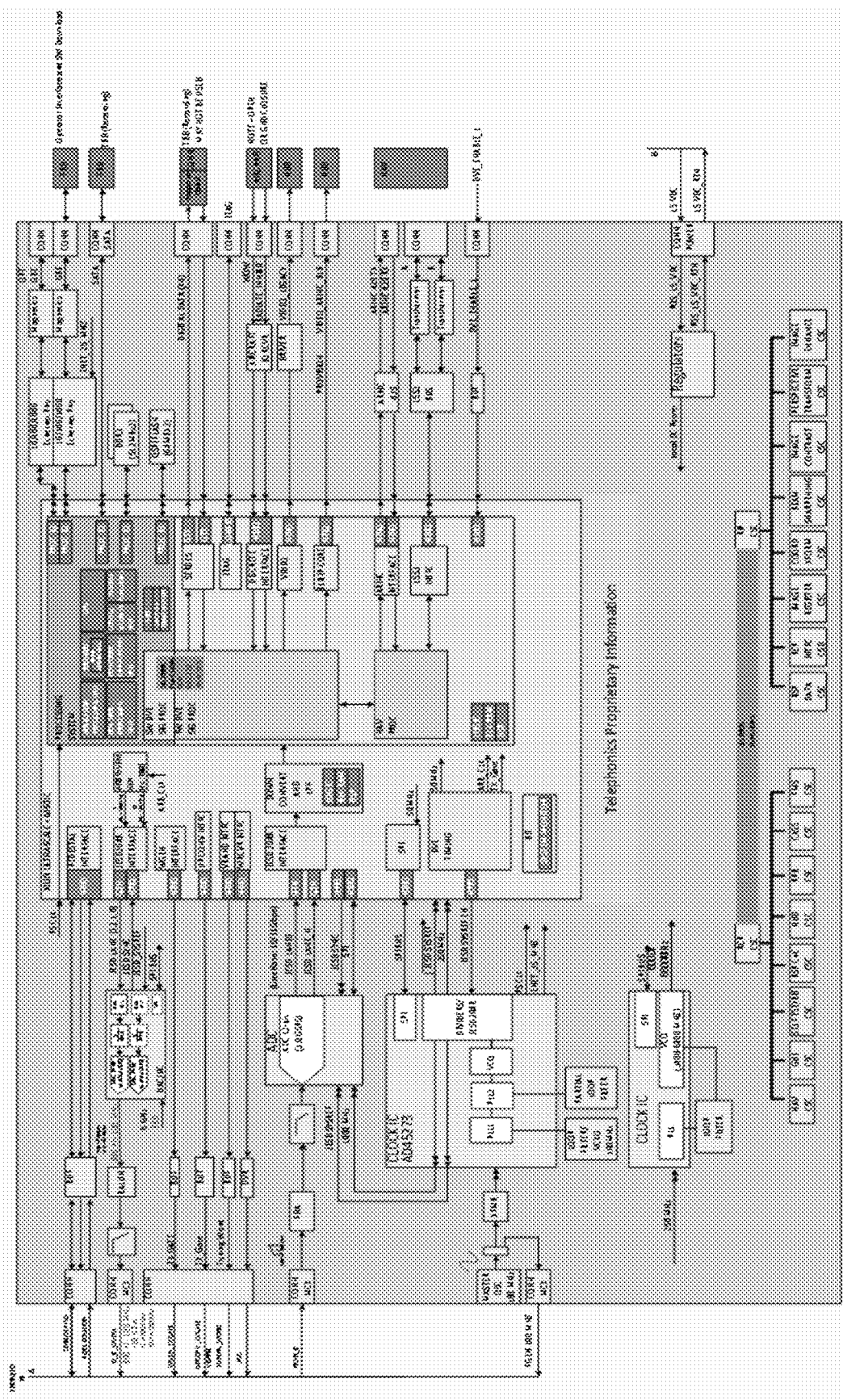
FIG. 23 is a second system block diagram of the signal-image processor for the W Band Obstacle Imaging Radar portion of the dual function X Band Weather and W Band Obstacle Imaging Radar of FIG. 2.
Figure 23A:
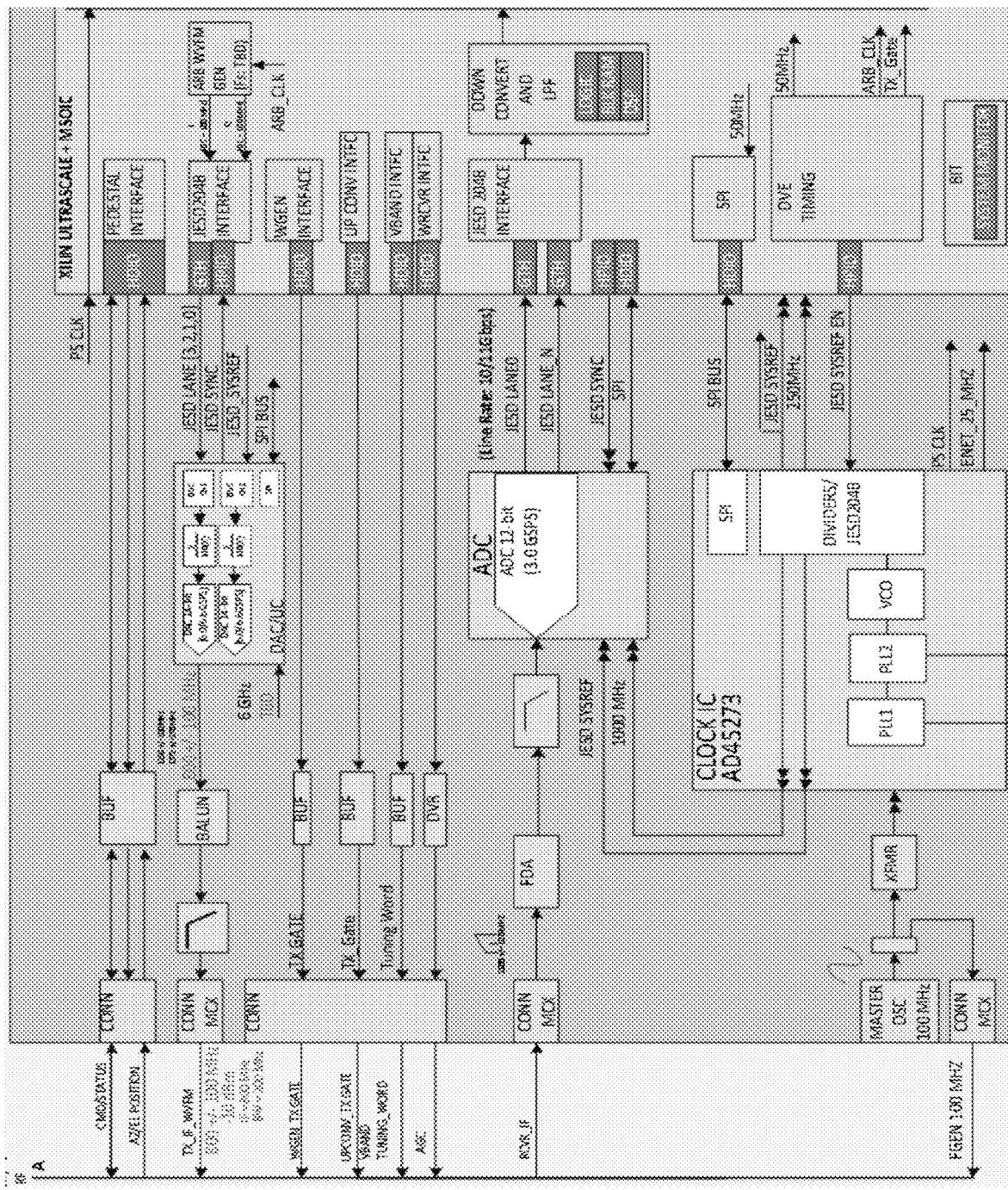
FIG. 23A is a first enlarged portion of the signal-image processor block diagram of FIG. 23.
Figure 23B:
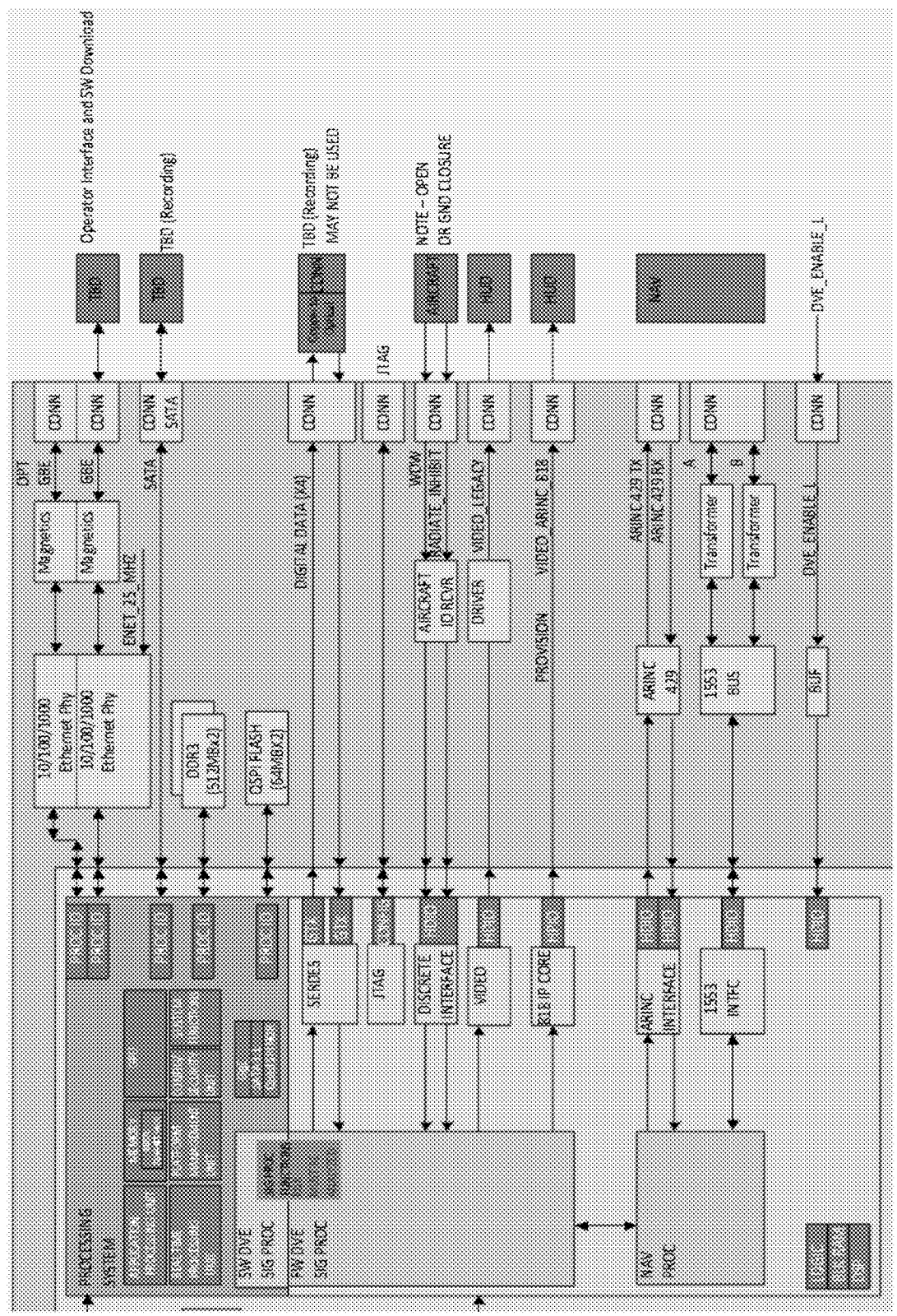
FIG. 23B is a second enlarged portion of the signal-image processor block diagram of FIG. 23.
Figure 23C:
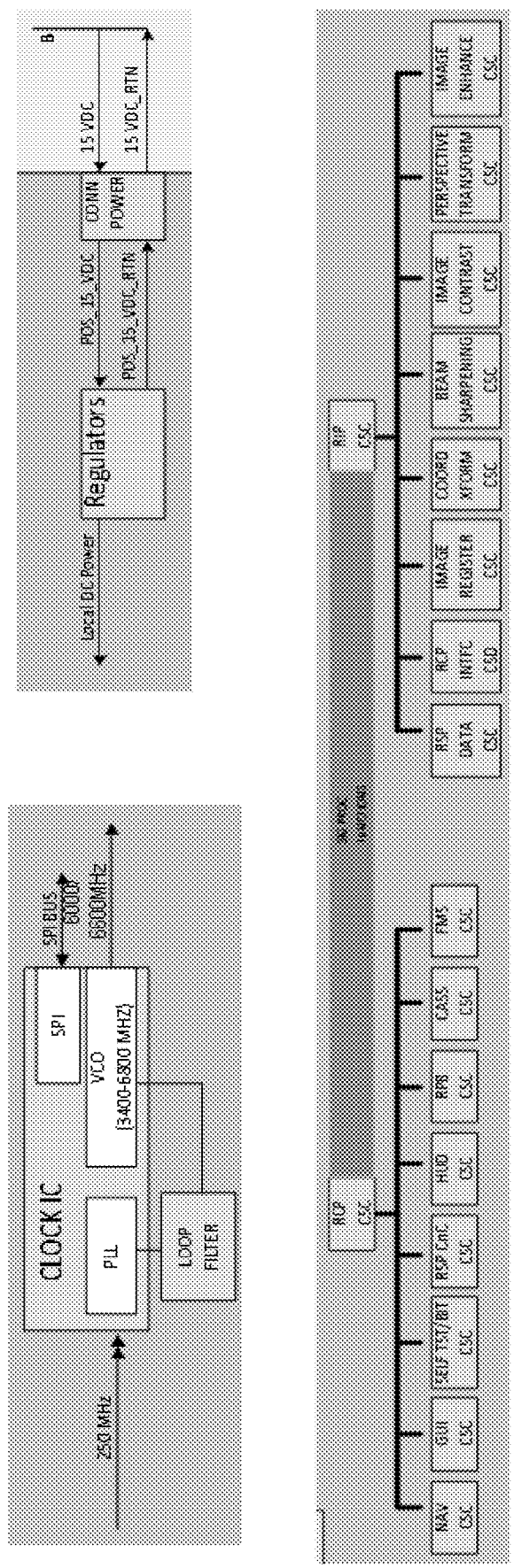
FIG. 23C is a third enlarged portion of the signal-image processor block diagram of FIG. 23.

FIG. 21 is another embodiment of an X Band/W Band Cassegrain antenna. One challenge that is faced in DVE sensing is maximizing the refresh rate with the concentric feed structure. To address this issue, the embodiment illustrated in FIG. 21 uses W-Band electronic beam switching. The embodiment illustrated in FIG. 21 includes two additional W-Band concentric feed structures being the same as the feed arrangement positioned at the vertex of the parabolic reflector. Having the ability to move the beam in elevation electronically (in microseconds) by the addition of two additional W-Band feeds (as shown in FIG. 20) facilitates a reduction in scan time when scanning the +/−10 degree elevation field of regard (FOR). This is so because the beam can be scanned in elevation (up and down) electronically as it traverses the azimuth FOR, imaging three elevation bars in approximately 50% of the time that the current single W-Band feed requires to scan three bars. The improvement, which is both a function of the mechanical scan time and the radar dwell time, reflects actual system performance estimates. It is noted that the proposed electronic scanning does not eliminate the need for mechanical scanning in elevation. The two scan mechanisms will be interleaved to achieve the needed coverage but at a much reduced elevation scan time.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A feed structure, for use in an antenna of an aircraft radar system configured for long-distance weather monitoring using an X Band microwave frequency and imaging of terrain and obstacles using a W Band microwave frequency, for operating in a degraded visual environment, said feed structure comprising:
   a first feed horn, said first feed horn comprising a cylindrical portion and a conical portion, wherein a first end of said cylindrical portion transitions into said conical portion;
   a second feed horn, said second feed horn comprising a cylindrical portion and a conical portion, a first end of said cylindrical portion of said second feed horn transitions into said conical portion of said second feed horn; said cylindrical portion of said second feed horn being positioned within and substantially concentric to said cylindrical portion of said first feed horn;
   a first spoke comprising a coaxial cable that is oriented radially with respect to the axis of said cylindrical portion of said first feed horn;
   a second spoke comprising a coaxial cable that is oriented radially with respect to the axis of said cylindrical portion of said first feed horn;
   wherein said radial orientation of said second spoke is clocked at an angle to said radial orientation of said first spoke;
   a first rectangular waveguide positioned outside of said cylindrical portion of said first feed horn, with a first end of said coaxial cable of said first spoke coupled to said first rectangular waveguide, with an e-plane probe attached to a first end of a center conductor of said coaxial cable of said first spoke being positioned within said first rectangular waveguide;
   a second rectangular waveguide positioned outside of said cylindrical portion of said first feed horn, with a first end of said coaxial cable of said second spoke coupled to said second rectangular waveguide, with an e-plane probe attached to a first end of a center conductor of said coaxial cable of said second spoke being positioned within said second rectangular waveguide;
   a polarization converter coupled to a second end of said cylindrical portion of said second feed horn, with a second end of each of said coaxial cables of said first and second spokes coupled to said polarization converter, and with a respective e-plane probe attached to a second end of said center conductor of each of said coaxial cables of said first and second spokes being positioned within said polarization converter; and
   wherein said feed structure is configured to collect and disseminate W Band and X Band electromagnetic energy.

2. The feed structure according to claim 1 wherein said second spoke is clocked at a 90 degree angle to said first spoke.

3. The feed structure according to claim 2,
   wherein said coaxial cables produce linearly polarized waves, with said first coaxial cable of said first spoke configured to produce a horizontally polarized wave, and said second coaxial cable of said second spoke configured to produce a vertically polarized wave; and
   wherein said polarization converter is configured to convert the linearly polarized wave received from each of said first and second coaxial cables to a W-band circularly polarized wave.

4. The feed structure according to claim 3 wherein an axis of said first coaxial cable and an axis of said second coaxial cable are each substantially co-planar and positioned approximately midway along a length of said first feed horn.

5. The feed structure according to claim 4, wherein said second end of said second feed horn is substantially coplanar with said second end of said first feed horn.

6. The feed structure according to claim 5,
wherein said first feed horn comprises a WR-90 circular waveguide; and
wherein said second feed horn comprises a WR-10 circular waveguide.

7. The feed structure according to claim 6 further comprising:
a mode converter coupled to a second end of said first feed horn; and
a WR-90 rectangular waveguide coupled to said mode converter.

8. The feed structure according to claim 7 further comprising a third spoke and a fourth spoke each oriented radially with respect to the axis of said cylindrical portion of said first feed horn, with each of said first, second, third, and fourth spokes being clocked at an angle of 90 degrees to an adjacent said spoke.

9. A cassegrain antenna configured for long-distance weather monitoring using an X Band microwave frequency and imaging of terrain and obstacles using a W Band microwave frequency, for use in a radar located in an aircraft for operating in a degraded visual environment, said cassegrain antenna comprising:
a parabolic reflector;
a sub-reflector;
a sub-reflector mount configured to position said sub-reflector with respect to said parabolic reflector; and
a feed structure, said feed structure configured to simultaneously direct and receive W band electromagnetic energy and X band electromagnetic energy at said sub-reflector;
wherein said feed structure comprises:
 a first horn, said first horn configured to disseminate and collect the X band electromagnetic energy; said first horn comprising: a cylindrical portion and a conical portion, wherein a first end of said cylindrical portion transitions into said conical portion;
 a second horn, said second horn configured to disseminate and collect the W Band electromagnetic energy; said second horn comprising a cylindrical portion and a conical portion, wherein a first end of said cylindrical portion of said second horn transitions into said conical portion of said second horn; and
 a vertex ring;
wherein said vertex ring is configured to support said first horn and said second horn side-by-side and substantially on a rear side of said parabolic reflector, with a respective distal end of said conical portion of each of said first and second horns positioned in proximity to, but displaced from, a vertex of said parabolic reflector; and
wherein said vertex ring is configured to position respective axes of said first and second horns at an angle, and with the respective axes being positioned to pass proximate to, but displaced from, the vertex of said parabolic reflector, and converge and intersect at a position beyond the reflective surface of said sub-reflector; said first and second horns being thereby configured to direct the X band electromagnetic energy and the W band electromagnetic energy at the reflective surface of said sub-reflector.

10. The cassegrain antenna according to claim 9 wherein said parabolic reflector comprises an aperture having a diameter of twelve inches.

11. The cassegrain antenna according to claim 10 wherein said parabolic reflector is made of graphite epoxy coated with copper.

12. The cassegrain antenna according to claim 9 further comprising:
a waveform generator;
a W band receiver;
an exciter;
a first upconverter;
a second upconverter
a frequency generator;
a frequency doubler;
a duplexer;
a power amplifier;
wherein said waveform generator generates a baseband linear FM waveform signal in a range of frequencies between 700 to 900 MHz, and upconverts said frequency to a linear frequency modulated (LFM) waveform centered at 2.16 GHz;
wherein said exciter comprises a phase locked dielectric resonator oscillator (PLDRO) synchronized to a 100 MHz reference derived from said frequency generator and generates a 15.4 GHz tunable reference; and wherein said exciter uses a three-times multiplier that raises the tunable reference frequency to 46.2 GHz;
wherein said first upconverter accepts the 46.2 GHz frequency from said exciter and uses said frequency doubler to increase the 46.2 GHz signal to a 92.4 GHz signal;
wherein said second upconverter receives and sums the 92.4 GHz signal and a 2.16 GHz signal output by said waveform generator to produce a 94.56 GHz signal;
wherein said power amplifier receives the 94.56 GHz signal to produce a 5 Watt peak (TBR) power transmit signal;
wherein said duplexer receives receives the 5 Watt peak (TBR) power transmit signal, and effects a connection between a transmitter and said cassegrain antenna during transmission by the radar, and isolates said cassegrain antenna from said W band receiver, and effects a connection between said cassegrain antenna and said W band receiver during reception, isolating said cassegrain antenna from the transmitter.

13. The cassegrain antenna according to claim 12 further comprising:
a digital downconverter; and
wherein when said W band receiver receives a radar return signal, said W band receiver amplifies the radar return signal, and uses a single downconversion architecture to translate the received frequency from W-Band to 2.16 GHz; and
wherein the translated 2.16 GHz signal is input to said digital downconverter for digitization and signal processing.

14. The cassegrain antenna according to claim 12 wherein said duplexer is a ferrite device.

15. A cassegrain antenna configured for long-distance weather monitoring using an X Band microwave frequency and imaging of terrain and obstacles using a W Band microwave frequency, for use in a radar located in an aircraft for operating in a degraded visual environment, said cassegrain antenna comprising:
a parabolic reflector;
a sub-reflector;
a sub-reflector mount configured to position said sub-reflector with respect to said parabolic reflector; and a feed structure, said feed structure configured to simultaneously direct and receive W band electromagnetic energy and X band electromagnetic energy at said sub-reflector;
wherein said feed structure comprises:
a first horn configured to direct the W band electromagnetic energy at said sub-reflector; said first horn comprising: a cylindrical portion and a conical portion, wherein a first end of said cylindrical portion transitions into said conical portion;
a second horn configured to direct the X band electromagnetic energy at said sub-reflector; said second horn comprising a cylindrical portion and a conical portion, wherein a first end of said cylindrical portion of said second horn transitions into said conical portion of said second horn;
wherein said second horn is concentrically positioned with respect to said first horn;
wherein a distal end of said conical portion of said first horn is substantially coplanar with a distal end of said conical portion of said second horn; and
wherein said concentrically positioned first and second horns are mounted at a vertex of said parabolic reflector, to concentrically direct the W band electromagnetic energy and X band electromagnetic energy at said sub-reflector.

16. A method of monitoring long-distance weather conditions using an X Band microwave frequency and imaging of terrain and obstacles using a W Band microwave frequency by a radar of an aircraft operating in a degraded visual environment, said method comprising the steps of:
generating a baseband linear FM waveform signal in a range of frequencies between 700 to 900 MHz using a waveform generator, and upconverting said frequency to a linear frequency modulated (LFM) waveform centered at 2.16 GHz;
generating a 15.4 GHz tunable reference using a phase locked dielectric resonator oscillator (PLDRO) synchronized to a 100 MHz reference derived from a frequency generator;
raising the 15.4 GHz tunable reference frequency to a 46.2 GHz signal using a three-times multipler;
doubling the 46.2 GHz signal using a first upconverter to a 92.4 GHz signal;
using a second upconverter for summing the 92.4 GHz signal and a 2.16 GHz signal output by said waveform generator to produce a 94.56 GHz signal;
receiving the 94.56 GHz signal by a power amplifier, and producing a 5 Watt peak (TBR) power transmit signal using the power amplifier;
receiving the 5 Watt peak (TBR) power transmit signal by a duplexer, and using the duplexer for effecting a connection between a transmitter and a cassegrain antenna during transmitting by the radar, and for isolating the cassegrain antenna from a W band receiver.

17. The method according to claim 16 further comprising:
using the duplexer for effecting a connection between the cassegrain antenna and the W band receiver during receiving by the radar, and for isolating the cassegrain antenna from the transmitter;
receiving and amplifying a radar return signal by the W band receiver, and using a single downconversion architecture for translating the received frequency from W-Band to 2.16 GHz; and
inputting the translated 2.16 GHz signal to a digital downconverter, and digitizing of the 2.16 GHz signal.

18. A cassegrain antenna configured for long-distance weather monitoring using an X Band microwave frequency and imaging of terrain and obstacles using a W Band microwave frequency, for use in a radar located in an aircraft for operating in a degraded visual environment, said cassegrain antenna comprising:
a parabolic reflector;
a sub-reflector;
a conical sub-reflector mount configured to position said sub-reflector with respect to said parabolic reflector;
a feed structure configured to simultaneously direct W band electromagnetic energy and X band electromagnetic energy at said sub-reflector;
a waveform generator;
a W band receiver;
an exciter;
a first upconverter;
a second upconverter
a frequency generator;
a frequency doubler;
a duplexer;
a power amplifier;
wherein said waveform generator generates a baseband linear FM waveform signal in a range of frequencies, and upconverts said frequency to a linear frequency modulated (LFM) waveform centered at 2.16 GHz;
wherein said exciter comprises a phase locked dielectric resonator oscillator (PLDRO) synchronized to a 100 MHz reference derived from said frequency generator and generates a 15.4 GHz tunable reference; and wherein said exciter uses a three-times multipler that raises the tunable reference frequency to 46.2 GHz;
wherein said first upconverter accepts the 46.2 GHz frequency from said exciter and uses said frequency doubler to increase the 46.2 GHz signal to a 92.4 GHz signal;
wherein said second upconverter receives and sums the 92.4 GHz signal and a 2.16 GHz signal output by said waveform generator to produce a 94.56 GHz signal;
wherein said power amplifier receives the 94.56 GHz signal to produce a 5 Watt peak (TBR) power transmit signal; and
wherein said duplexer receives receives the 5 Watt peak (TBR) power transmit signal, and effects a connection between a transmitter and said cassegrain antenna during transmission by the radar, and isolates said cassegrain antenna from said W band receiver, and effects a connection between said cassegrain antenna and said W band receiver during reception, isolating said cassegrain antenna from the transmitter.

19. The cassegrain antenna according to claim 18, wherein said feed structure comprises:
a first horn configured to collect and disseminate X Band electromagnetic energy;
a second horn configured to collect and disseminate W Band electromagnetic energy;
wherein said first horn and said second horn are mounted side-by-side on said parabolic reflector in proximity to a vertex of said parabolic reflector, to direct the W band electromagnetic energy at said sub-reflector.

20. The cassegrain antenna according to claim 18, wherein said feed structure comprises:
a first horn configured to direct the W band electromagnetic energy at said sub-reflector;
a second horn configured to direct the X band electromagnetic energy at said sub-reflector;
wherein said second horn is concentrically positioned with respect to said first horn; and wherein said concentrically positioned first and second horns are mounted at a vertex of said parabolic reflector, to concentrically direct the W band electromagnetic energy and X band electromagnetic energy at said sub-reflector.

* * * * *